United States Patent
Park et al.

(10) Patent No.: US 11,871,286 B2
(45) Date of Patent: *Jan. 9, 2024

(54) CONNECTION FAILURE INFORMATION FOR PACKET DUPLICATION

(71) Applicant: Comcast Cable Communications, LLC, Philadelphia, PA (US)

(72) Inventors: Kyungmin Park, Vienna, VA (US); Esmael Hejazi Dinan, McLean, VA (US); Hyoungsuk Jeon, Centreville, VA (US); Hua Zhou, Vienna, VA (US); Alireza Babaei, Fairfax, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/806,093

(22) Filed: Jun. 9, 2022

(65) Prior Publication Data

US 2022/0303837 A1 Sep. 22, 2022

Related U.S. Application Data

(63) Continuation of application No. 16/918,577, filed on Jul. 1, 2020, now Pat. No. 11,399,318, which is a
(Continued)

(51) Int. Cl.
*H04W 36/00* (2009.01)
*H04W 76/19* (2018.01)
(Continued)

(52) U.S. Cl.
CPC ....... *H04W 36/0055* (2013.01); *H04W 24/10* (2013.01); *H04W 36/0079* (2018.08);
(Continued)

(58) Field of Classification Search
CPC ............. H04W 24/10; H04W 36/0055; H04W 36/0079; H04W 76/18; H04W 76/19; H04W 80/02; H04W 80/08
See application file for complete search history.

(56) References Cited

U.S. PATENT DOCUMENTS 8,798,093 B2 8/2014 Wu
9,432,847 B2 8/2016 Yi et al.
(Continued)

FOREIGN PATENT DOCUMENTS

CN 102448060 A 5/2012
WO 2018143703 A1 8/2018
(Continued)

OTHER PUBLICATIONS

R2-162709 3GPP TSG-RAN WG2 Meeting #93bis, Dubrovnik, Croatia, Apr. 11-15, 2016, Source: Beam support in NR.
(Continued)

*Primary Examiner* — Melanie Jagannathan
(74) *Attorney, Agent, or Firm* — Banner & Witcoff, Ltd.

(57) ABSTRACT

Systems, apparatuses, and methods are described for wireless communications. Devices may exchange information regarding a radio link failure and/or a handover. The information may comprise a radio link failure report which may comprise an indication of packet duplication.

52 Claims, 23 Drawing Sheets

Related U.S. Application Data continuation of application No. 16/130,696, filed on Sep. 13, 2018, now Pat. No. 10,757,615.

(60) Provisional application No. 62/558,116, filed on Sep. 13, 2017.

(51) Int. Cl.
| | | |
|---|---|---|
| *H04W 24/10* | (2009.01) | |
| *H04W 80/08* | (2009.01) | |
| *H04W 76/18* | (2018.01) | |
| *H04W 80/02* | (2009.01) | |
| *H04W 76/27* | (2018.01) | |
| *H04W 36/30* | (2009.01) | |

(52) U.S. Cl.
CPC ......... *H04W 76/18* (2018.02); *H04W 76/19* (2018.02); *H04W 80/02* (2013.01); *H04W 80/08* (2013.01); *H04W 36/305* (2018.08); *H04W 76/27* (2018.02)

(56) References Cited

U.S. PATENT DOCUMENTS

| | | | |
|---|---|---|---|
| 9,596,674 | B2 | 3/2017 | Somasundaram et al. |
| 2008/0310367 | A1 | 12/2008 | Meylan |
| 2009/0175163 | A1 | 7/2009 | Sammour et al. |
| 2009/0190480 | A1 | 7/2009 | Sammour et al. |
| 2010/0034169 | A1 | 2/2010 | Maheshwari et al. |
| 2012/0069732 | A1 | 3/2012 | Xu et al. |
| 2013/0250828 | A1 | 9/2013 | Chou et al. |
| 2014/0079022 | A1 | 3/2014 | Wang et al. |
| 2014/0192775 | A1 | 7/2014 | Li et al. |
| 2015/0016312 | A1 | 1/2015 | Li et al. |
| 2015/0365872 | A1 | 12/2015 | Dudda et al. |
| 2016/0234714 | A1* | 8/2016 | Basu Mallick ....... H04W 16/32 |
| 2017/0041767 | A1 | 2/2017 | Vajapeyam et al. |
| 2017/0150408 | A1 | 5/2017 | Joseph et al. |
| 2017/0202053 | A1 | 7/2017 | Rune |
| 2018/0006770 | A1 | 1/2018 | Guo et al. |
| 2018/0124642 | A1 | 5/2018 | Phuyal et al. |
| 2018/0124825 | A1 | 5/2018 | Lee et al. |
| 2018/0279168 | A1 | 9/2018 | Jheng et al. |
| 2018/0279169 | A1 | 9/2018 | Wang et al. |
| 2018/0279193 | A1 | 9/2018 | Park et al. |
| 2018/0279204 | A1 | 9/2018 | Kim et al. |
| 2018/0279218 | A1 | 9/2018 | Park et al. |
| 2018/0279262 | A1 | 9/2018 | Babaei et al. |
| 2018/0279401 | A1 | 9/2018 | Hong et al. |
| 2018/0287677 | A1 | 10/2018 | Nagaraja et al. |
| 2018/0310202 | A1* | 10/2018 | Löhr ................ H04W 28/065 |
| 2018/0352601 | A1 | 12/2018 | Park et al. |
| 2018/0367288 | A1 | 12/2018 | Vrzic et al. |
| 2018/0368107 | A1 | 12/2018 | Babaei et al. |
| 2019/0037635 | A1 | 1/2019 | Guo et al. |
| 2019/0053325 | A1 | 2/2019 | Yu et al. |
| 2019/0132790 | A1 | 5/2019 | Lee et al. |
| 2019/0149421 | A1* | 5/2019 | Jin ........................ H04L 5/0078 |
| | | | 370/331 |
| 2019/0268799 | A1 | 8/2019 | Hong et al. |
| 2019/0289510 | A1 | 9/2019 | Rugeland et al. |
| 2019/0373663 | A1* | 12/2019 | Yu ........................ H04W 76/18 |
| 2020/0119864 | A1 | 4/2020 | Xu et al. |
| 2020/0120522 | A1* | 4/2020 | Xiao ........................ H04L 41/06 |
| 2020/0120569 | A1 | 4/2020 | Baek et al. |
| 2020/0178331 | A1* | 6/2020 | Xu ........................ H04W 76/16 |
| 2020/0260518 | A1 | 8/2020 | Orsino et al. |
| 2020/0322864 | A1* | 10/2020 | Wu .................... H04L 41/0668 |
| 2021/0105681 | A1 | 4/2021 | Paladugu et al. |
| 2021/0105686 | A1* | 4/2021 | Jo ........................ H04W 36/18 |
| 2021/0153282 | A1 | 5/2021 | Jo et al. |

FOREIGN PATENT DOCUMENTS

| | | |
|---|---|---|
| WO | 2018147677 A1 | 8/2018 |
| WO | 2018175199 A1 | 9/2018 |
| WO | 2018183085 A1 | 10/2018 |
| WO | 2018202933 A1 | 11/2018 |
| WO | 2018203736 A1 | 11/2018 |
| WO | 2018231425 A1 | 12/2018 |
| WO | 2018237001 A1 | 12/2018 |
| WO | 2019139530 A1 | 7/2019 |

OTHER PUBLICATIONS

May 27, 2019—Extended European Search Report—19155025.0.
NTT Docomo, Inc.: "F1 interface: Radio resource configuration management", May 15-19, 2017.
CMCC: "System information generation and delivery in CU-DU split architecture", Aug. 21-25, 2017.
ZTE: "Discussion on the solution for UE Initial Access", Oct. 9-13, 2017.
Feb. 27, 2019—EP Search Report—19151430.6.
May 14, 2017—TP for UE Radio Bearer Management.
NOKIA—May 1, 2010—"Enabling MRO in case of re-establishment request in unprepared eNB".
Apr. 8, 2019—Exended European Search Report—EP 19151473.6.
ZTE—Consideration on the activation or deactivation of duplication—Nov. 17, 2017.
CATT—Discussion on CA based PDCP Duplication—Sep. 30, 2017.
3GPP Standard—"3rd Generation Partnership Project: Technical Specificaiton Group Radio Access Network; NG-RAN; F1 application protocol (F1AP) (Release 15)"—Dec. 11, 2017.
3GPP Standard—"3rd Generation Partnership Project; Technical Specification Group Radio Access Network NR Radio Resource Control (RRC) protocol specification (Release 15)"—Jan. 4, 2018.
Aug. 6, 2019—European Extended Search Report—EP 19157448.2.
3GPP TSG-RAN WG2 #100: "Discussion on Inter-nodeRRC container", Dec. 1, 2017.
3GPP TSG-RAN Meeting #76: "Miscellaneous general corrections and clarifications resulting from ASN.1 review", Jun. 5, 2017.
R1-1704159 3GPP TSG-RAN WG2 Meeting #98, Hangzhou, China, May 15-19, 2017, Source: Samsung, Title: Random Access Response in NR.
R1-1704672 3GPP TSG-RAN WG2 Meeting #98, Hangzhou, China, May 15-19, 2017, Source: ZTE, Title: Consideration on the 4-step random access procedure.
R2-1704901 3GPP TSG-RAN WG2 Meeting #98, Hangzhou, China, May 15-19, 2017, Source: Qualcomm Incorporated, Title: Prioritized random access in NR.
R3-172102 3GPP TSG-RAN3 NR AdHoc Meeting, Qingdao, China, Jun. 27-29, 2017, Source: China Telecom, Title: On the preliminary transport comparison between F1-C and F1-U protocols.
R3-172176 3GPP TSG-RAN3 NR AdHoc Meeting, Qingdao, China, Jun. 27-29, 2017, Source: Huawei, Title: F1AP procedures for RRC Connection Setup.
R3-172178 3GPP TSG-RAN3 NR AdHoc Meeting, Qingdao, China, Jun. 27-29, 2017, Source: Huawei, Title: TP on Transmitting RRC Connection Setup message over F1 to 38.470.
R3-172198 3GPP TSG-RAN3 NR AdHoc Meeting, Qingdao, China, Jun. 27-29, 2017, Source: Huawei, Title: Discussions on F1 interface management.
R3-172199 3GPP TSG-RAN3 NR AdHoc Meeting, Qingdao, China, Jun. 27-29, 2017, Source: Huawei, Title: TP on F1 interface management to 38.470.
R3-172200 3GPP TSG-RAN3 NR AdHoc Meeting, Qingdao, China, Jun. 27-29, 2017, Source: Huawei, HiSilicon, Title: TP on F1 interface management procedures to 38.473.
R3-172209 3GPP TSG-RAN3 NR AdHoc Meeting, Qingdao, China, Jun. 27-29, 2017, Source: Chinatelecom, Title: gNB and gNB-CU ID discussion.

(56) References Cited

OTHER PUBLICATIONS

R3-172218 3GPP TSG-RAN3 NR AdHoc Meeting, Qingdao, China, Jun. 27-29, 2017, Source: CATT, Title: Discussion on the F1AP functions necessary for Option 3.
R3-172244 3GPP TSG-RAN3 NR AdHoc Meeting, Qingdao, China, Jun. 27-29, 2017, Source: Samsung, KT, SK Telecom, Title: Centralized retransmission of lost PDUs.
R3-172250 3GPP TSG-RAN3 NR AdHoc Meeting, Qingdao, China, Jun. 27-29, 2017, Source: Samsung, KT, SK Telecom, Title: On-demand SI support in high layer functional split.
R3-172251 3GPP TSG-RAN3 NR AdHoc Meeting, Qingdao, China, Jun. 27-29, 2017, Source: Samsung, KT, SK Telecom, Title: Stage 2 text proposal for TS38.401 on mechanism of centralized retransmission of lost PDUs.
R3-172256 3GPP TSG-RAN3 NR AdHoc Meeting, Qingdao, China, Jun. 27-29, 2017, Source: Samsung, KT, SK Telecom, Title: Stage 2 text proposal for TS38.401 on supporting on-demand SI.
R3-172266 3GPP TSG-RAN3 NR AdHoc Meeting, Qingdao, China, Jun. 27-29, 2017, Source: LG Electronics Inc., Title: Issue on C-RNTI allocation for RRC connection resume.
R3-172309 3GPP TSG-RAN3 NR AdHoc Meeting, Qingdao, China, Jun. 27-29, 2017, Source: Nokia, Alcatel-Lucent Shanghai Bell, Title: Inter-gNB-DU Mobility procedure.
R3-172310 3GPP TSG-RAN3 NR AdHoc Meeting, Qingdao, China, Jun. 27-29, 2017, Source: Nokia, Alcatel-Lucent Shanghai Bell, Title: TP of Inter-gNB-DU Mobility procedure (TS 38.401).
R3-172321 3GPP TSG-RAN3 NR AdHoc Meeting, Qingdao, China, Jun. 27-29, 2017, Source: Nokia, Alcatel-Lucent Shanghai Bell, Title: Retransmission procedure in radio link outage.
R3-172322 3GPP TSG-RAN3 NR AdHoc Meeting, Qingdao, China, Jun. 27-29, 2017, Source: Nokia, Alcatel-Lucent Shanghai Bell, Title: TP of Retransmission procedure in radio link outage (TS 38.401).
R3-172323 3GPP TSG-RAN3 NR AdHoc Meeting, Qingdao, China, Jun. 27-29, 2017, Source: Nokia, Alcatel-Lucent Shanghai Bell, Title: TP of Retransmission procedure in radio link outage (TS 38.475).
R3-172324 3GPP TSG-RAN3 NR AdHoc Meeting, Qingdao, China, Jun. 27-29, 2017, Source: Nokia, Title: [Draft] LS on retransmission procedure in radio link outage.
R3-172333 3GPP TSG-RAN3 NR AdHoc Meeting, Qingdao, China, Jun. 27-29, 2017, Source: Nokia, Alcatel-Lucent Shanghai Bell, Title: UE Initial Access Procedure.
R3-172334 3GPP TSG-RAN3 NR AdHoc Meeting, Qingdao, China, Jun. 27-29, 2017, Source: Nokia, Alcatel-Lucent Shanghai Bell, Title: TP of UE Initial Access procedure (TS 38.401).
R3-172342 3GPP TSG-RAN3 NR AdHoc Meeting, Qingdao, China, Jun. 27-29, 2017, Source: LG Electronics Inc., Title: Consideration on C-RNTI during initial UE access.
R3-172343 3GPP TSG-RAN3 NR AdHoc Meeting, Qingdao, China, Jun. 27-29, 2017, Source: LG Electronics Inc., Title: TP for consideration on C-RNTI during initial UE access.
R3-172344 3GPP TSG-RAN3 NR AdHoc Meeting, Qingdao, China, Jun. 27-29, 2017, Source: LG Electronics Inc., Title: TP for consideration on C-RNTI during initial UE access.
R3-172345 3GPP TSG-RAN3 NR AdHoc Meeting, Qingdao, China, Jun. 27-29, 2017, Source: ZTE, Title: RRC message transmission over F1 interface for TS 38.401.
R3-172346 3GPP TSG-RAN3 NR AdHoc Meeting, Qingdao, China, Jun. 27-29, 2017, Source: ZTE, Title: RRC message transmission over F1 interface for TS 38.470.
R3-172347 3GPP TSG-RAN3 NR AdHoc Meeting, Qingdao, China, Jun. 27-29, 2017, Source: ZTE, Title: RRC message transmission over F1 interface for TS 38.473.
R3-172356 3GPP TSG-RAN3 NR AdHoc Meeting, Qingdao, China, Jun. 27-29, 2017, Source: ZTE, China Telecom, Title: Discussion on flow control over F1-U.
R3-172357 3GPP TSG-RAN3 NR AdHoc Meeting, Qingdao, China, Jun. 27-29, 2017, Source: ZTE, Title: Update on flow control over F1 interface for TS 38.401.
R3-172358 3GPP TSG-RAN3 NR AdHoc Meeting, Qingdao, China, Jun. 27-29, 2017, Source: ZTE, Title: Flow control over F1 interface for TS 38.475.
R3-172399 3GPP TSG-RAN3 NR AdHoc Meeting, Qingdao, China, Jun. 27-29, 2017, Source: NEC, Title: How many gNB-DUs can be operated by one gNB-CU.
R2-1800898 3GPP TSG-RAN WG2 AH, Vancouver, Canada, Jan. 22-26, 2018, Source: vivo, Title: Text proposal for repetition of the configured grant.
R2-1800902 3GPP TSG-RAN WG2 AH, Vancouver, Canada, Jan. 22-26, 2018, Source: vivo, Title: Collision between dynamic grant and configured grant.
R2-1800925 3GPP TSG-RAN WG2 AH, Vancouver, Canada, Jan. 22-26, 2018, Source: Intel Corporation, Title: URLLC exception for dynamic grant.
R2-1801032 3GPP TSG-RAN WG2 AH, Vancouver, Canada, Jan. 22-26, 2018, Source: Huawei, HiSilicon, Title: Leftovers of HARQ Transmission with Configured Grant Timer.
R2-1801033 3GPP TSG-RAN WG2 AH, Vancouver, Canada, Jan. 22-26, 2018, Source: Huawei, HiSilicon, Title: Corrections on HARQ Transmission with ConfiguredGrantTimer in TS 38.321.
R2-1801034 3GPP TSG-RAN WG2 AH, Vancouver, Canada, Jan. 22-26, 2018, Source: Huawei, HiSilicon, Title: Corrections on Retransmission for Configured Grant.
R2-1801035 3GPP TSG-RAN WG2 AH, Vancouver, Canada, Jan. 22-26, 2018, Source: Huawei, HiSilicon, Title: Corrections on calculations of transmission occasions of configured grant.
R2-1801036 3GPP TSG-RAN WG2 AH, Vancouver, Canada, Jan. 22-26, 2018, Source: Huawei, HiSilicon, Title: Further discussion on configuration of ConfiguredGrantTimer.
R2-1801037 3GPP TSG-RAN WG2 AH, Vancouver, Canada, Jan. 22-26, 2018, Source: Huawei, HiSilicon, Title: Corrections on flexible occasion of initial transmission and repetition for configured grant.
R2-1801038 3GPP TSG-RAN WG2 AH, Vancouver, Canada, Jan. 22-26, 2018, Source: Huawei, HiSilicon, Title: Impact of SUL on configured grant.
R2-1801039 3GPP TSG-RAN WG2 AH, Vancouver, Canada, Jan. 22-26, 2018, Source: Huawei, HiSilicon, Title: Configured grant Type1 operation with BWP switch.
R2-1801052 3GPP TSG-RAN WG2 AH, Vancouver, Canada, Jan. 22-26, 2018, Source: LG Electronics Inc., Title: Correction on ConfiguredGrantTimer.
R2-1801063 3GPP TSG-RAN WG2 AH, Vancouver, Canada, Jan. 22-26, 2018, Source: LG Electronics Inc., Title: Repetition transmission on configured uplink grant.
R2-1801081 3GPP TSG-RAN WG2 AH, Vancouver, Canada, Jan. 22-26, 2018, Source: ZTE, Title: Consideration on the configured grant for supporting SUL.
R2-1801125 3GPP TSG-RAN WG2 AH, Vancouver, Canada, Jan. 22-26, 2018, Source: InterDigital Inc., Title: Correction on override of configured assignment by dynamic assignment.
R2-1801126 3GPP TSG-RAN WG2 Ah, Vancouver, Canada, Jan. 22-26, 2018, Source: InterDigital Inc., Title: Override of configured grant by dynamic grant in case of URLLC.
R2-1801239 3GPP TSG-RAN WG2 AH, Vancouver, Canada, Jan. 22-26, 2018, Source: LG Electronics Inc., Title: Prioritization between dynamic grant and configured grant for URLLC.
R2-1801277 3GPP TSG-RAN WG2 AH, Vancouver, Canada, Jan. 22-26, 2018, Source: LG Electronics Inc., Title: Restart condition of sCellDeactivationTimer with skipping operation.
R2-1801371 3GPP TSG-RAN WG2 AH, Vancouver, Canada, Jan. 22-26, 2018, Source: Samsung, Title: Remaining Issue on SPS/Grant-free: How to Handle Dynamic Grant Coinciding with Configured Grant.
R2-1801475 3GPP TSG-RAN WG2 AH, Vancouver, Canada, Jan. 22-26, 2018, Source: LG Electronics Inc., Title: Prevention of using CS grant.
R3-174356 3GPP TSG-RAN WG3 Meeting #98, Reno, USA, Nov. 27-Dec. 1, 2017, Source: Nokia, Nokia Shanghai Bell, Title: Transport layer protocol for F1-C.

(56) References Cited

OTHER PUBLICATIONS

R3-174357 3GPP TSG-RAN WG3 Meeting #98, Reno, USA, Nov. 27-Dec. 1, 2017, Source: Nokia, Nokia Shanghai Bell, Title: Transport layer protocol for F1-U.
R3-174359 3GPP TSG-RAN WG3 Meeting #98, Reno, USA, Nov. 27-Dec. 1, 2017, Source: Nokia, Nokia Shanghai Bell, Title: UE Initial Access procedure.
R3-174360 3GPP TSG-RAN WG3 Meeting #98, Reno, USA, Nov. 27-Dec. 1, 2017, Source: Nokia, Nokia Shanghai Bell, KT, Title: FFS resolution in intra-gNB-CU mobility.
R3-174361 3GPP TSG-RAN WG3 Meeting #98, Reno, USA, Nov. 27-Dec. 1, 2017, Source: Nokia, Nokia Shanghai Bell, KT, Title: TP of UE Context Modification and UE Attached Indication (TS 38.470).
R3-174362 3GPP TSG-RAN WG3 Meeting #98, Reno, USA, Nov. 27-Dec. 1, 2017, Source: Nokia, Nokia Shanghai Bell, KT, Title: TP of UE Context Modification and UE Attached Indication (TS 38.473).
R3-174364 3GPP TSG-RAN WG3 Meeting #98, Reno, USA, Nov. 27-Dec. 1, 2017, Source: Nokia, Nokia Shanghai Bell, Title: FFS resolution in Centralized Retransmission.
R3-174396 3GPP TSG-RAN WG3 Meeting #98, Reno, USA, Nov. 27-Dec. 1, 2017, Source: ZTE, China Telecom, Title: Solution for UE Initial Access.
R3-174397 3GPP TSG-RAN WG3 Meeting #98, Reno, USA, Nov. 27-Dec. 1, 2017, Source: ZTE, Title: Update on UE Context Management for TS38.470.
R3-174398 3GPP TSG-RAN WG3 Meeting #98, Reno, USA, Nov. 27-Dec. 1, 2017, Source: ZTE, Title: Update on UE Context Management for TS38.473.
R3-174405 3GPP TSG-RAN WG3 Meeting #98, Reno, USA, Nov. 27-Dec. 1, 2017, Source: ZTE, China Unicom, Title: Remaining Issues of Mobility Aspects.
R3-174408 3GPP TSG-RAN WG3 Meeting #98, Reno, USA, Nov. 27-Dec. 1, 2017, Source: ZTE, Title: Consideration on the activation or deactivation of duplication.
R3-174409 3GPP TSG-RAN WG3 Meeting #98, Reno, USA, Nov. 27-Dec. 1, 2017, Source: ZTE, China Telecom, Title: Remaining Issues of Centralized Retransmissions.
R3-174410 3GPP TSG-RAN WG3 Meeting #98, Reno, USA, Nov. 27-Dec. 1, 2017, Source: ZTE, Title: TP for Centralized Retransmissions kept in TS38.475.
R3-174411 3GPP TSG-RAN WG3 Meeting #98, Reno, USA, Nov. 27-Dec. 1, 2017, Source: ZTE, Title: TP for Centralized Retransmissions kept in TS38.425.
R3-174473 3GPP TSG-RAN WG3 Meeting #98, Reno, USA, Nov. 27-Dec. 1, 2017, Source: Huawei, Title: pCR on open issues for PDCP duplication over F1 to 38.473.
R3-174482 3GPP TSG-RAN WG3 Meeting #98, Reno, USA, Nov. 27-Dec. 1, 2017, Source: Huawei, Title: Further discussions on radio link outage indication.
R3-174533 3GPP TSG-RAN WG3 Meeting #98, Reno, USA, Nov. 27-Dec. 1, 2017, Source: CATT, Title: Discussion on CA based PDCP Duplication.
R3-174535 3GPP TSG-RAN WG3 Meeting #98, Reno, USA, Nov. 27-Dec. 1, 2017, Source: CATT, Title: Discussion on F1 Setup procedure.
R3-174536 3GPP TSG-RAN WG3 Meeting #98, Reno, USA, Nov. 27-Dec. 1, 2017, Source: CATT, Title: Discussion on Initial UE Access.
R3-174537 3GPP TSG-RAN WG3 Meeting #98, Reno, USA, Nov. 27-Dec. 1, 2017, Source: CATT, Title: Introduction of UE Reconfiguration Complete procedure.
R3-174538 3GPP TSG-RAN WG3 Meeting #98, Reno, USA, Nov. 27-Dec. 1, 2017, Source: CATT, Title: TP for 38.473 on UE Reconfiguration Completion procedure.
R3-174542 3GPP TSG-RAN WG3 Meeting #98, Reno, USA, Nov. 27-Dec. 1, 2017, Source: CATT, Title: Discussion on inter-DU mobility without MN involved.

R3-174543 3GPP TSG-RAN WG3 Meeting #98, Reno, USA, Nov. 27-Dec. 1, 2017, Source: CATT, Title: Stage 3 TP on inter-DU mobility without MN involved.
R3-174545 3GPP TSG-RAN WG3 Meeting #98, Reno, USA, Nov. 27-Dec. 1, 2017, Source: CATT, Title: Discussion on the Intral-cell HO and SCG change procedure.
R3-174546 3GPP TSG-RAN WG3 Meeting #98, Reno, USA, Nov. 27-Dec. 1, 2017, Source: CATT, Title: TP for 38.473 on Intra-cell HO and SCG change procedure.
R3-174606 3GPP TSG-RAN WG3 Meeting #98, Reno, USA, Nov. 27-Dec. 1, 2017, Source: Samsung, KT, Title: Initial access procedure considering CU-DU split.
R3-174607 3GPP TSG-RAN WG3 Meeting #98, Reno, USA, Nov. 27-Dec. 1, 2017, Source: Samsung, KT, Title: Stage 3 TP for TS38.473 to reflect initial access procedure.
R3-174608 3GPP TSG-RAN WG3 Meeting #98, Reno, USA, Nov. 27-Dec. 1, 2017, Source: Samsung, KT, Title: RRC connection resume procedure considering CU-DU split.
R3-174609 3GPP TSG-RAN WG3 Meeting #98, Reno, USA, Nov. 27-Dec. 1, 2017, Source: Samsung, KT, Title: RRC connection reestablishment procedure considering CU-DU split.
R3-182243 3GPP TSG RAN WG3 Meeting #99bis, Sanya, China, Apr. 16-20, 2018, Source: Ericsson, Title: Bearer Context Setup procedure.
R2-1713898 3GPP TSG-RAN WG2 Meeting #100, Reno, USA, Nov. 27-Dec. 1, 2017, Source: Samsung, Title: RLM RS type and L3 parameter differentiation.
Dec. 2, 2019—European Extended Search Report—EP 19173901.0.
R3-183279 3GPP TSG-RAN2 Meeting #100, Busan, Korea, May 21-25, 2019, Source: Huawei, Title: pCR to 38.460 on indication of PDCP duplication over E1 interface.
R3-172401 3GPP TSG-RAN3 NR AdHoc Meeting, Qingdao, China, Jun. 27-29, 2017, Source: CMCC, Title: gNB ID and NCGI considering CU-DU split.
R3-172417 3GPP TSG-RAN3 NR AdHoc Meeting, Qingdao, China, Jun. 27-29, 2017, Source: ZTE, China Unicom, Title: Discussion on CU DU ID and NCGI.
R3-172418 3GPP TSG-RAN3 NR AdHoc Meeting, Qingdao, China, Jun. 27-29, 2017, Source: ZTE, China Unicom, Title: CUDU ID and NCGI for TS 38.300.
R3-172481 3GPP TSG-RAN3 NR AdHoc Meeting, Qingdao, China, Jun. 27-29, 2017, Source: Samsung, Title: Identification of gNB, gNB-CU/DU, and NR cell.
R3-172484 3GPP TSG-RAN3 NR AdHoc Meeting, Qingdao, China, Jun. 27-29, 2017, Source: Vodafone, Title: Common Radio Resource Management Functional Split for Different Deployment Scenarios.
R3-172511 3GPP TSG-RAN3 NR AdHoc Meeting, Qingdao, China, Jun. 27-29, 2017, Source: Ericsson, Title: Resilience and scalability in a disaggregated gNB.
3GPP TS 36.300 V14.3.0 (Jun. 2017), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 14).
3GPP TS 38.300 V1.0.0 (Sep. 2017), Technical Specification, 3rd Generation Partnership Project; Technical Specification Group Radio Access Network; NR; NR and NG-RAN; Overall Description; Stage 2 (Release 15).
R2-1707705 3GPP TSG-RAN2 Meeting #99, Berlin, Germany, Aug. 21-25, 2017, Source: OPPO, Title: Control on UL packet duplication for split bearer.
R2-1707708 3GPP TSG-RAN2 Meeting #99, Berlin, Germany, Aug. 21-25, 2017, Source: OPPO, Title: PDCP operation for UL packet duplication.
R2-1707717 3GPP TSG-RAN2 Meeting #99, Berlin, Germany, Aug. 21-25, 2017, Source: Huawei, HiSilicon, Title: UE behaviors upon deactivation of DC duplication.
R2-1707718 3GPP TSG-RAN2 Meeting #99, Berlin, Germany, Aug. 21-25, 2017, Source: Huawei, ASUSTek, HiSilicon, Title: RLC behaviors upon duplicate deactivation.
R2-1707719 3GPP TSG-RAN2 Meeting #99, Berlin, Germany, Aug. 21-25, 2017, Source: Huawei, ASUSTek, HiSilicon, Title: PDCP operation for packet duplication.

(56) References Cited

OTHER PUBLICATIONS

R2-1707720 3GPP TSG-RAN2 Meeting #99, Berlin, Germany, Aug. 21-25, 2017, Source: Huawei, HiSilicon, Title: PDCP data volume calculation for packet duplication (Revision of R2-1706484).
R2-1707924 3GPP TSG-RAN2 Meeting #99, Berlin, Germany, Aug. 21-25, 2017, Source: CATT, Title: PDCP Status Report for Duplication.
R2-1707925 3GPP TSG-RAN2 Meeting #99, Berlin, Germany, Aug. 21-25, 2017, Source: CATT, Title: Duplication Bearer Type.
R2-1707982 3GPP TSG-RAN2 Meeting #99, Berlin, Germany, Aug. 21-25, 2017, Source: Nokia, Mediatek, Nokia Shanghai Bell, Title: Initial State of PDCP Duplication (Revision of R2-1706545).
R2-1707990 3GPP TSG-RAN2 Meeting #99, Berlin, Germany, Aug. 21-25, 2017, Source: Nokia, Nokia Shanghai Bell, Title: Duplication Impacts to PDCP.
R2-1708017 3GPP TSG-RAN2 Meeting #99, Berlin, Germany, Aug. 21-25, 2017, Source: Ericsson, Title: Aligned duplication support for DRBs and SRBs.
R2-1708097 3GPP TSG-RAN2 Meeting #99, Berlin, Germany, Aug. 21-25, 2017, Source: MediaTek Inc., Title: Stage-2 aspects of data duplication (Revision of R2-1707260).
R2-1708098 3GPP TSG-RAN2 Meeting #99, Berlin, Germany, Aug. 21-25, 2017, Source: MediaTek Inc., Title: Data duplication in NR (Revision of R2-1707261).
R2-1708329 3GPP TSG-RAN2 Meeting #99, Berlin, Germany, Aug. 21-25, 2017, Source: Ericsson, Title: PDCP and RLC behaviour for PDCP data duplication.
R2-1708333 3GPP TSG-RAN2 Meeting #99, Berlin, Germany, Aug. 21-25, 2017, Source: Ericsson, Title: Packet duplication in CA (Revision of R2-1707172).
R2-1708335 3GPP TSG-RAN2 Meeting #99, Berlin, Germany, Aug. 21-25, 2017, Source: Ericsson, Title: PDCP dynamic link switching.
R2-1708336 3GPP TSG-RAN2 Meeting #99, Berlin, Germany, Aug. 21-25, 2017, Source: Ericsson, Title: PDCP data volume reporting in duplication (Revision of R2-1704370).
R2-1708337 3GPP TSG-RAN2 Meeting #99, Berlin, Germany, Aug. 21-25, 2017, Source: Ericsson, Title: PDCP duplication control related to SCell control.
R2-1708444 3GPP TSG-RAN2 Meeting #99, Berlin, Germany, Aug. 21-25, 2017, Source: Samsung, Title: Discussion on PDCP data volume calculation.
R2-1708489 3GPP TSG-RAN2 Meeting #99, Berlin, Germany, Aug. 21-25, 2017, Source: Vivo, Title: Duplication deactivation due to SCell or BWP deactivation.
R2-1708508 3GPP TSG-RAN2 Meeting #99, Berlin, Germany, Aug. 21-25, 2017, Source: Vivo, Title: Layer-2 behaviors of PDCP duplication activation deactivation.
R2-1708573 3GPP TSG-RAN2 Meeting #99, Berlin, Germany, Aug. 21-25, 2017, Source: Panasonic, Title: Packet duplication during the handover.
R2-1708624 3GPP TSG-RAN2 Meeting #99, Berlin, Germany, Aug. 21-25, 2017, Source: Lenovo, Motorola Mobility, Title: PDCP packet duplication.
R2-1708691 3GPP TSG-RAN2 Meeting #99, Berlin, Germany, Aug. 21-25, 2017, Source: Huawei, HiSilicon, Title: Remaining stage 2 issues for CA duplication and for DC duplication.
R2-1708735 3GPP TSG-RAN2 Meeting #99, Berlin, Germany, Aug. 21-25, 2017, Source: InterDigital Inc., Title: Details of duplication and routing for SRB.
R2-1708821 3GPP TSG-RAN2 Meeting #99, Berlin, Germany, Aug. 21-25, 2017, Source: Intel Corporation, Title: Support of CA packet duplication for RLC AM.
R2-1708862 3GPP TSG-RAN2 Meeting #99, Berlin, Germany, Aug. 21-25, 2017, Source: Fujitsu, Title: Stage 2 TP for RLC AM duplication.
R2-1708950 3GPP TSG-RAN2 Meeting #99, Berlin, Germany, Aug. 21-25, 2017, Source: Qualcomm Incorporated, Title: Further considerations for Packet duplication.
R2-1708951 3GPP TSG-RAN2 Meeting #99, Berlin, Germany, Aug. 21-25, 2017, Source: Qualcomm Incorporated, Title: PDCP duplication.
R2-1709032 3GPP TSG-RAN2 Meeting #99, Berlin, Germany, Aug. 21-25, 2017, Source: Samsung, Title: PDCP Duplication Operations (Revision of R2-177368).
R2-1709036 3GPP TSG-RAN2 Meeting #99, Berlin, Germany, Aug. 21-25, 2017, Source: Samsung, Title: Uplink DRB Duplication.
R2-1709061 3GPP TSG-RAN2 Meeting #99, Berlin, Germany, Aug. 21-25, 2017, Source: LG Electronics Inc., Title: Discussion on the duplicate detection in PDCP.
R2-1709077 3GPP TSG-RAN2 Meeting #99, Berlin, Germany, Aug. 21-25, 2017, Source: ITRI, Title: SCG Failure Case for Duplication SRB.
R2-1709095 3GPP TSG-RAN2 Meeting #99, Berlin, Germany, Aug. 21-25, 2017, Source: LG Electronics Inc., Title: Need for Duplicate RB.
R2-1709100 3GPP TSG-RAN2 Meeting #99, Berlin, Germany, Aug. 21-25, 2017, Source: LG Electronics Inc., Title: Packet duplication in PDCP (Revision of R2-1706870).
R2-1709870 3GPP TSG-RAN2 Meeting #99, Berlin, Germany, Aug. 21-25, 2017, Source: Ericsson, Title: TP on Radio Link Failure for 38.300.
R3-173128 3GPP TSG-RAN2 Meeting #99, Berlin, Germany, Aug. 21-25, 2017, Source: Huawei, Title: PDCP duplication for CU-DU.
R2-1800376 3GPP TSG-RAN WG2 NR Ad Hoc, Vancouver, Canada, Jan. 22-26, 2018, Source: Huawei, HiSilicon, Title: CR on the prioritization between dynamic scheduling and configured scheduling.
R2-1800158 3GPP TSG-RAN WG2 AH, Vancouver, Canada, Jan. 22-26, 2018, Source: OPPO, Title: CR on ConfiguredGrantTimer for C-RNTI based grant.
R2-1800647 3GPP TSG-RAN WG2 AH, Vancouver, Canada, Jan. 22-26, 2018, Source: OPPO, Title: Correction on ConfiguredGrantTimer.
R2-1800710 3GPP TSG-RAN WG2 AH, Vancouver, Canada, Jan. 22-26, 2018, Source: Ericsson, Title: Alignment of terminology for Configured Scheduling and SPS.
R2-1801053 3GPP TSG-RAN WG2 AH, Vancouver, Canada, Jan. 22-26, 2018, Source: LG Electronics Inc., Title: Correction on ConfiguredGrantTimer.
3GPP TS 38.331 V15.0.0 (Dec. 2017), Technical Specification, 3rd Generation Partnership Project; Technical Specification Group Radio Access Network; NR; Radio Resource Control (RRC) Protocol Specification (Release 15).
3GPP TS 38.331 V15.3.0 (Sep. 2018), Technical Specification, 3rd Generation Partnership Project; Technical Specification Group Radio Access Network; NR; Radio Resource Control (RRC) Protocol Specification (Release 15).
3GPP TS 38.463 V0.2.0 (Apr. 2018), Technical Specification, 3rd Generation Partnership Project; Technical Specification Group Radio Access Network; NG-RAN; E1 application protocol (E1AP) (Release 15).
3GPP TS 38.473 V15.0.0 (Dec. 2017), Technical Specification, 3rd Generation Partnership Project; Technical Specification Group Radio Access Network; NG-RAN; F1 application protocol (F1AP) (Release 15).
3GPP TS 38.473 V15.3.0 (Sep. 2018), Technical Specification, 3rd Generation Partnership Project; Technical Specification Group Radio Access Network; NG-RAN; F1 application protocol (F1AP) (Release 15).
R2-1801279 3GPP TSG-RAN WG2 AH, Vancouver, Canada, Jan. 22-26, 2018, Source: LG Electronics Inc., Title: Restart condition of sCellDeactivationTimer with skipping operation.
R2-1712238 3GPP TSG-RAN WG2 Meeting #100, Reno, USA, Nov. 27-Dec. 1, 2017, Source: OPPO, Title: Discussion on Detailed Issues on RLM.
R2-1712276 3GPP TSG-RAN WG2 Meeting #100, Reno, USA, Nov. 27-Dec. 1, 2017, Source: Spreadtrum Communications, Title: Discussions on the IS and OOS Counting Procedure.
R2-1712308 3GPP TSG-RAN WG2 Meeting #100, Reno, USA, Nov. 27-Dec. 1, 2017, Source: TCL, Title: Interaction between PDCP and RLC Entities for duplication in NR-NR DC.

(56) References Cited

OTHER PUBLICATIONS

R2-1712435 3GPP TSG-RAN WG2 Meeting #100, Reno, USA, Nov. 27-Dec. 1, 2017, Source: ZTE Corporation, Title: Consideration on PDCP Duplication in NR.
R2-1712559 3GPP TSG-RAN WG2 Meeting #100, Reno, USA, Nov. 27-Dec. 1, 2017, Source: Huawei, HiSilicon, Title: RLF for NR.
R2-1712736 3GPP TSG-RAN WG2 Meeting #100, Reno, USA, Nov. 27-Dec. 1, 2017, Source: Huawei, ASUSTek, HiSilicon, Title: PDCP operation for packet duplication.
R2-1712737 3GPP TSG-RAN WG2 Meeting #100, Reno, USA, Nov. 27-Dec. 1, 2017, Source: Huawei, HiSilicon, Title: PDCP data volume calculation for packet duplication.
R2-1712738 3GPP TSG-RAN WG2 Meeting #100, Reno, USA, Nov. 27-Dec. 1, 2017, Source: Huawei, HiSilicon, Title: Clarification on bearer type for packet duplication.
R2-1712739 3GPP TSG-RAN WG2 Meeting #100, Reno, USA, Nov. 27-Dec. 1, 2017, Source: Huawei, HiSilicon, Title: Enhancements for DL packet duplication.
R2-1712753 3GPP TSG-RAN WG2 Meeting #100, Reno, USA, Nov. 27-Dec. 1, 2017, Source: vivo, Title: RLM/RLF in NR.
R2-1712914 3GPP TSG-RAN WG2 Meeting #100, Reno, USA, Nov. 27-Dec. 1, 2017, Source: Lenovo, Motorola Mobility, Title: PDCP packet duplication.
R2-1712926 3GPP TSG-RAN WG2 Meeting #100, Reno, USA, Nov. 27-Dec. 1, 2017, Source: Ericsson, Title: PDCP duplication and discard.
R2-1712928 3GPP TSG-RAN WG2 Meeting #100, Reno, USA, Nov. 27-Dec. 1, 2017, Source: Ericsson, Title: PDCP duplication for AM operation.
R2-1712929 3GPP TSG-RAN WG2 Meeting #100, Reno, USA, Nov. 27-Dec. 1, 2017, Source: Ericsson, Title: PDCP duplication transmit procedure.
R2-1712932 3GPP TSG-RAN WG2 Meeting #100, Reno, USA, Nov. 27-Dec. 1, 2017, Source: Ericsson, Title: PDCP data volume reporting in duplication.
R2-1712964 3GPP TSG-RAN WG2 Meeting #100, Reno, USA, Nov. 27-Dec. 1, 2017, Source: Samsung, Title: Discussion on PDCP data volume calculation during PDCP Duplication.
R2-1712965 3GPP TSG-RAN WG2 Meeting #100, Reno, USA, Nov. 27-Dec. 1, 2017, Source: Institute for Information Industry (III), Title: Discussion on Uplink Packet Duplication.
R2-1713004 3GPP TSG-RAN WG2 Meeting #100, Reno, USA, Nov. 27-Dec. 1, 2017, Source: vivo, Title: Layer-2 behaviors of PDCP duplication deactivation.
R2-1713005 3GPP TSG-RAN WG2 Meeting #100, Reno, USA, Nov. 27-Dec. 1, 2017, Source: vivo, Title: PDCP duplication impacts on LCP.
R2-1713006 3GPP TSG-RAN WG2 Meeting #100, Reno, USA, Nov. 27-Dec. 1, 2017, Source: vivo, Title: Discussion on the PDCP data volume.
R2-1713009 3GPP TSG-RAN WG2 Meeting #100, Reno, USA, Nov. 27-Dec. 1, 2017, Source: vivo, Title: UE layer-2 behaviors at Scell-failure.
2-1713584 3GPP TSG-RAN WG2 Meeting #100, Reno, USA, Nov. 27-Dec. 1, 2017, Source: Qualcomm Incorporated, Title: PDCP duplication.
R2-1713588 3GPP TSG-RAN WG2 Meeting #100, Reno, USA, Nov. 27-Dec. 1, 2017, Source: Ericsson, Title: Remaining open issues of RLM and RLF in NR.
R2-1713641 3GPP TSG-RAN WG2 Meeting #100, Reno, USA, Nov. 27-Dec. 1, 2017, Source: ITL, Title: Configuration of PDCP duplication on default DRB.
R2-1713829 3GPP TSG-RAN WG2 Meeting #100, Reno, USA, Nov. 27-Dec. 1, 2017, Source: Samsung, Title: Activation and Deactivation of PDCP Duplication.
R2-1713830 3GPP TSG-RAN WG2 Meeting #100, Reno, USA, Nov. 27-Dec. 1, 2017, Source: Samsung, Title: Discussion on CA Duplication.
R2-1713831 3GPP TSG-RAN WG2 Meeting #100, Reno, USA, Nov. 27-Dec. 1, 2017, Source: Samsung, Title: Initial State of Uplink Packet Duplication.
R2-1713848 3GPP TSG-RAN WG2 Meeting #100, Reno, USA, Nov. 27-Dec. 1, 2017, Source: Samsung, Title: The Necessity of Fast RLF Recovery based on T312 in NR.
R2-1800155 3GPP TSG-RAN WG2 AH, Vancouver, Canada, Jan. 22-26, 2018, Source: OPPO, Title: Discussion on behaviour of ConfiguredGrantTimer.
R2-1800165 3GPP TSG-RAN WG2 AH, Vancouver, Canada, Jan. 22-26, 2018, Source: CATT, Title: UE behavior on configured grant timer upon DCI reception.
R2-1800334 3GPP TSG-RAN WG2 AH, Vancouver, Canada, Jan. 22-26, 2018, Source: Ericsson, Title: SPS and BWP inactivity timer interaction.
R2-1800373 3GPP TSG-RAN WG2 AH, Vancouver, Canada, Jan. 22-26, 2018, Source: Samsung Electronics R&D Institute UK, Title: Preventing simultaneous Type 1 configured grants on SUL and UL.
R2-1800374 3GPP TSG-RAN WG2 AH, Vancouver, Canada, Jan. 22-26, 2018, Source: Samsung Electronics R&D Institute UK, Title: Corrections to preventing simultaneous Type 1 configured grants on SUL and UL.
R2-1800566 3GPP TSG-RAN WG2 AH, Vancouver, Canada, Jan. 22-26, 2018, Source: LG Electronics Inc., Title: BWP timer restart for DL SPS.
R2-1800586 3GPP TSG-RAN WG2 AH, Vancouver, Canada, Jan. 22-26, 2018, Source: Nokia, Nokia Shanghai Bell, Title: Prioritization between dynamic grant and configured grant.
R2-1800587 3GPP TSG-RAN WG2 AH, Vancouver, Canada, Jan. 22-26, 2018, Source: Nokia, Nokia Shanghai Bell, Title: Correction on prioritization between dynamic grant and configured grant.
R2-1800622 3GPP TSG-RAN WG2 AH, Vancouver, Canada, Jan. 22-26, 2018, Source: Samsung, Title: Correction for SPS and Type-2 Configured Grant Calculation.
R2-1800624 3GPP TSG-RAN WG2 AH, Vancouver, Canada, Jan. 22-26, 2018, Source: Samsung, Title: Impact of Flexible Transmission on Configured Grant Operation.
R2-1800659 3GPP TSG-RAN WG2 AH, Vancouver, Canada, Jan. 22-26, 2018, Source: Samsung, Title: Draft CR for correction on SPS and Type-2 configured grant.
R2-1800661 3GPP TSG-RAN WG2 AH, Vancouver, Canada, Jan. 22-26, 2018, Source: Samsung, Title: Draft CR for flexible configured grant transmission.
R2-1800708 3GPP TSG-RAN WG2 AH, Vancouver, Canada, Jan. 22-26, 2018, Source: Ericsson, Title: Confirmation of Configured UL Grant Type 2 Activation for Multiple Aggregated Cells.
R2-1800709 3GPP TSG-RAN WG2 AH, Vancouver, Canada, Jan. 22-26, 2018, Source: Ericsson, Title: Alignment of terminology for Configured Scheduling and SPS.
R2-1800818 3GPP TSG-RAN WG2 AH, Vancouver, Canada, Jan. 22-26, 2018, Source: Samsung Electronics R&D Institute UK, Title: Corrections to prevent simultaneous Type 1 configured grants on SUL and UL.
R2-1800819 3GPP TSG-RAN WG2 AH, Vancouver, Canada, Jan. 22-26, 2018, Source: Samsung Electronics R&D Institute UK, Title: Preventing simultaneous Type 1 configured grants on SUL and UL.
R3-174611 3GPP TSG-RAN WG3 Meeting #98, Reno, USA, Nov. 27-Dec. 1, 2017, Source: Samsung, KT, Title: Mobility procedures with high layer split.
R3-174612 3GPP TSG-RAN WG3 Meeting #98, Reno, USA, Nov. 27-Dec. 1, 2017, Source: Samsung, KT, Title: Stage 2 TP for TS38.470 on mobility related procedures.
R3-174613 3GPP TSG-RAN WG3 Meeting #98, Reno, USA, Nov. 27-Dec. 1, 2017, Source: Samsung, KT, Title: Stage 3 TP for TS38.473 on mobility related procedures.
R3-174618 3GPP TSG-RAN WG3 Meeting #98, Reno, USA, Nov. 27-Dec. 1, 2017, Source: Samsung, KT, Title: Further discussions on PDCP duplication in high-layer split.
R3-174637 3GPP TSG-RAN WG3 Meeting #98, Reno, USA, Nov. 27-Dec. 1, 2017, Source: Intel Corporation, Title: Flow Control enhancements for downlink PDCP duplication.

(56) References Cited

OTHER PUBLICATIONS

R3-174638 3GPP TSG-RAN WG3 Meeting #98, Reno, USA, Nov. 27-Dec. 1, 2017, Source: Intel Corporation, Title: Flow Control enhancements for uplink PDCP duplication.
R3-174663 3GPP TSG-RAN WG3 Meeting #98, Reno, USA, Nov. 27-Dec. 1, 2017, Source: CMCC, Title: UE initial access procedure for CU-DU architecture.
R3-174769 3GPP TSG-RAN WG3 Meeting #98, Reno, USA, Nov. 27-Dec. 1, 2017, Source: Ericsson, Title: Discard the duplicated transmissions of PDCP PDUs.
R3-174772 3GPP TSG-RAN WG3 Meeting #98, Reno, USA, Nov. 27-Dec. 1, 2017, Source: Ericsson, Title: Benefits of F1AP Transaction IDs.
R3-174773 3GPP TSG-RAN WG3 Meeting #98, Reno, USA, Nov. 27-Dec. 1, 2017, Source: Ericsson, Title: Further discussion about TNL solution for F1-C.
R3-174774 3GPP TSG-RAN WG3 Meeting #98, Reno, USA, Nov. 27-Dec. 1, 2017, Source: Ericsson, Title: On parallel transactiosn over F1.
R3-174781 3GPP TSG-RAN WG3 Meeting #98, Reno, USA, Nov. 27-Dec. 1, 2017, Source: Ericsson, Title: Mobility procedures.
R3-174782 3GPP TSG-RAN WG3 Meeting #98, Reno, USA, Nov. 27-Dec. 1, 2017, Source: Ericsson, Title: Content for UE mobility command messages.
R3-174786 3GPP TSG-RAN WG3 Meeting #98, Reno, USA, Nov. 27-Dec. 1, 2017, Source: NTT Docomo, Inc., Title: How to acquire status of re-transmitted packets.
R3-174850 3GPP TSG-RAN WG3 Meeting #98, Reno, USA, Nov. 27-Dec. 1, 2017, Source: NTT Docomo, Inc., Title: Consideration on data volume reporting.
R3-174854 3GPP TSG-RAN WG3 Meeting #98, Reno, USA, Nov. 27-Dec. 1, 2017, Source: KT Corp., Title: Considerations for F1 Setup Procedure.
R3-180123 3GPP TSG-RAN WG3 NR Ad Hoc, Sophia Antipolis, France, Jan. 22-26, 2018, Source: ZTE, Title: QoS information transfer over F1 interface.
R3-180124 3GPP TSG-RAN WG3 NR Ad Hoc, Sophia Antipolis, France, Jan. 22-26, 2018, Source: ZTE, Title: Update on QoS information transfer for TS38.473.
R3-180139 3GPP TSG-RAN WG3 NR Ad Hoc, Sophia Antipolis, France, Jan. 22-26, 2018, Source: ZTE, Title: NW slicing for high layer functional split.
R3-180164 3GPP TSG-RAN WG3 NR Ad Hoc, Sophia Antipolis, France, Jan. 22-26, 2018, Source: CATT, Title: TP for 38.401 BL on UE Reconfiguration Completion procedure.
R3-180179 3GPP TSG-RAN WG3 NR Ad Hoc, Sophia Antipolis, France, Jan. 22-26, 2018, Source: CATT, Title: Discussion on UE Context Management procedure.
R3-180180 3GPP TSG-RAN WG3 NR Ad Hoc, Sophia Antipolis, France, Jan. 22-26, 2018, Source: CATT, Title: TP for TS 38.473 on UE Context Management procedure.
R3-180188 3GPP TSG-RAN WG3 NR Ad Hoc, Sophia Antipolis, France, Jan. 22-26, 2018, Source: Nokia, Nokia Shanghai Bell, Title: QoS handling for F1.
R3-180189 3GPP TSG-RAN WG3 NR Ad Hoc, Sophia Antipolis, France, Jan. 22-26, 2018, Source: Nokia, Nokia Shanghai Bell, Title: TP of QoS handling for F1 (TS38.473).
R3-180190 3GPP TSG-RAN WG3 NR Ad Hoc, Sophia Antipolis, France, Jan. 22-26, 2018, Source: Nokia, Nokia Shanghai Bell, KT, Title: User inactivity monitoring.
R3-180234 3GPP TSG-RAN WG3 NR Ad Hoc, Sophia Antipolis, France, Jan. 22-26, 2018, Source: LG Electronics Inc., KT Corp., Title: QoS aspect in UE context management function.
R3-180235 3GPP TSG-RAN WG3 NR Ad Hoc, Sophia Antipolis, France, Jan. 22-26, 2018, Source: LG Electronics Inc., KT Corp., Title: Stage 3 on QoS aspect in UE context management function.
R3-180244 3GPP TSG-RAN WG3 NR Ad Hoc, Sophia Antipolis, France, Jan. 22-26, 2018, Source: Samsung, KT, Title: UE context management update considering parameters over X2 for EN-DC.
R3-180285 3GPP TSG-RAN WG3 NR Ad Hoc, Sophia Antipolis, France, Jan. 22-26, 2018, Source: Samsung, KT, Title: User inactivity monitoring in CU-DU architecture.
R3-180286 3GPP TSG-RAN WG3 NR Ad Hoc, Sophia Antipolis, France, Jan. 22-26, 2018, Source: Samsung, KT, Title: TP for TS 38.473 on user inactivity monitoring.
R3-180300 3GPP TSG-RAN WG3 NR Ad Hoc, Sophia Antipolis, France, Jan. 22-26, 2018, Source: NEC, Title: RLC Mode indication in F1AP.
R3-180330 3GPP TSG-RAN WG3 NR Ad Hoc, Sophia Antipolis, France, Jan. 22-26, 2018, Source: CMCC, Title: QOS management over F1.
R3-180343 3GPP TSG-RAN WG3 NR Ad Hoc, Sophia Antipolis, France, Jan. 22-26, 2018, Source: Huawei, Title: Further discussions on QoS info transfer over F1.
R3-180344 3GPP TSG-RAN WG3 NR Ad Hoc, Sophia Antipolis, France, Jan. 22-26, 2018, Source: Huawei, Title: pCR to 38.473 on QoS info transfer over F1.
R3-180352 3GPP TSG-RAN WG3 NR Ad Hoc, Sophia Antipolis, France, Jan. 22-26, 2018, Source: Huawei, Title: Further discussions on UE context management.
R3-180355 3GPP TSG-RAN WG3 NR Ad Hoc, Sophia Antipolis, France, Jan. 22-26, 2018, Source: Huawei, Title: CR to BL 38.473 on inter-gNB-DU or intra-gNB-DU handover case for SA operation.
R3-180356 3GPP TSG-RAN WG3 NR Ad Hoc, Sophia Antipolis, France, Jan. 22-26, 2018, Source: Huawei, Title: pCR to 38.473 on the introduction of Handover Preparation Information for SA Operation.
R3-180357 3GPP TSG-RAN WG3 NR Ad Hoc, Sophia Antipolis, France, Jan. 22-26, 2018, Source: Huawei, Title: Further discussions on the content of serving cell info.
R3-180367 3GPP TSG-RAN WG3 NR Ad Hoc, Sophia Antipolis, France, Jan. 22-26, 2018, Source: Huawei, Title: Further discussions on confirmation to gNB-DU about completion of RRC messages.
R3-180425 3GPP TSG-RAN WG3 NR Ad Hoc, Sophia Antipolis, France, Jan. 22-26, 2018, Source: Ericsson, Title: UE radio capabilities over F1.
R3-180426 3GPP TSG-RAN WG3 NR Ad Hoc, Sophia Antipolis, France, Jan. 22-26, 2018, Source: Ericsson, Title: Cell information over F1.
R3-180427 3GPP TSG-RAN WG3 NR Ad Hoc, Sophia Antipolis, France, Jan. 22-26, 2018, Source: Ericsson, Title: UE Context Setup over the F1.
R3-180428 3GPP TSG-RAN WG3 NR Ad Hoc, Sophia Antipolis, France, Jan. 22-26, 2018, Source: Ericsson, Title: UE Reject Indication and gNB-DU admission result.
R3-180429 3GPP TSG-RAN WG3 NR Ad Hoc, Sophia Antipolis, France, Jan. 22-26, 2018, Source: Ericsson, Title: Further analysis on inactivity monitoring.
R3-180430 3GPP TSG-RAN WG3 NR Ad Hoc, Sophia Antipolis, France, Jan. 22-26, 2018, Source: Ericsson, Title: Creation of signalling connection.
R3-180431 3GPP TSG-RAN WG3 NR Ad Hoc, Sophia Antipolis, France, Jan. 22-26, 2018, Source: Ericsson, Title: RRC Container in UE Context Setup Request.
R3-180432 3GPP TSG-RAN WG3 NR Ad Hoc, Sophia Antipolis, France, Jan. 22-26, 2018, Source: Ericsson, Title: RLC mode indication.
R3-180433 3GPP TSG-RAN WG3 NR Ad Hoc, Sophia Antipolis, France, Jan. 22-26, 2018, Source: Ericsson, Title: Introduction of UE Reconfiguration Complete procedure.
R3-180518 3GPP TSG-RAN WG3 NR Ad Hoc, Sophia Antipolis, France, Jan. 22-26, 2018, Source: Ericsson, Vodafone, Title: UE context Setup over the F1.
R3-180596 3GPP TSG-RAN WG3 NR Ad Hoc, Sophia Antipolis, France, Jan. 22-26, 2018, Source: Ericsson, Title: UE Reject Indication.
R3-180599 3GPP TSG-RAN WG3 NR Ad Hoc, Sophia Antipolis, France, Jan. 22-26, 2018, Source: Huawei, Title: pCR to 38.473 on UE context management for mobility handling for SA operation.

(56) References Cited

OTHER PUBLICATIONS

R3-180606 3GPP TSG-RAN WG3 NR Ad Hoc, Sophia Antipolis, France, Jan. 22-26, 2018, Source: NTT Docomo, Inc., Title: Summary of offline discussion on CU-DU QoS handling.
R3-180807 3GPP TSG-RAN WG3 Meeting #99, Athens, Greece, Feb. 26-Mar. 2, 2018, Source: CATT, Title: Discussion on activation of PDCP Duplication.
R3-181732 3GPP TSG RAN WG3 Meeting #99bis, Sanya, China, Apr. 16-20, 2018, Source: ZTE, Title: Bearer Context Modification over E1 interface for TS38.460.
R3-181733 3GPP TSG RAN WG3 Meeting #99bis, Sanya, China, Apr. 16-20, 2018, Source: ZTE, Title: Bearer Context Modification over E1 interface for TS38.463.
R3-181735 3GPP TSG RAN WG3 Meeting #99bis, Sanya, China, Apr. 16-20, 2018, Source: ZTE, Title: Discussion on PDCP COUNT wrap around.
R3-181736 3GPP TSG RAN WG3 Meeting #99bis, Sanya, China, Apr. 16-20, 2018, Source: ZTE, Title: Discussion on E1 interface setup.
R3-181833 3GPP TSG RAN WG3 Meeting #99bis, Sanya, China, Apr. 16-20, 2018, Source: NEC (Rapporteur), Title: Baseline CR for June version of TS 38.401 covering agreements of RAN3#99 on CPUP_Split.
R3-181842 3GPP TSG RAN WG3 Meeting #99bis, Sanya, China, Apr. 16-20, 2018, Source: Nokia, Nokia Shanghai Bell, Title: (TP for CPUP_Split BL CR for TS 38.401) Support of change of gNB-CU-UP.
R3-181843 3GPP TSG RAN WG3 Meeting #99bis, Sanya, China, Apr. 16-20, 2018, Source: Nokia, Nokia Shanghai Bell, Title: (TP for CPUP_Split BL CR for TS 38.401) FFS resolution for E1 overall procedures.
R3-181844 3GPP TSG RAN WG3 Meeting #99bis, Sanya, China, Apr. 16-20, 2018, Source: Nokia, Nokia Shanghai Bell, Title: Definition of gNB-CU-CP/UP.
R3-181845 3GPP TSG RAN WG3 Meeting #99bis, Sanya, China, Apr. 16-20, 2018, Source: Nokia, Nokia Shanghai Bell, Title: E1 non-UE associated functions.
R3-181846 3GPP TSG RAN WG3 Meeting #99bis, Sanya, China, Apr. 16-20, 2018, Source: Nokia, Nokia Shanghai Bell, Title: E1 non-UE associated procedures.
R3-181847 3GPP TSG RAN WG3 Meeting #99bis, Sanya, China, Apr. 16-20, 2018, Source: Nokia, Nokia Shanghai Bell, Title: gNB-CU-UP notification function.
R3-181848 3GPP TSG RAN WG3 Meeting #99bis, Sanya, China, Apr. 16-20, 2018, Source: Nokia, Nokia Shanghai Bell, Title: gNB-CU-UP notification procedure.
R3-181849 3GPP TSG RAN WG3 Meeting #99bis, Sanya, China, Apr. 16-20, 2018, Source: Nokia, Nokia Shanghai Bell, Title: Bearer Context Management procedures.
R3-181850 3GPP TSG RAN WG3 Meeting #99bis, Sanya, China, Apr. 16-20, 2018, Source: Nokia, Nokia Shanghai Bell, Title: Signalling transport for E1.
R3-181893 3GPP TSG RAN WG3 Meeting #99bis, Sanya, China, Apr. 16-20, 2018, Source: LG Electronics, KT Corp., Title: Procedures for Security Support in CU-CP/UP Separation.
R3-182056 3GPP TSG RAN WG3 Meeting #99bis, Sanya, China, Apr. 16-20, 2018, Source: LG Electronics, KT Corp., Title: Discussion on Bearer Context Modification.
R3-182078 3GPP TSG RAN WG3 Meeting #99bis, Sanya, China, Apr. 16-20, 2018, Source: Samsung, Title: E1 interface management procedures.
R3-182079 3GPP TSG RAN WG3 Meeting #99bis, Sanya, China, Apr. 16-20, 2018, Source: Samsung, Title: CU-UP Security Capability indication to CU-CP.
R3-182080 3GPP TSG RAN WG3 Meeting #99bis, Sanya, China, Apr. 16-20, 2018, Source: Samsung, Title: TP for TS 38.463 on E1 interface management.
R3-182081 3GPP TSG RAN WG3 Meeting #99bis, Sanya, China, Apr. 16-20, 2018, Source: Samsung, Title: Additional UE-associated E1 procedures.
R3-182082 3GPP TSG RAN WG3 Meeting #99bis, Sanya, China, Apr. 16-20, 2018, Source: Samsung, Title: TP for TS 38.463 on additional UE-associated E1 procedures.
R3-182109 3GPP TSG RAN WG3 Meeting #99bis, Sanya, China, Apr. 16-20, 2018, Source: Huawei, Title: Initial TPs to 38.462.
R3-182110 3GPP TSG RAN WG3 Meeting #99bis, Sanya, China, Apr. 16-20, 2018, Source: Huawei, Title: Rapporteur editorial updates to 38.462.
R3-182129 3GPP TSG RAN WG3 Meeting #99bis, Sanya, China, Apr. 16-20, 2018, Source: Huawei, Title: Inactivity monitoring in CP/UP separation.
R3-182130 3GPP TSG RAN WG3 Meeting #99bis, Sanya, China, Apr. 16-20, 2018, Source: Huawei, Title: (TP for NR BL CR for TS 38.401) On RRC state transition for CP-UP separation.
R3-182131 3GPP TSG RAN WG3 Meeting #99bis, Sanya, China, Apr. 16-20, 2018, Source: Huawei, Title: Data Forwarding in CP/UP separation.
R3-182132 3GPP TSG RAN WG3 Meeting #99bis, Sanya, China, Apr. 16-20, 2018, Source: Huawei, Title: pCR to 38.460 on QoS handling over E1.
R3-182134 3GPP TSG RAN WG3 Meeting #99bis, Sanya, China, Apr. 16-20, 2018, Source: Huawei, Title: pCR to 38.460 on secondary node modification triggered by gNB-CU-CP.
R3-182136 3GPP TSG RAN WG3 Meeting #99bis, Sanya, China, Apr. 16-20, 2018, Source: Huawei, Title: pCR to 38.460 on centralized retransmission for CP-UP separation.
R3-182224 3GPP TSG RAN WG3 Meeting #99bis, Sanya, China, Apr. 16-20, 2018, Source: Ericsson, Title: E1 support for RRC-inactive.
R3-182225 3GPP TSG RAN WG3 Meeting #99bis, Sanya, China, Apr. 16-20, 2018, Source: Ericsson, Title: Dual-connectivity configuration over E1.
R3-182226 3GPP TSG RAN WG3 Meeting #99bis, Sanya, China, Apr. 16-20, 2018, Source: Ericsson, Title: Potentials of RAN UP network function virtualization.
R3-182227 3GPP TSG RAN WG3 Meeting #99bis, Sanya, China, Feb. 26-Mar. 2, 2018, Source: Ericsson, Title: PDCP duplication configuration.
R3-182228 3GPP TSG RAN WG3 Meeting #99bis, Sanya, China, Apr. 16-20, 2018, Source: Ericsson, Vodafone, KT, AT&T, Title: Support of RAN UP network function virtualization at handover.
R3-182229 3GPP TSG RAN WG3 Meeting #99bis, Sanya, China, Apr. 16-20, 2018, Source: Ericsson, Title: Support of RAN UP network function virtualization at handover—for 38.300.
R3-182230 3GPP TSG RAN WG3 Meeting #99bis, Sanya, China, Apr. 16-20, 2018, Source: Ericsson, Title: Support of RAN UP network function virtualization at handover—for 38.413.
R3-182231 3GPP TSG RAN WG3 Meeting #99bis, Sanya, China, Apr. 16-20, 2018, Source: Ericsson, Title: Support of RAN UP network function virtualization at handover—for 38.423.
R3-182232 3GPP TSG RAN WG3 Meeting #99bis, Sanya, China, Apr. 16-20, 2018, Source: Ericsson, Title: Support of RAN UP network function virtualization at handover—for 36.300.
R3-182233 3GPP TSG RAN WG3 Meeting #99bis, Sanya, China, Apr. 16-20, 2018, Source: Ericsson, Title: Bearer Context definition.
R3-182234 3GPP TSG RAN WG3 Meeting #99bis, Sanya, China, Apr. 16-20, 2018, Source: Ericsson, Title: Resolve FFS in procedures in TS 38.401.
R3-182235 3GPP TSG RAN WG3 Meeting #99bis, Sanya, China, Apr. 16-20, 2018, Source: Ericsson, Title: Multiple TNL associations over E1.
R3-182237 3GPP TSG RAN WG3 Meeting #99bis, Sanya, China, Apr. 16-20, 2018, Source: Ericsson, Title: E1 Setup procedure.
R3-182238 3GPP TSG RAN WG3 Meeting #99bis, Sanya, China, Apr. 16-20, 2018, Source: Ericsson, Title: E1 Reset procedure.
R3-182239 3GPP TSG RAN WG3 Meeting #99bis, Sanya, China, Apr. 16-20, 2018, Source: Ericsson, Title: E1 Release procedure.
R3-182240 3GPP TSG RAN WG3 Meeting #99bis, Sanya, China, Apr. 16-20, 2018, Source: Ericsson, Title: E1 Error Indication.
R3-182241 3GPP TSG RAN WG3 Meeting #99bis, Sanya, China, Apr. 16-20, 2018, Source: Ericsson, Title: Bearer Context Modification procedure.

(56) References Cited

OTHER PUBLICATIONS

R3-182242 3GPP TSG RAN WG3 Meeting #99bis, Sanya, China, Apr. 16-20, 2018, Source: Ericsson, Title: E1 Configuration Update.

* cited by examiner

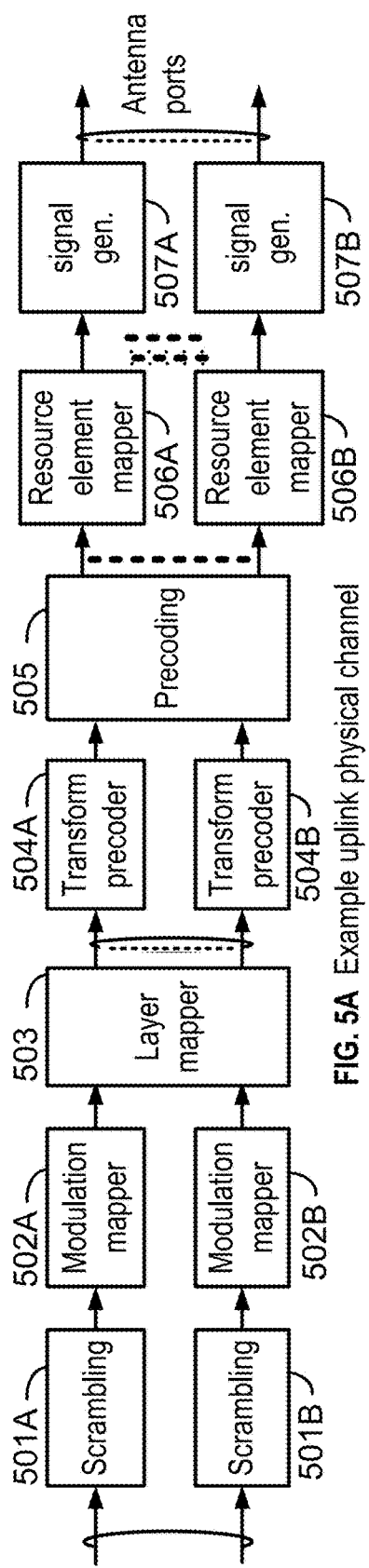
FIG. 5A Example uplink physical channel
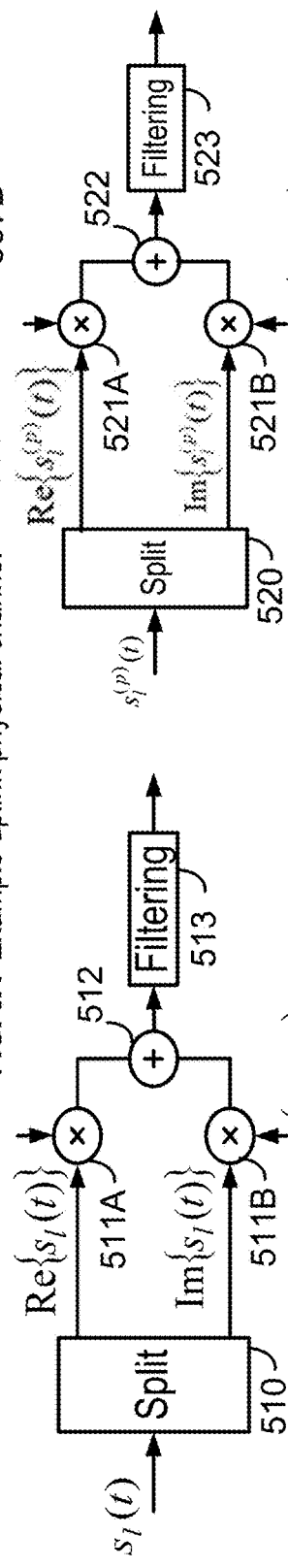
FIG. 5B Example uplink modulation
FIG. 5D Example downlink modulation
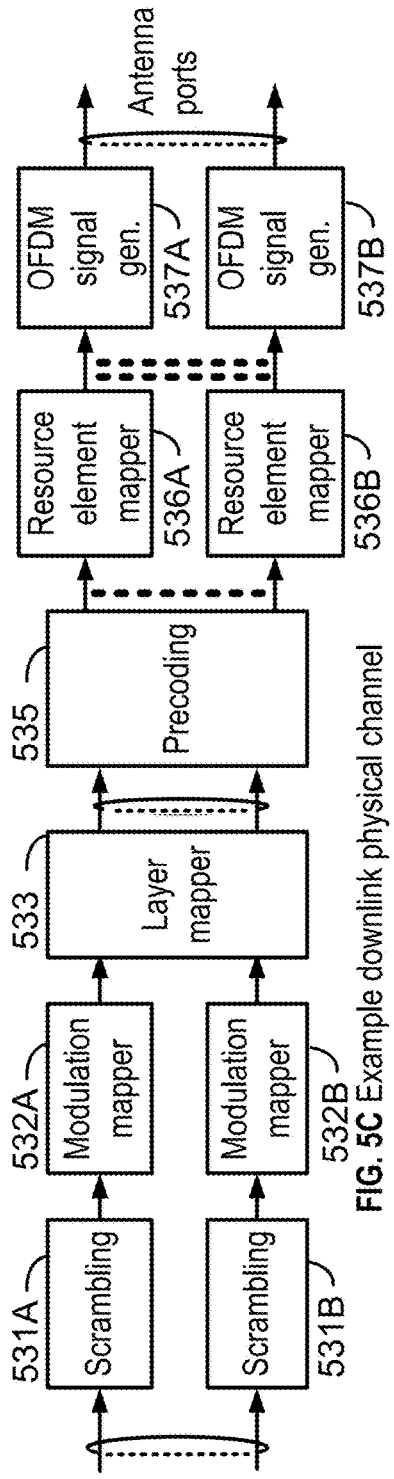
FIG. 5C Example downlink physical channel

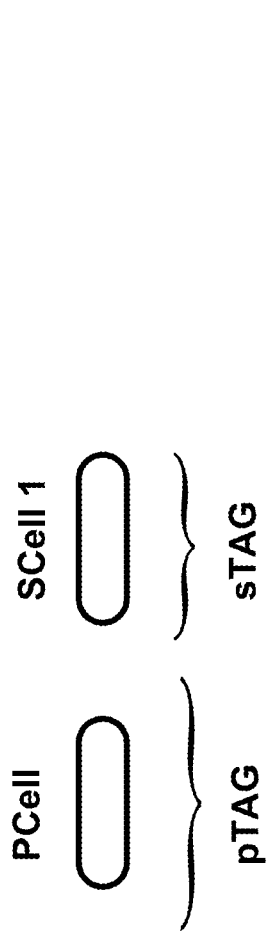
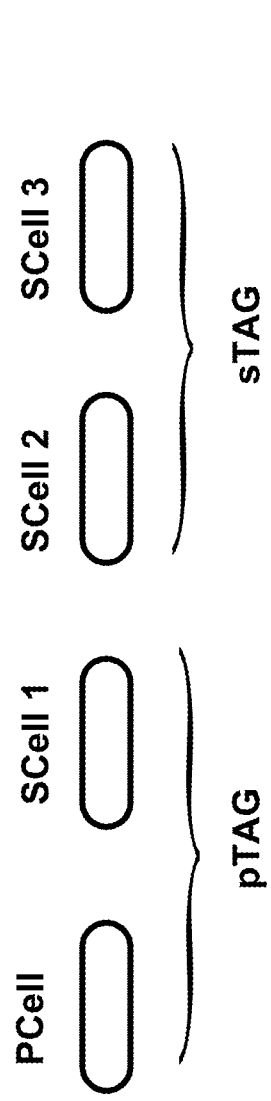
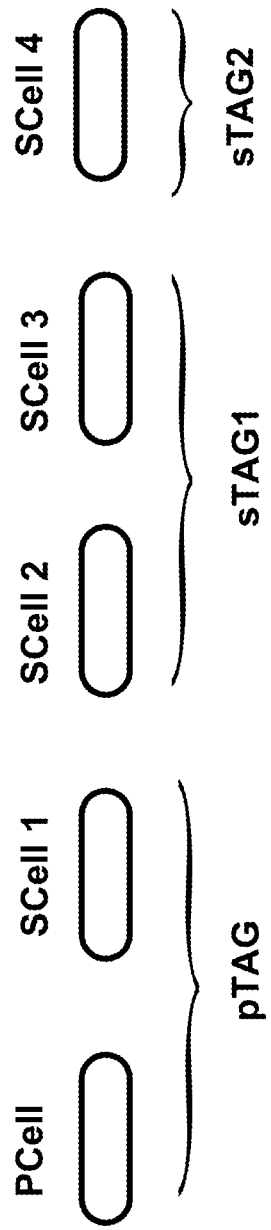
FIG. 8

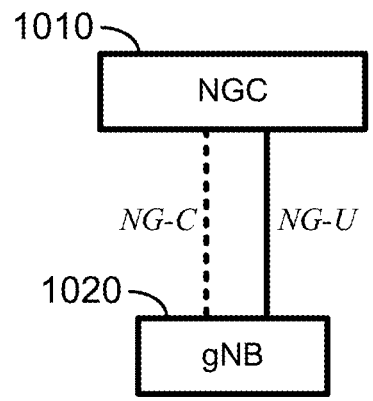
FIG. 10A gNB connected to NGC
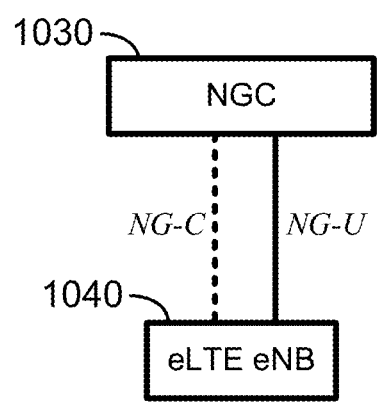
FIG. 10B eLTE eNB connected to NGC

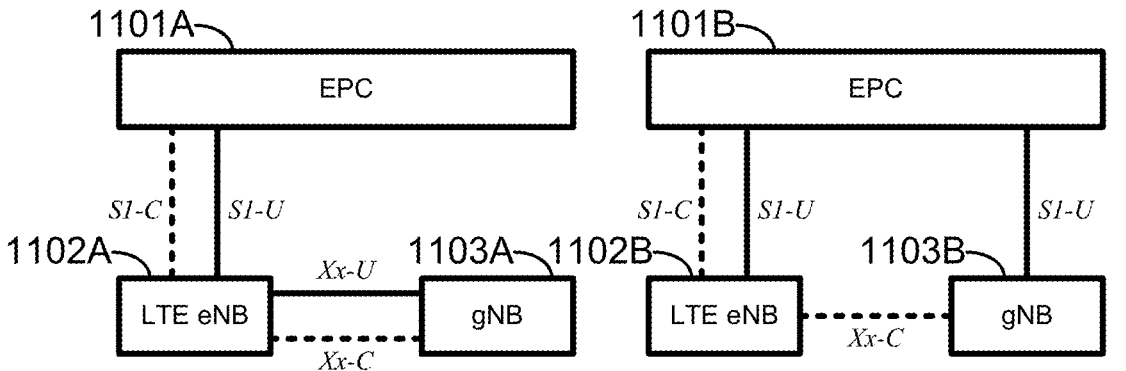

FIG. 11A LTE eNB connected to EPC with non-standalone gNB.
gNB user plane connected to EPC via LTE eNB.

FIG. 11B LTE eNB connected to EPC with non-standalone gNB.
gNB user plane connected to EPC directly.

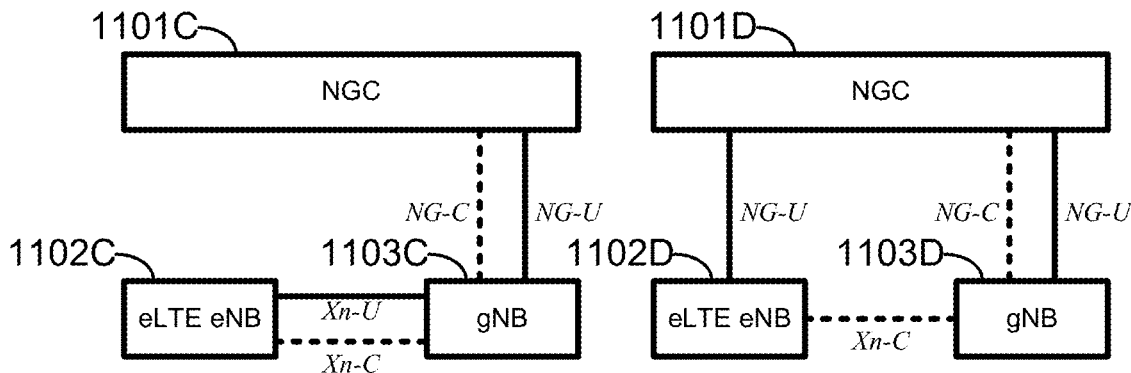

FIG. 11C gNB connected to NGC with non-standalone eLTE eNB.
eLTE eNB user plane connected to NGC via gNB.

FIG. 11D gNB connected to NGC with non-standalone eLTE eNB.
eLTE eNB user plane connected to NGC directly.

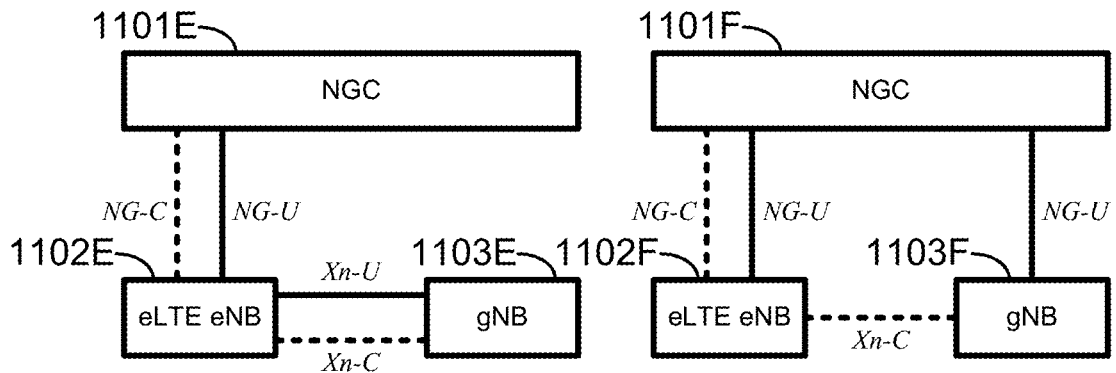

FIG. 11E eLTE eNB connected to NGC with non-standalone gNB.
gNB user plane connected to NGC via eLTE eNB.

FIG. 11F eLTE eNB connected to NGC with non-standalone gNB.
gNB user plane connected to NGC directly.

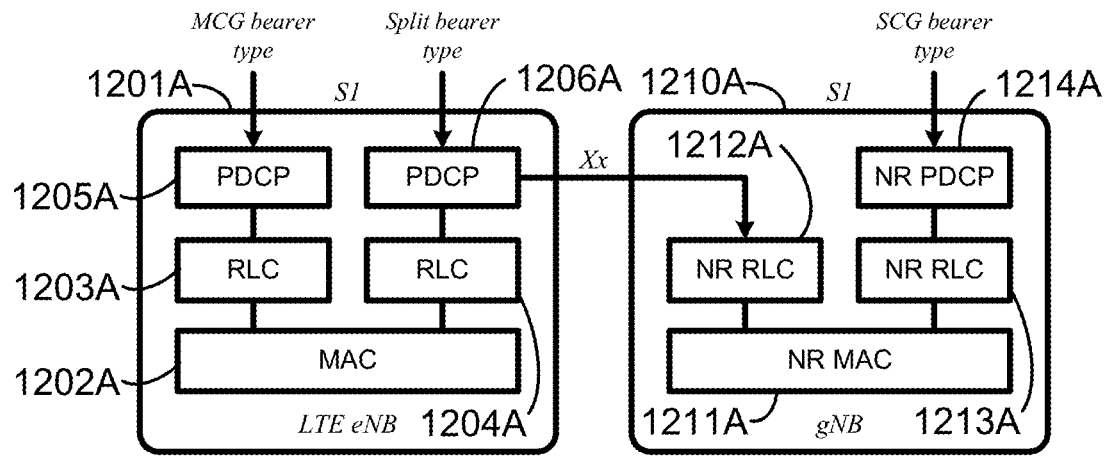
FIG. 12A Radio protocol architecture for split bearer and SCG bearer. LTE eNB connected to EPC with non-standalone gNB.
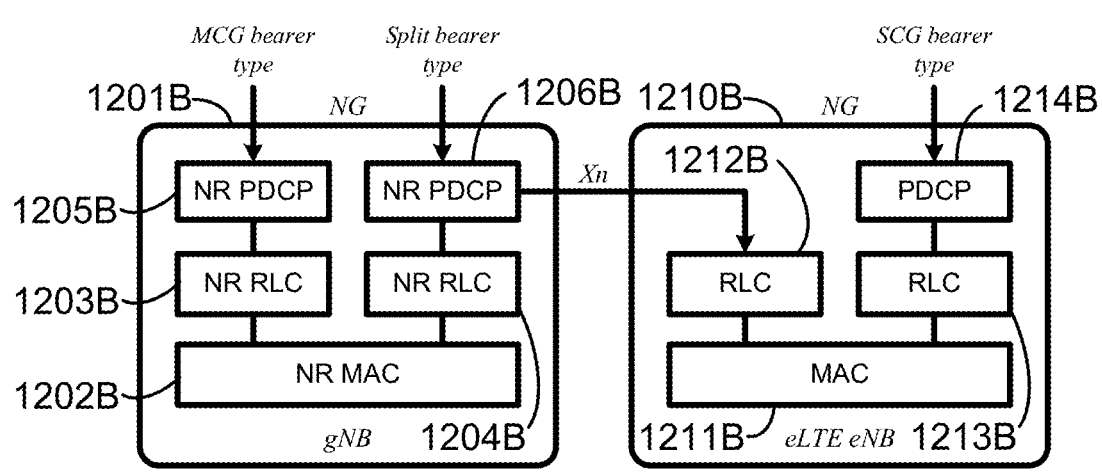
FIG. 12B Radio protocol architecture for split bearer and SCG bearer. gNB connected to NGC with non-standalone eLTE eNB.
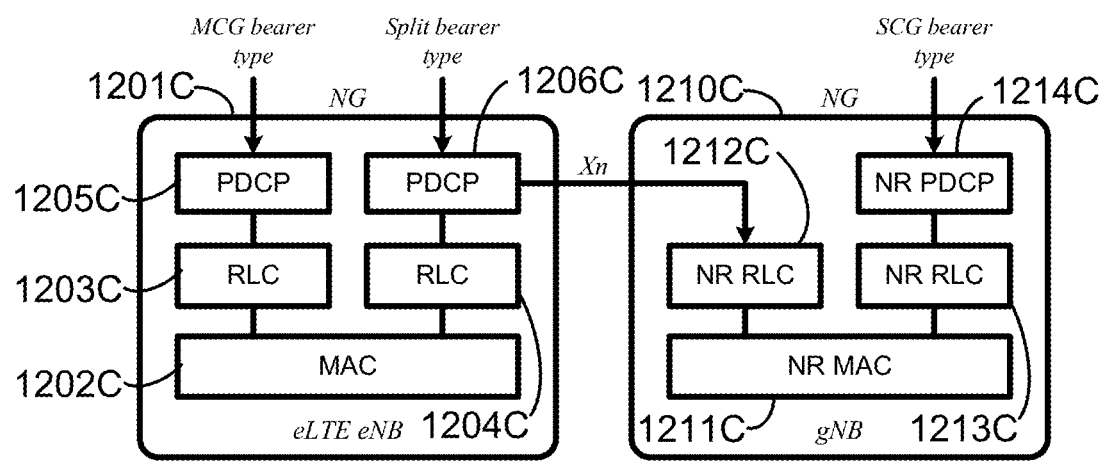
FIG. 12C Radio protocol architecture for split bearer and SCG bearer. eLTE eNB connected to NGC with non-standalone gNB.

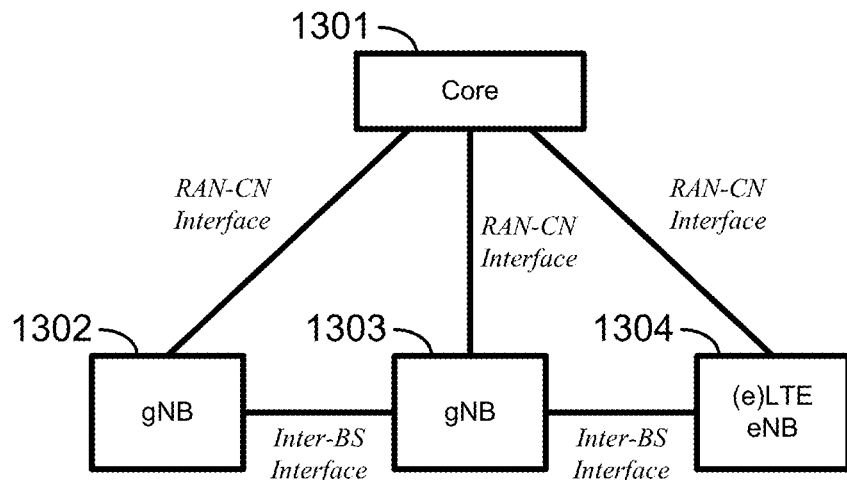
FIG. 13A Non-centralized deployment
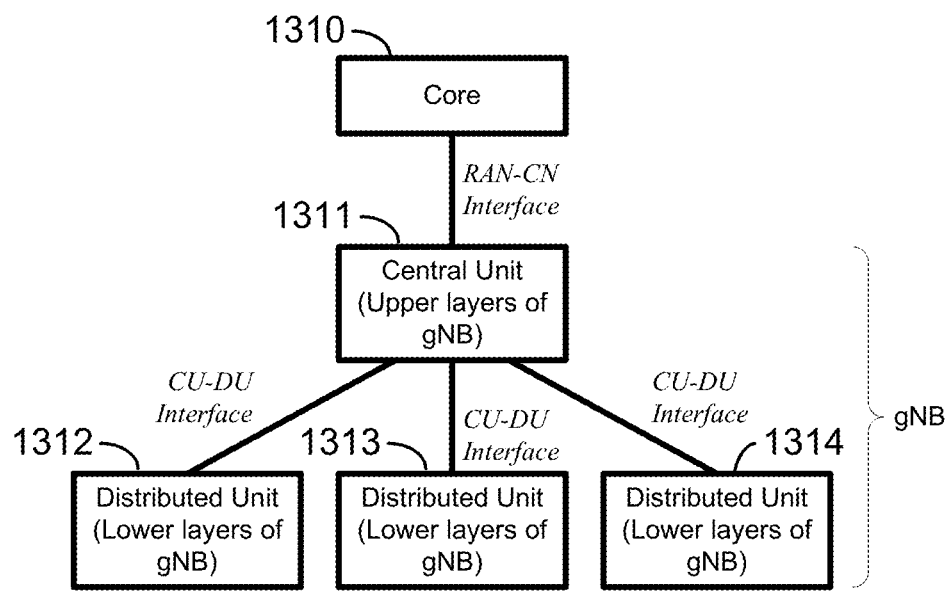
FIG. 13B Centralized deployment

CONNECTION FAILURE INFORMATION FOR PACKET DUPLICATION

CROSS-REFERENCE TO RELATED APPLICATIONS

This application is a continuation of U.S. application Ser. No. 16/918,577, filed Jul. 1, 2020, which is a continuation of U.S. application Ser. No. 16/130,696, filed Sep. 13, 2018, now U.S. Pat. No. 10,757,615, which claims the benefit of U.S. Provisional Application No. 62/558,116, filed on Sep. 13, 2017, the contents of which are hereby incorporated by reference in their entireties for all purposes.

BACKGROUND

In wireless communications, communication failures may occur. If a communication failure is detected, such as a radio link failure, difficulties may arise in compensating for the communication failure.

SUMMARY

The following summary presents a simplified summary of certain features. The summary is not an extensive overview and is not intended to identify key or critical elements.

Systems, apparatuses, and methods are described for communications associated with communication failures. Radio link failure reports may be generated based on the communication failures and transmitted to one or more devices. The radio link failure reports may indicate whether a packet duplication may have occurred. The one or more devices (e.g., base stations or wireless devices) may adjust configuration parameters based on the radio link failure reports. If a handover occurs, radio link failure reports may be communicated between devices to promote more effective communication and to avoid further errors based on identified issues.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 5A, FIG. 5B, FIG. 5C and FIG. 5D show examples for uplink and downlink signal transmission.

FIG. 8 shows example timing advance group (TAG) configurations.

FIG. 10A and FIG. 10B show examples for interfaces between a 5G core network and base stations.

FIG. 11A, FIG. 11B, FIG. 11C, FIG. 11D, FIG. 11E, and FIG. 11F show examples for architectures of tight interworking between a 5G RAN and a long term evolution (LTE) radio access network (RAN).

FIG. 12A, FIG. 12B, and FIG. 12C show examples for radio protocol structures of tight interworking bearers.

FIG. 13A and FIG. 13B show examples for gNodeB (gNB) deployment.

DETAILED DESCRIPTION

Figure 1:
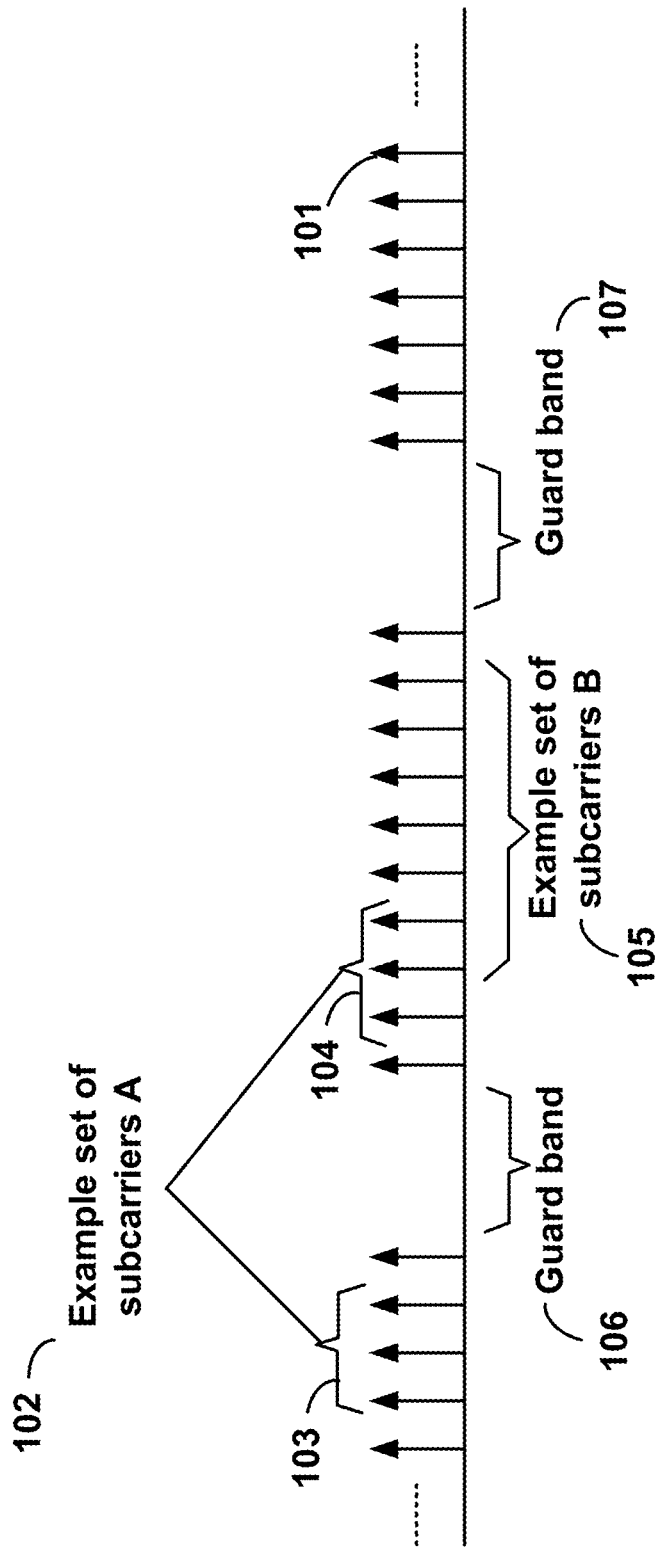
FIG. 1 shows example sets of orthogonal frequency division multiplexing (OFDM) subcarriers.

The accompanying drawings, which form a part hereof, show examples of the disclosure. It is to be understood that the examples shown in the drawings and/or discussed herein are non-exclusive and that there are other examples of how the disclosure may be practiced.

Examples may enable operation of carrier aggregation and may be employed in the technical field of multicarrier communication systems. Examples may relate to radio link failure in multicarrier communication systems.

The following acronyms are used throughout the present disclosure, provided below for convenience although other acronyms may be introduced in the detailed description:

3GPP 3rd Generation Partnership Project
5G 5th generation wireless systems
5GC 5G Core Network
ACK Acknowledgement
AMF Access and Mobility Management Function
ASIC application-specific integrated circuit
BPSK binary phase shift keying
CA carrier aggregation
CC component carrier
CDMA code division multiple access
CP cyclic prefix
CPLD complex programmable logic devices
CSI channel state information
CSS common search space
CU central unit
DC dual connectivity
DCI downlink control information
DFTS-OFDM discrete Fourier transform spreading OFDM
DL downlink
DU distributed unit
eLTE enhanced LTE
eMBB enhanced mobile broadband
eNB evolved Node B
EPC evolved packet core
E-UTRAN evolved-universal terrestrial radio access network
FDD frequency division multiplexing
FPGA field programmable gate arrays Fs-C Fs-control plane
Fs-U Fs-user plane
gNB next generation node B
HARQ hybrid automatic repeat request
HDL hardware description languages
ID identifier
IE information element
LTE long term evolution
MAC media access control
MCG master cell group
MeNB master evolved node B
MIB master information block
MME mobility management entity
mMTC massive machine type communications
NACK Negative Acknowledgement
NAS non-access stratum
NG CP next generation control plane core
NGC next generation core
NG-C NG-control plane
NG-U NG-user plane
NR MAC new radio MAC
NR PDCP new radio PDCP
NR PHY new radio physical
NR RLC new radio RLC
NR RRC new radio RRC
NR new radio
NSSAI network slice selection assistance information
OFDM orthogonal frequency division multiplexing
PCC primary component carrier
PCell primary cell
PDCCH physical downlink control channel
PDCP packet data convergence protocol
PDU packet data unit
PHICH physical HARQ indicator channel
PHY physical
PLMN public land mobile network
PSCell primary secondary cell
pTAG primary timing advance group
PUCCH physical uplink control channel
PUSCH physical uplink shared channel
QAM quadrature amplitude modulation
QPSK quadrature phase shift keying
RA random access
RACH random access channel
RAN radio access network
RAP random access preamble
RAR random access response
RB resource blocks
RBG resource block groups
RLC radio link control
RRC radio resource control
RRM radio resource management
RV redundancy version
SCC secondary component carrier
SCell secondary cell
SCG secondary cell group
SC-OFDM single carrier-OFDM
SDU service data unit
SeNB secondary evolved node B
SFN system frame number
S-GW serving gateway
SIB system information block
SC-OFDM single carrier orthogonal frequency division multiplexing
SRB signaling radio bearer
sTAG(s) secondary timing advance group(s)
TA timing advance
TAG timing advance group
TAI tracking area identifier
TAT time alignment timer
TDD time division duplexing
TDMA time division multiple access
TTI transmission time interval
TB transport block
UE user equipment
UL uplink
UPGW user plane gateway
URLLC ultra-reliable low-latency communications
VHDL VHSIC hardware description language
Xn-C Xn-control plane
Xn-U Xn-user plane
Xx-C Xx-control plane
Xx-U Xx-user plane Examples may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be used for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 shows example sets of OFDM subcarriers. As shown in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is shown as an example, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As shown in FIG. 1, guard band 106 is between subcarriers 103 and subcarriers 104. The example set of subcarriers A 102 includes subcarriers 103 and subcarriers 104. FIG. 1 also shows an example set of subcarriers B 105. As shown, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
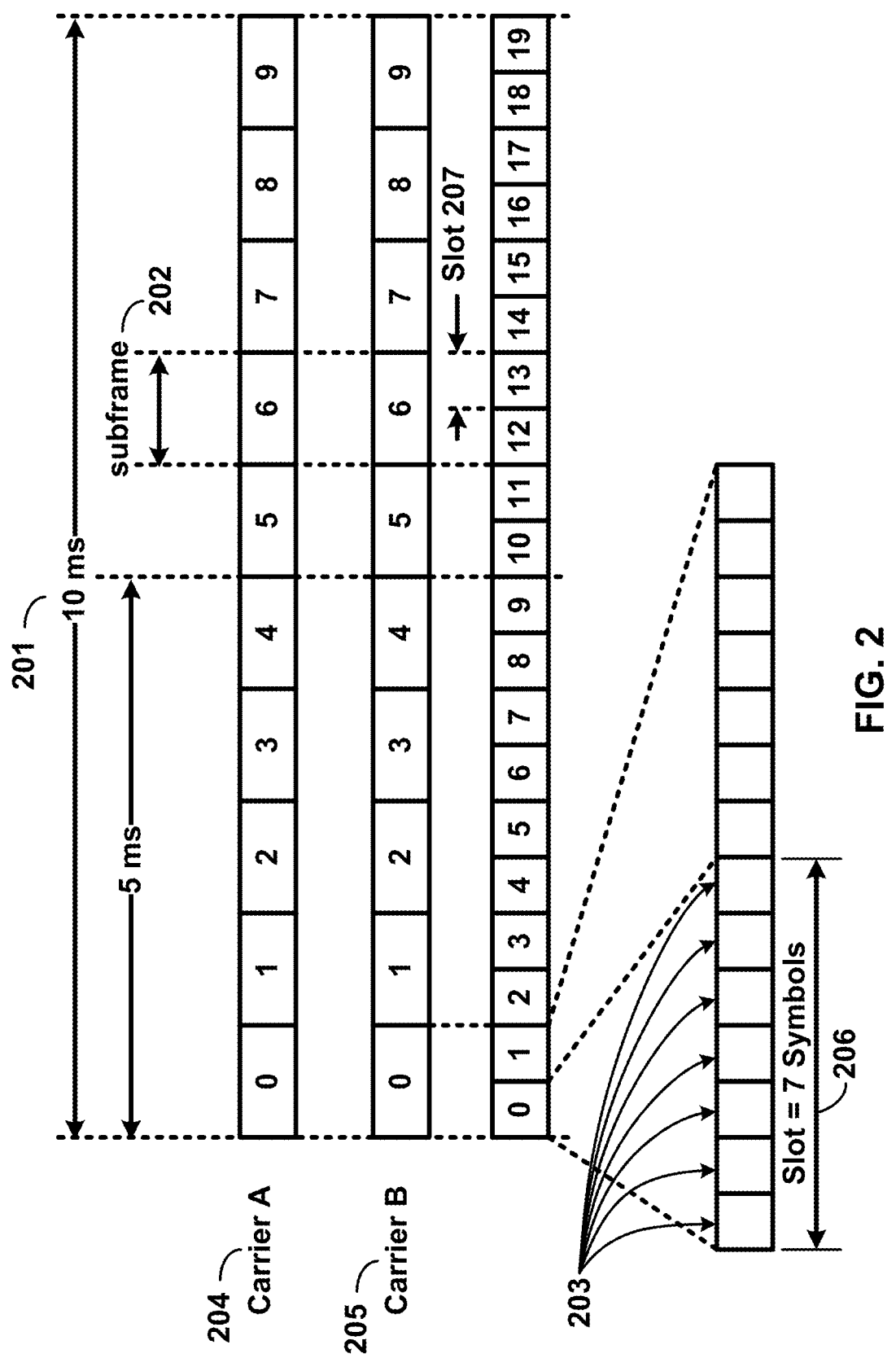
FIG. 2 shows example transmission time and reception time for two carriers in a carrier group.

FIG. 2 shows an example timing arrangement with transmission time and reception time for two carriers. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 milliseconds (msec). Other frame durations, for example, in the range of 1 to 100 msec may also be supported. In this example, each 10 msec radio frame 201 may be divided into ten equally sized subframes 202. Other subframe durations such as including 0.5 msec, 1 msec, 2 msec, and 5 msec may also be supported. Subframe(s) may consist of two or more slots (e.g., slots 206 and 207). For the example of FDD, 10 subframes may be available for downlink transmission and 10 subframes may be available for uplink transmissions in each 10 msec interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may include all downlink, all uplink, or a downlink part and an uplink part, and/or alike. Slot aggregation may be supported, e.g., data transmission may be scheduled to span one or multiple slots. For example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
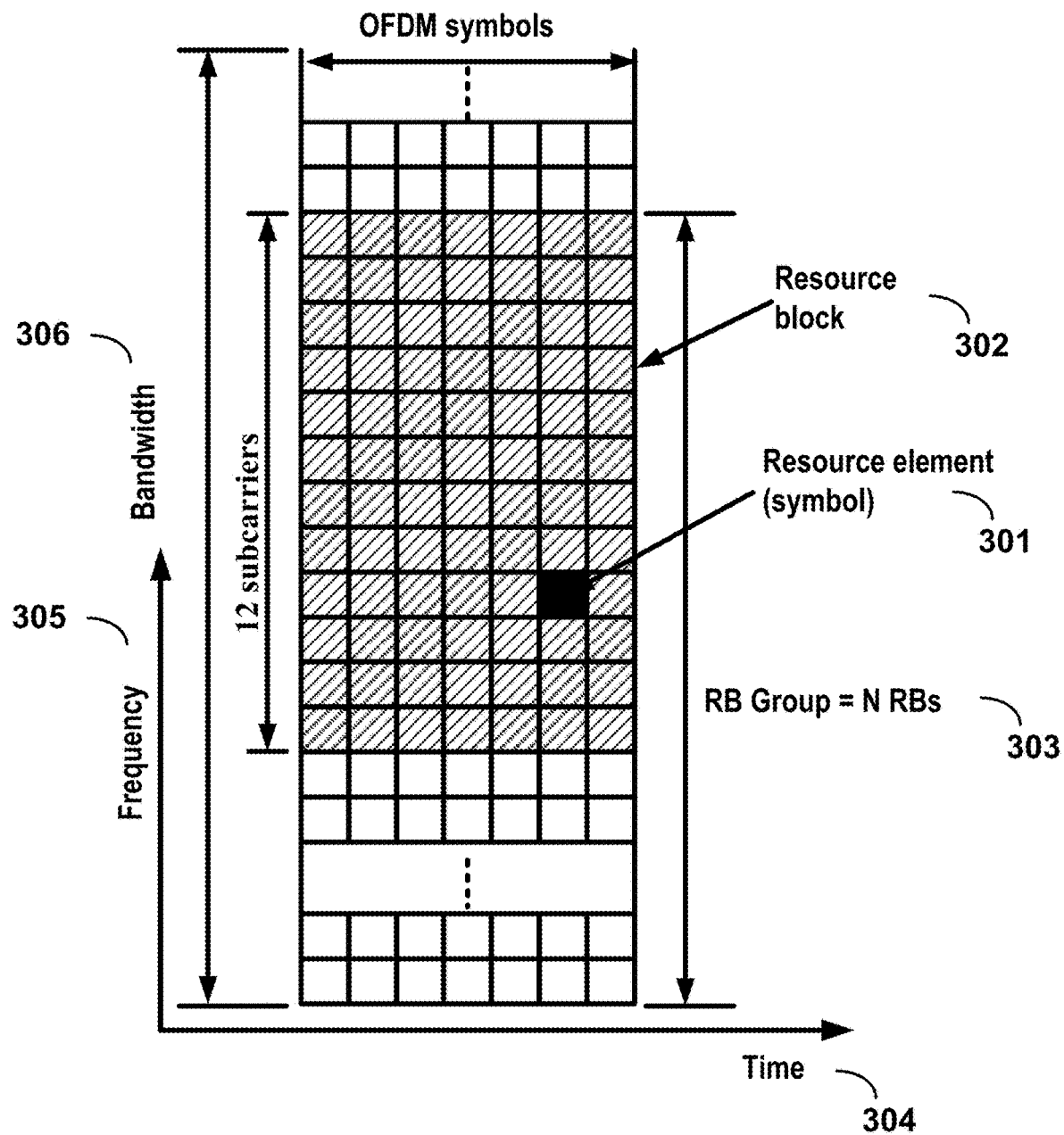
FIG. 3 shows example OFDM radio resources.

FIG. 3 shows an example of OFDM radio resources. The resource grid structure in time 304 and frequency 305 is shown in FIG. 3. The quantity of downlink subcarriers or RBs may depend, at least in part, on the downlink transmission bandwidth 306 configured in the cell. The smallest radio resource unit may be called a resource element (e.g., 301). Resource elements may be grouped into resource blocks (e.g., 302). Resource blocks may be grouped into larger radio resources called Resource Block Groups (RBG) (e.g., 303). The transmitted signal in slot 206 may be described by one or several resource grids of a plurality of subcarriers and a plurality of OFDM symbols. Resource blocks may be used to describe the mapping of certain physical channels to resource elements. Other predefined groupings of physical resource elements may be implemented in the system depending on the radio technology. For example, 24 subcarriers may be grouped as a radio block for a duration of 5 msec. A resource block may correspond to one slot in the time domain and 180 kHz in the frequency domain (for 15 kHz subcarrier bandwidth and 12 subcarriers).

Multiple numerologies may be supported. A numerology may be derived by scaling a basic subcarrier spacing by an integer N. Scalable numerology may allow at least from 15 kHz to 480 kHz subcarrier spacing. The numerology with 15 kHz and scaled numerology with different subcarrier spacing with the same CP overhead may align at a symbol boundary every 1 msec in a NR carrier.

Figure 4:
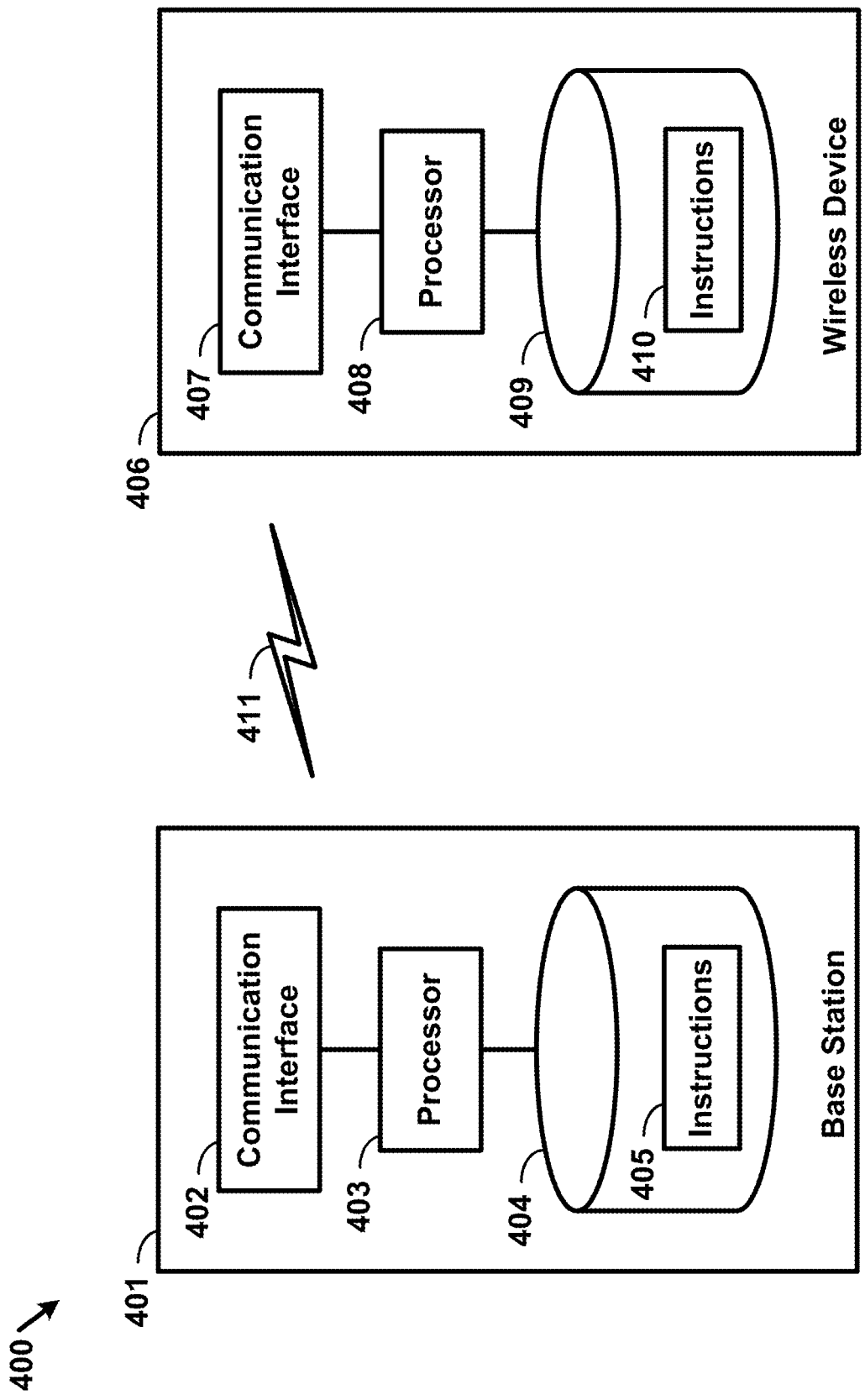
FIG. 4 shows hardware elements of a base station and a wireless device.

FIG. 4 shows hardware elements of a base station 401 and a wireless device 406. A communication network 400 may include at least one base station 401 and at least one wireless device 406. The base station 401 may include at least one communication interface 402, one or more processors 403, and at least one set of program code instructions 405 stored in non-transitory memory 404 and executable by the one or more processors 403. The wireless device 406 may include at least one communication interface 407, one or more processors 408, and at least one set of program code instructions 410 stored in non-transitory memory 409 and executable by the one or more processors 408. A communication interface 402 in the base station 401 may be configured to engage in communication with a communication interface 407 in the wireless device 406, such as via a communication path that includes at least one wireless link 411. The wireless link 411 may be a bi-directional link. The communication interface 407 in the wireless device 406 may also be configured to engage in communication with the communication interface 402 in the base station 401. The base station 401 and the wireless device 406 may be configured to send and receive data over the wireless link 411 using multiple frequency carriers. Base stations, wireless devices, and other communication devices may include structure and operations of transceiver(s). A transceiver is a device that includes both a transmitter and receiver. Transceivers may be employed in devices such as wireless devices, base stations, relay nodes, and/or the like. Examples for radio technology implemented in the communication interfaces 402, 407 and the wireless link 411 are shown in FIG. 1, FIG. 2, FIG. 3, FIG. 5, and associated text. The communication network 400 may comprise any number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network 400, and any other network referenced herein, may comprise an LTE network, a 5G network, or any other network for wireless communications. Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network. As used throughout, the term "base station" may comprise one or more of: a base station, a node, a Node B, a gNB, an eNB, an ng-eNB, a relay node (e.g., an integrated access and backhaul (IAB) node), a donor node (e.g., a donor eNB, a donor gNB, etc.), an access point (e.g., a Wi-Fi access point), a computing device, a device capable of wirelessly communicating, or any other device capable of sending and/or receiving signals. As used throughout, the term "wireless device" may comprise one or more of: a UE, a handset, a mobile device, a computing device, a node, a device capable of wirelessly communicating, or any other device capable of sending and/or receiving signals. Any reference to one or more of these terms/devices also considers use of any other term/device mentioned above.

The communications network 400 may comprise Radio Access Network (RAN) architecture. The RAN architecture may comprise one or more RAN nodes that may be a next generation Node B (gNB) (e.g., 401) providing New Radio (NR) user plane and control plane protocol terminations towards a first wireless device (e.g. 406). A RAN node may be a next generation evolved Node B (ng-eNB), providing Evolved UMTS Terrestrial Radio Access (E-UTRA) user plane and control plane protocol terminations towards a second wireless device. The first wireless device may communicate with a gNB over a Uu interface. The second wireless device may communicate with a ng-eNB over a Uu interface. Base station 401 may comprise one or more of a gNB, ng-eNB, and/or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of wireless devices in RRC_INACTIVE state, distribution function for Non-Access Stratum (NAS) messages, RAN sharing, and dual connectivity or tight interworking between NR and E-UTRA.

One or more gNBs and/or one or more ng-eNBs may be interconnected with each other by means of Xn interface. A gNB or an ng-eNB may be connected by means of NG interfaces to 5G Core Network (5GC). 5GC may comprise one or more AMF/User Plane Function (UPF) functions. A gNB or an ng-eNB may be connected to a UPF by means of an NG-User plane (NG-U) interface. The NG-U interface may provide delivery (e.g., non-guaranteed delivery) of user plane Protocol Data Units (PDUs) between a RAN node and the UPF. A gNB or an ng-eNB may be connected to an AMF by means of an NG-Control plane (e.g., NG-C) interface. The NG-C interface may provide functions such as NG interface management, UE context management, UE mobility management, transport of NAS messages, paging, PDU session management, configuration transfer or warning message transmission.

A UPF may host functions such as anchor point for intra-/inter-Radio Access Technology (RAT) mobility (if applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

An AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or a non-operational state. Configured may also refer to specific settings in a device that effect the operational characteristics of the device whether the device is in an operational or a non-operational state. In other words, the hardware, software, firmware, registers, memory values, and/or the like may be "configured" within a device, whether the device is in an operational or a nonoperational state, to provide the device with specific characteristics. Terms such as "a control message to cause in a device" may mean that a control message has parameters that may be used to configure specific characteristics in the device, whether the device is in an operational or a non-operational state.

A network may include a multitude of base stations, providing a user plane NR PDCP/NR RLC/NR MAC/NR PHY and control plane (e.g., NR RRC) protocol terminations towards the wireless device. The base station(s) may be interconnected with other base station(s) (e.g., employing an Xn interface). The base stations may also be connected employing, for example, an NG interface to an NGC. FIG. 10A and FIG. 10B show examples for interfaces between a 5G core network (e.g., NGC) and base stations (e.g., gNB and eLTE eNB). For example, the base stations may be interconnected to the NGC control plane (e.g., NG CP) employing the NG-C interface and to the NGC user plane (e.g., UPGW) employing the NG-U interface. The NG interface may support a many-to-many relation between 5G core networks and base stations.

A base station may include many sectors, for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g., TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC); in the uplink, the carrier corresponding to the PCell may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC); in the uplink, the carrier corresponding to an SCell may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or cell index may also identify the downlink carrier or uplink carrier of the cell (depending on the context in which it is used). The cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, reference to a first physical cell ID for a first downlink carrier may indicate that the first physical cell ID is for a cell comprising the first downlink carrier. The same concept may apply to, for example, carrier activation. Reference to a first carrier that is activated may indicate that the cell comprising the first carrier is activated.

A device may be configured to operate as needed by freely combining any of the examples. The disclosed mechanisms may be performed if certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. One or more criteria may be satisfied. It may be possible to implement examples that selectively implement disclosed protocols.

A base station may communicate with a variety of wireless devices. Wireless devices may support multiple technologies, and/or multiple releases of the same technology. Wireless devices may have some specific capability(ies) depending on its wireless device category and/or capability(ies). A base station may comprise multiple sectors. Reference to a base station communicating with a plurality of wireless devices may indicate that a base station may communicate with a subset of the total wireless devices in a coverage area. A plurality of wireless devices of a given LTE or 5G release, with a given capability and in a given sector of the base station, may be used. The plurality of wireless devices may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

A base station may transmit (e.g., to a wireless device) one or more messages (e.g. RRC messages) that may comprise a plurality of configuration parameters for one or more cells. One or more cells may comprise at least one primary cell and at least one secondary cell. An RRC message may be broadcasted or unicasted to the wireless device. Configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). The other SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may send its radio access capability information which may be static. A base station may request what capabilities for a wireless device to report based on band information. If allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

If CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. If adding a new SCell, dedicated RRC signaling may be employed to send all required system information of the SCell. In connected mode, wireless devices may not need to acquire broadcasted system information directly from the SCells.

An RRC connection reconfiguration procedure may be used to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be used to establish (or reestablish, resume) an RRC connection. An RRC connection establishment procedure may comprise SRB1 establishment. The RRC connection establishment procedure may be used to transfer the initial NAS dedicated information message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure, e.g., after successful security activation. A measurement report message may be employed to transmit measurement results.

FIG. 5A, FIG. 5B, FIG. 5C, and FIG. 5D show examples of architecture for uplink and downlink signal transmission. FIG. 5A shows an example for an uplink physical channel. The baseband signal representing the physical uplink shared channel may be processed according to the following processes, which may be performed by structures described below. These structures and corresponding functions are shown as examples, however, it is anticipated that other structures and/or functions may be implemented in various examples. The structures and corresponding functions may comprise, e.g., one or more scrambling devices 501A and 501B configured to perform scrambling of coded bits in each of the codewords to be transmitted on a physical channel; one or more modulation mappers 502A and 502B configured to perform modulation of scrambled bits to generate complex-valued symbols; a layer mapper 503 configured to perform mapping of the complex-valued modulation symbols onto one or several transmission layers; one or more transform precoders 504A and 504B to generate complex-valued symbols; a precoding device 505 configured to perform precoding of the complex-valued symbols; one or more resource element mappers 506A and 506B configured to perform mapping of precoded complex-valued symbols to resource elements; one or more signal generators 507A and 507B configured to perform the generation of a complex-valued time-domain DFTS-OFDM/SC-FDMA signal for each antenna port; and/or the like.

FIG. 5B shows an example for performing modulation and up-conversion to the carrier frequency of the complex-valued DFTS-OFDM/SC-FDMA baseband signal, e.g., for each antenna port and/or for the complex-valued physical random access channel (PRACH) baseband signal. For example, the baseband signal, represented as $s_1(t)$, may be split, by a signal splitter 510, into real and imaginary components, $Re\{s_1(t)\}$ and $Im\{s_1(t)\}$, respectively. The real component may be modulated by a modulator 511A, and the imaginary component may be modulated by a modulator 511B. The output signal of the modulator 511A and the output signal of the modulator 511B may be mixed by a mixer 512. The output signal of the mixer 512 may be input to a filtering device 513, and filtering may be employed by the filtering device 513 prior to transmission.

FIG. 5C shows an example structure for downlink transmissions. The baseband signal representing a downlink physical channel may be processed by the following processes, which may be performed by structures described below. These structures and corresponding functions are shown as examples, however, it is anticipated that other structures and/or functions may be implemented in various examples. The structures and corresponding functions may comprise, e.g., one or more scrambling devices 531A and 531B configured to perform scrambling of coded bits in each of the codewords to be transmitted on a physical channel; one or more modulation mappers 532A and 532B configured to perform modulation of scrambled bits to generate complex-valued modulation symbols; a layer mapper 533 configured to perform mapping of the complex-valued modulation symbols onto one or several transmission layers; a precoding device 535 configured to perform precoding of the complex-valued modulation symbols on each layer for transmission on the antenna ports; one or more resource element mappers 536A and 536B configured to perform mapping of complex-valued modulation symbols for each antenna port to resource elements; one or more OFDM signal generators 537A and 537B configured to perform the generation of complex-valued time-domain OFDM signal for each antenna port; and/or the like.

FIG. 5D shows an example structure for modulation and up-conversion to the carrier frequency of the complex-valued OFDM baseband signal for each antenna port. For example, the baseband signal, represented as $s_1^{(p)}(t)$, may be split, by a signal splitter 520, into real and imaginary components, $Re\{s_1^{(p)}(t)\}$ and $Im\{s_1^{(p)}(t)\}$, respectively. The real component may be modulated by a modulator 521A, and the imaginary component may be modulated by a modulator 521B. The output signal of the modulator 521A and the output signal of the modulator 521B may be mixed by a mixer 522. The output signal of the mixer 522 may be input to a filtering device 523, and filtering may be employed by the filtering device 523 prior to transmission.

Figure 6:
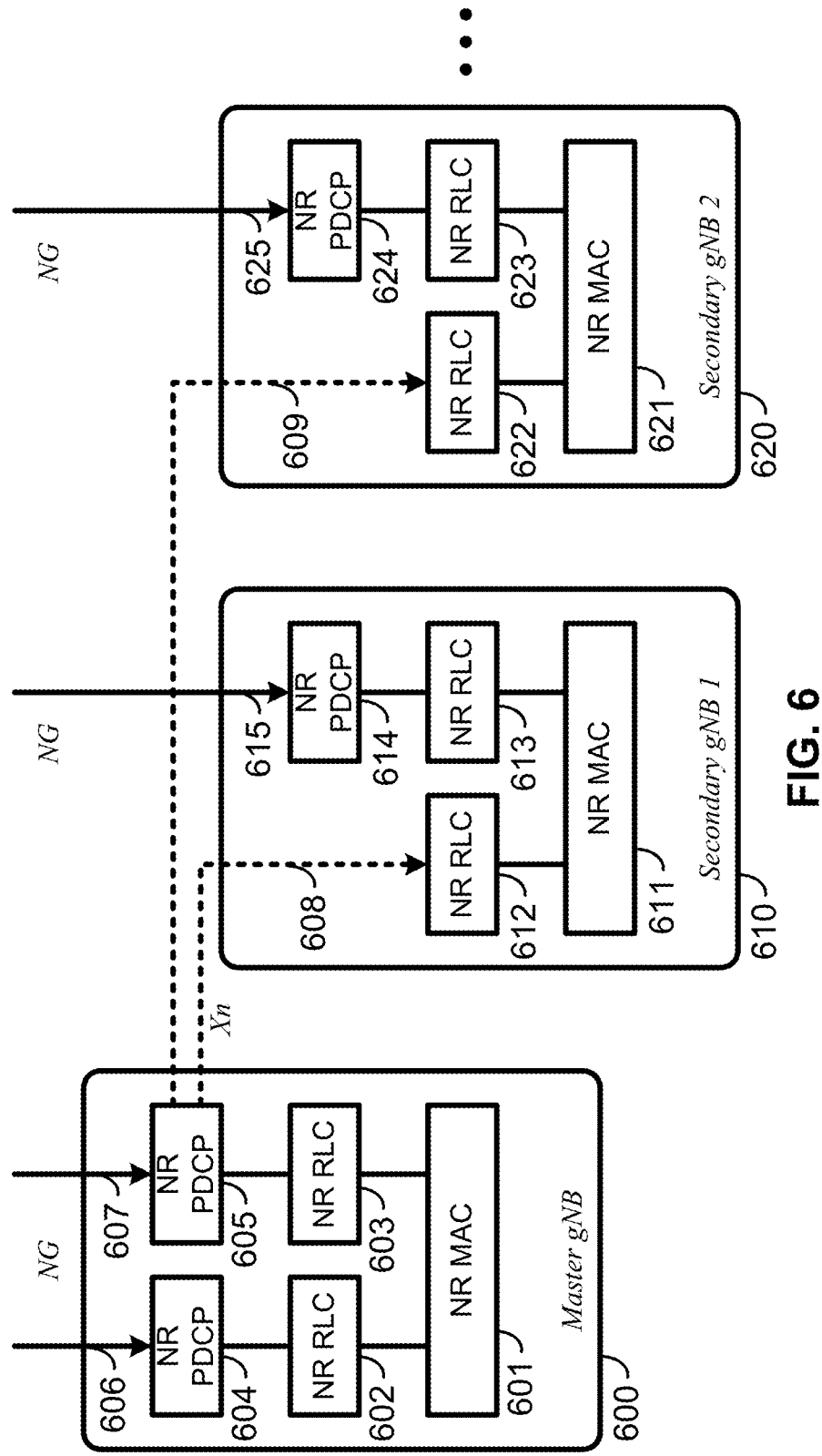
FIG. 6 shows an example protocol structure with multi-connectivity.
Figure 7:
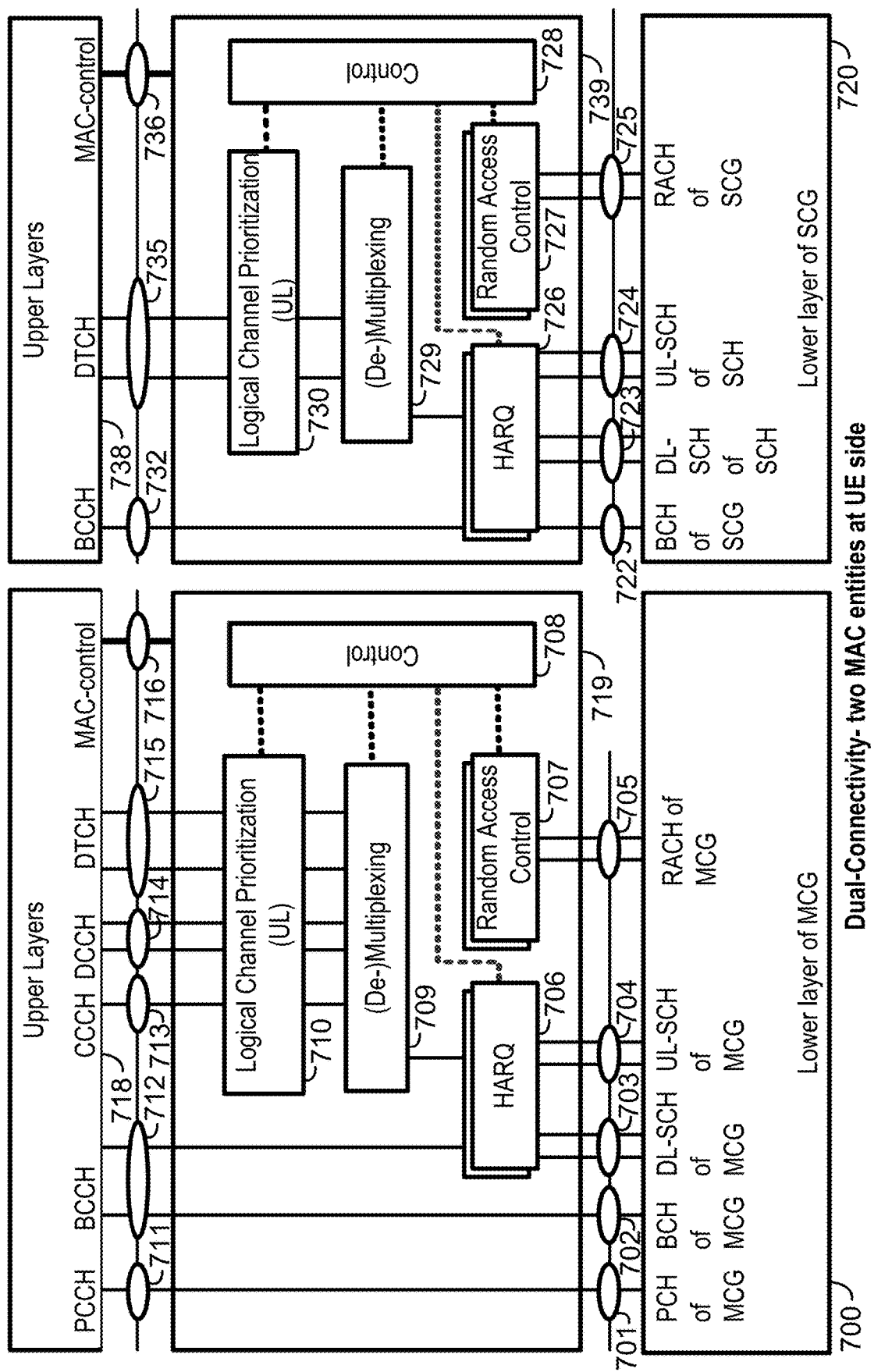
FIG. 7 shows an example protocol structure with carrier aggregation (CA) and dual connectivity (DC).

FIG. 6 and FIG. 7 show examples for protocol structures with CA and multi-connectivity. NR may support multi-connectivity operation, whereby a multiple receiver/transmitter (RX/TX) wireless device in RRC_CONNECTED may be configured to utilize radio resources provided by multiple schedulers located in multiple gNBs connected via a non-ideal or ideal backhaul over the Xn interface. gNBs involved in multi-connectivity for a certain wireless device may assume two different roles: a gNB may either act as a master gNB (e.g., 600) or as a secondary gNB (e.g., 610 or 620). In multi-connectivity, a wireless device may be connected to one master gNB (e.g., 600) and one or more secondary gNBs (e.g., 610 and/or 620). Any one or more of the Master gNB 600 and/or the secondary gNBs 610 and 620 may be a Next Generation (NG) NodeB. The master gNB 600 may comprise protocol layers NR MAC 601, NR RLC 602 and 603, and NR PDCP 604 and 605. The secondary gNB may comprise protocol layers NR MAC 611, NR RLC 612 and 613, and NR PDCP 614. The secondary gNB may comprise protocol layers NR MAC 620, NR RLC 622 and 623, and NR PDCP 624. The master gNB 600 may communicate via an interface 606 and/or via an interface 607, the secondary gNB 610 may communicate via an interface 615, and the secondary gNB 620 may communicate via an interface 625. The master gNB 600 may also communicate with the secondary gNB 610 and the secondary gNB 621 via interfaces 608 and 609, respectively, which may include Xn interfaces. For example, the master gNB 600 may communicate via the interface 608, at layer NR PDCP 605, and with the secondary gNB 610 at layer NR RLC 612. The master gNB 600 may communicate via the interface 609, at layer NR PDCP 605, and with the secondary gNB 620 at layer NR RLC 622.

FIG. 7 shows an example structure for the UE side MAC entities, e.g., if a Master Cell Group (MCG) and a Secondary Cell Group (SCG) are configured. Media Broadcast Multicast Service (MBMS) reception may be included but is not shown in this figure for simplicity.

In multi-connectivity, the radio protocol architecture that a particular bearer uses may depend on how the bearer is set up. As an example, three alternatives may exist, an MCG bearer, an SCG bearer, and a split bearer, such as shown in FIG. 6. NR RRC may be located in a master gNB and SRBs may be configured as a MCG bearer type and may use the radio resources of the master gNB. Multi-connectivity may have at least one bearer configured to use radio resources provided by the secondary gNB. Multi-connectivity may or may not be configured or implemented.

For multi-connectivity, the wireless device may be configured with multiple NR MAC entities: e.g., one NR MAC entity for a master gNB, and other NR MAC entities for secondary gNBs. In multi-connectivity, the configured set of serving cells for a wireless device may comprise two subsets: e.g., the Master Cell Group (MCG) including the serving cells of the master gNB, and the Secondary Cell Groups (SCGs) including the serving cells of the secondary gNBs.

At least one cell in a SCG may have a configured UL component carrier (CC) and one of the UL CCs, e.g., named PSCell (or PCell of SCG, or sometimes called PCell), may be configured with PUCCH resources. If the SCG is configured, there may be at least one SCG bearer or one split bearer. If a physical layer problem or a random access problem on a PSCell occurs or is detected, if the maximum number of NR RLC retransmissions has been reached associated with the SCG, or if an access problem on a PSCell during a SCG addition or a SCG change occurs or is detected, then an RRC connection re-establishment procedure may not be triggered, UL transmissions towards cells of the SCG may be stopped, a master gNB may be informed by the wireless device of a SCG failure type, and for a split bearer the DL data transfer over the master gNB may be maintained. The NR RLC Acknowledge Mode (AM) bearer may be configured for the split bearer Like the PCell, a PSCell may not be de-activated. The PSCell may be changed with an SCG change (e.g., with a security key change and a RACH procedure). A direct bearer type may change between a split bearer and an SCG bearer, or a simultaneous configuration of an SCG and a split bearer may or may not be supported.

A master gNB and secondary gNBs may interact for multi-connectivity. The master gNB may maintain the RRM measurement configuration of the wireless device, and the master gNB may, (e.g., based on received measurement reports, and/or based on traffic conditions and/or bearer types), decide to ask a secondary gNB to provide additional resources (e.g., serving cells) for a wireless device. If a request from the master gNB is received, a secondary gNB may create a container that may result in the configuration of additional serving cells for the wireless device (or the secondary gNB decide that it has no resource available to do so). For wireless device capability coordination, the master gNB may provide some or all of the Active Set (AS) configuration and the wireless device capabilities to the secondary gNB. The master gNB and the secondary gNB may exchange information about a wireless device configuration, such as by employing NR RRC containers (e.g., inter-node messages) carried in Xn messages. The secondary gNB may initiate a reconfiguration of its existing serving cells (e.g., PUCCH towards the secondary gNB). The secondary gNB may decide which cell is the PSCell within the SCG. The master gNB may or may not change the content of the NR RRC configuration provided by the secondary gNB. In an SCG addition and an SCG SCell addition, the master gNB may provide the latest measurement results for the SCG cell(s). Both a master gNB and a secondary gNBs may know the system frame number (SFN) and subframe offset of each other by operations, administration, and maintenance (OAM) (e.g., for the purpose of discontinuous reception (DRX) alignment and identification of a measurement gap). If adding a new SCG SCell, dedicated NR RRC signaling may be used for sending required system information of the cell for CA, except, e.g., for the SFN acquired from an MIB of the PSCell of an SCG.

FIG. 7 shows an example of dual-connectivity (DC) for two MAC entities at a wireless device side. A first MAC entity may comprise a lower layer of an MCG 700, an upper layer of an MCG 718, and one or more intermediate layers of an MCG 719. The lower layer of the MCG 700 may comprise, e.g., a paging channel (PCH) 701, a broadcast channel (BCH) 702, a downlink shared channel (DL-SCH) 703, an uplink shared channel (UL-SCH) 704, and a random access channel (RACH) 705. The one or more intermediate layers of the MCG 719 may comprise, e.g., one or more hybrid automatic repeat request (HARM) processes 706, one or more random access control processes 707, multiplexing and/or de-multiplexing processes 709, logical channel prioritization on the uplink processes 710, and a control processes 708 providing control for the above processes in the one or more intermediate layers of the MCG 719. The upper layer of the MCG 718 may comprise, e.g., a paging control channel (PCCH) 711, a broadcast control channel (BCCH) 712, a common control channel (CCCH) 713, a dedicated control channel (DCCH) 714, a dedicated traffic channel (DTCH) 715, and a MAC control 716.

A second MAC entity may comprise a lower layer of an SCG 720, an upper layer of an SCG 738, and one or more intermediate layers of an SCG 739. The lower layer of the SCG 720 may comprise, e.g., a BCH 722, a DL-SCH 723, an UL-SCH 724, and a RACH 725. The one or more intermediate layers of the SCG 739 may comprise, e.g., one or more HARQ processes 726, one or more random access control processes 727, multiplexing and/or de-multiplexing processes 729, logical channel prioritization on the uplink processes 730, and a control processes 728 providing control for the above processes in the one or more intermediate layers of the SCG 739. The upper layer of the SCG 738 may comprise, e.g., a BCCH 732, a DCCH 714, a DTCH 735, and a MAC control 736.

Serving cells may be grouped in a TA group (TAG). Serving cells in one TAG may use the same timing reference. For a given TAG, a wireless device may use at least one downlink carrier as a timing reference. For a given TAG, a wireless device may synchronize uplink subframe and frame transmission timing of uplink carriers belonging to the same TAG. Serving cells having an uplink to which the same TA applies may correspond to serving cells hosted by the same receiver. A wireless device supporting multiple TAs may support two or more TA groups. One TA group may include the PCell and may be called a primary TAG (pTAG).

In a multiple TAG configuration, at least one TA group may not include the PCell and may be called a secondary TAG (sTAG). Carriers within the same TA group may use the same TA value and/or the same timing reference. If DC is configured, cells belonging to a cell group (e.g., MCG or SCG) may be grouped into multiple TAGs including a pTAG and one or more sTAGs.

FIG. 8 shows example TAG configurations. In Example 1, a pTAG comprises a PCell, and an sTAG comprises an SCell1. In Example 2, a pTAG comprises a PCell and an SCell1, and an sTAG comprises an SCell2 and an SCell3. In Example 3, a pTAG comprises a PCell and an SCell1, and an sTAG1 comprises an SCell2 and an SCell3, and an sTAG2 comprises a SCell4. Up to four TAGs may be supported in a cell group (MCG or SCG), and other example TAG configurations may also be provided. In various examples, structures and operations are described for use with a pTAG and an sTAG. Some of the examples may be used for configurations with multiple sTAGs.

An eNB may initiate an RA procedure, via a PDCCH order, for an activated SCell. The PDCCH order may be sent on a scheduling cell of this SCell. If cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
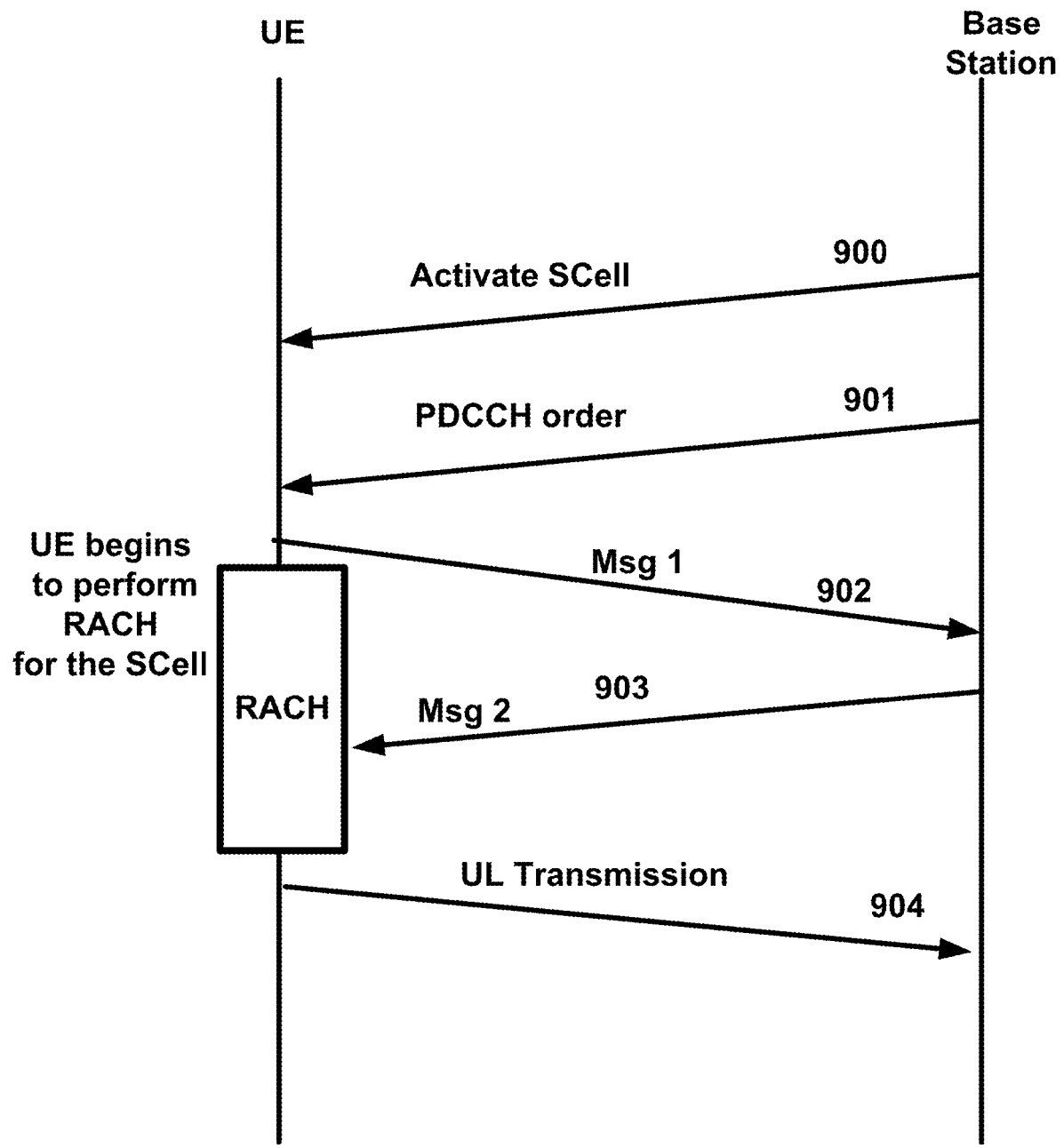
FIG. 9 shows example message flow in a random access process in a secondary TAG.

FIG. 9 shows an example of random access processes, and a corresponding message flow, in a secondary TAG. A base station, such as an eNB, may transmit an activation command 900 to a wireless device, such as a UE. The activation command 900 may be transmitted to activate an SCell. The base station may also transmit a PDCCH order 901 to the wireless device, which may be transmitted, e.g., after the activation command 900. The wireless device may begin to perform a RACH process for the SCell, which may be initiated, e.g., after receiving the PDCCH order 901. A wireless device may transmit to the base station (e.g., as part of a RACH process) a preamble 902 (e.g., Msg1), such as a random access preamble (RAP). The preamble 902 may be transmitted in response to the PDCCH order 901. The wireless device may transmit the preamble 902 via an SCell belonging to an sTAG. Preamble transmission for SCells may be controlled by a network using PDCCH format 1A. The base station may send a random access response (RAR) 903 (e.g., Msg2 message) to the wireless device. The RAR 903 may be in response to the preamble 902 transmission via the SCell. The RAR 903 may be addressed to a random access radio network temporary identifier (RA-RNTI) in a PCell common search space (CSS). If the wireless device receives the RAR 903, the RACH process may conclude. The RACH process may conclude, e.g., after or in response to the wireless device receiving the RAR 903 from the base station. After the RACH process, the wireless device may transmit an uplink transmission 904. The uplink transmission 904 may comprise uplink packets transmitted via the same SCell used for the preamble 902 transmission.

Initial timing alignment for communications between the wireless device and the base station may be performed through a random access procedure, such as described above regarding FIG. 9. The random access procedure may involve a wireless device, such as a UE, transmitting a random access preamble and a base station, such as an eNB, responding with an initial TA command NTA (amount of timing advance) within a random access response window. The start of the random access preamble may be aligned with the start of a corresponding uplink subframe at the wireless device assuming NTA=0. The eNB may estimate the uplink timing from the random access preamble transmitted by the wireless device. The TA command may be derived by the eNB based on the estimation of the difference between the desired UL timing and the actual UL timing. The wireless device may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. If an eNB performs an SCell addition configuration, the related TAG configuration may be configured for the SCell. An eNB may modify the TAG configuration of an SCell by removing (e.g., releasing) the SCell and adding (e.g., configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In some examples, it may not be possible to change the TAG associated with an SCell, but rather, the SCell may need to be removed and a new SCell may need to be added with another TAG. For example, if there is a need to move an SCell from an sTAG to a pTAG, at least one RRC message, such as at least one RRC reconfiguration message, may be sent to the wireless device. The at least one RRC message may be sent to the wireless device to reconfigure TAG configurations, e.g., by releasing the SCell and configuring the SCell as a part of the pTAG. If, e.g., an SCell is added or configured without a TAG index, the SCell may be explicitly assigned to the pTAG. The PCell may not change its TA group and may be a member of the pTAG.

In LTE Release-10 and Release-11 CA, a PUCCH transmission is only transmitted on a PCell (e.g., a PSCell) to an eNB. In LTE-Release 12 and earlier, a wireless device may transmit PUCCH information on one cell (e.g., a PCell or a PSCell) to a given eNB. As the number of CA capable wireless devices increase, and as the number of aggregated carriers increase, the number of PUCCHs and the PUCCH payload size may increase. Accommodating the PUCCH transmissions on the PCell may lead to a high PUCCH load on the PCell. A PUCCH on an SCell may be used to offload the PUCCH resource from the PCell. More than one PUCCH may be configured. For example, a PUCCH on a PCell may be configured and another PUCCH on an SCell may be configured. One, two, or more cells may be configured with PUCCH resources for transmitting CSI, acknowledgment (ACK), and/or non-acknowledgment (NACK) to a base station. Cells may be grouped into multiple PUCCH groups, and one or more cell within a group may be configured with a PUCCH. In some examples, one SCell may belong to one PUCCH group. SCells with a configured PUCCH transmitted to a base station may be called a PUCCH SCell, and a cell group with a common PUCCH resource transmitted to the same base station may be called a PUCCH group.

A MAC entity may have a configurable timer, e.g., timeAlignmentTimer, per TAG. The timeAlignmentTimer may be used to control how long the MAC entity considers the serving cells belonging to the associated TAG to be uplink time aligned. If a Timing Advance Command MAC control element is received, the MAC entity may apply the Timing Advance Command for the indicated TAG; and/or the MAC entity may start or restart the timeAlignmentTimer associated with a TAG that may be indicated by the Timing Advance Command MAC control element. If a Timing Advance Command is received in a Random Access Response message for a serving cell belonging to a TAG, the MAC entity may apply the Timing Advance Command for this TAG and/or start or restart the timeAlignmentTimer associated with this TAG. Additionally or alternatively, if the Random Access Preamble is not selected by the MAC entity, the MAC entity may apply the Timing Advance Command for this TAG and/or start or restart the timeAlignmentTimer associated with this TAG. If the timeAlignmentTimer associated with this TAG is not running, the Timing Advance Command for this TAG may be applied, and the timeAlignmentTimer associated with this TAG may be started. If the contention resolution is not successful, a timeAlignmentTimer associated with this TAG may be stopped. If the contention resolution is successful, the MAC entity may ignore the received Timing Advance Command. The MAC entity may determine whether the contention resolution is successful or whether the contention resolution is not successful.

FIG. 10A and FIG. 10B show examples for interfaces between a 5G core network (e.g., NGC) and base stations (e.g., gNB and eLTE eNB). A base station, such as a gNB 1020, may be interconnected to an NGC 1010 control plane employing an NG-C interface. The base station, e.g., the gNB 1020, may also be interconnected to an NGC 1010 user plane (e.g., UPGW) employing an NG-U interface. As another example, a base station, such as an eLTE eNB 1040, may be interconnected to an NGC 1030 control plane employing an NG-C interface. The base station, e.g., the eLTE eNB 1040, may also be interconnected to an NGC 1030 user plane (e.g., UPGW) employing an NG-U interface. An NG interface may support a many-to-many relation between 5G core networks and base stations.

FIG. 11A, FIG. 11B, FIG. 11C, FIG. 11D, FIG. 11E, and FIG. 11F are examples for architectures of tight interworking between a 5G RAN and an LTE RAN. The tight interworking may enable a multiple receiver/transmitter (RX/TX) wireless device in an RRC_CONNECTED state to be configured to utilize radio resources provided by two schedulers located in two base stations (e.g., an eLTE eNB and a gNB). The two base stations may be connected via a non-ideal or ideal backhaul over the Xx interface between an LTE eNB and a gNB, or over the Xn interface between an eLTE eNB and a gNB. Base stations involved in tight interworking for a certain wireless device may assume different roles. For example, a base station may act as a master base station or a base station may act as a secondary base station. In tight interworking, a wireless device may be connected to both a master base station and a secondary base station. Mechanisms implemented in tight interworking may be extended to cover more than two base stations.

A master base station may be an LTE eNB 1102A or an LTE eNB 1102B, which may be connected to EPC nodes 1101A or 1101B, respectively. This connection to EPC nodes may be, e.g., to an MME via the S1-C interface and/or to an S-GW via the S1-U interface. A secondary base station may be a gNB 1103A or a gNB 1103B, either or both of which may be a non-standalone node having a control plane connection via an Xx-C interface to an LTE eNB (e.g., the LTE eNB 1102A or the LTE eNB 1102B). In the tight interworking architecture of FIG. 11A, a user plane for a gNB (e.g., the gNB 1103A) may be connected to an S-GW (e.g., the EPC 1101A) through an LTE eNB (e.g., the LTE eNB 1102A), via an Xx-U interface between the LTE eNB and the gNB, and via an S1-U interface between the LTE eNB and the S-GW. In the architecture of FIG. 11B, a user plane for a gNB (e.g., the gNB 1103B) may be connected directly to an S-GW (e.g., the EPC 1101B) via an S1-U interface between the gNB and the S-GW.

A master base station may be a gNB 1103C or a gNB 1103D, which may be connected to NGC nodes 1101C or 1101D, respectively. This connection to NGC nodes may be, e.g., to a control plane core node via the NG-C interface and/or to a user plane core node via the NG-U interface. A secondary base station may be an eLTE eNB 1102C or an eLTE eNB 1102D, either or both of which may be a non-standalone node having a control plane connection via an Xn-C interface to a gNB (e.g., the gNB 1103C or the gNB 1103D). In the tight interworking architecture of FIG. 11C, a user plane for an eLTE eNB (e.g., the eLTE eNB 1102C) may be connected to a user plane core node (e.g., the NGC 1101C) through a gNB (e.g., the gNB 1103C), via an Xn-U interface between the eLTE eNB and the gNB, and via an NG-U interface between the gNB and the user plane core node. In the architecture of FIG. 11D, a user plane for an eLTE eNB (e.g., the eLTE eNB 1102D) may be connected directly to a user plane core node (e.g., the NGC 1101D) via an NG-U interface between the eLTE eNB and the user plane core node.

A master base station may be an eLTE eNB 1102E or an eLTE eNB 1102F, which may be connected to NGC nodes 1101E or 1101F, respectively. This connection to NGC nodes may be, e.g., to a control plane core node via the NG-C interface and/or to a user plane core node via the NG-U interface. A secondary base station may be a gNB 1103E or a gNB 1103F, either or both of which may be a non-standalone node having a control plane connection via an Xn-C interface to an eLTE eNB (e.g., the eLTE eNB 1102E or the eLTE eNB 1102F). In the tight interworking architecture of FIG. 11E, a user plane for a gNB (e.g., the gNB 1103E) may be connected to a user plane core node (e.g., the NGC 1101E) through an eLTE eNB (e.g., the eLTE eNB 1102E), via an Xn-U interface between the eLTE eNB and the gNB, and via an NG-U interface between the eLTE eNB and the user plane core node. In the architecture of FIG. 11F, a user plane for a gNB (e.g., the gNB 1103F) may be connected directly to a user plane core node (e.g., the NGC 1101F) via an NG-U interface between the gNB and the user plane core node.

FIG. 12A, FIG. 12B, and FIG. 12C are examples for radio protocol structures of tight interworking bearers.

An LTE eNB 1201A may be an S1 master base station, and a gNB 1210A may be an S1 secondary base station. An example for a radio protocol architecture for a split bearer and an SCG bearer is shown. The LTE eNB 1201A may be connected to an EPC with a non-standalone gNB 1210A, via an Xx interface between the PDCP 1206A and an NR RLC 1212A. The LTE eNB 1201A may include protocol layers MAC 1202A, RLC 1203A and RLC 1204A, and PDCP 1205A and PDCP 1206A. An MCG bearer type may interface with the PDCP 1205A, and a split bearer type may interface with the PDCP 1206A. The gNB 1210A may include protocol layers NR MAC 1211A, NR RLC 1212A and NR RLC 1213A, and NR PDCP 1214A. An SCG bearer type may interface with the NR PDCP 1214A.

A gNB 1201B may be an NG master base station, and an eLTE eNB 1210B may be an NG secondary base station. An example for a radio protocol architecture for a split bearer and an SCG bearer is shown. The gNB 1201B may be connected to an NGC with a non-standalone eLTE eNB 1210B, via an Xn interface between the NR PDCP 1206B and an RLC 1212B. The gNB 1201B may include protocol layers NR MAC 1202B, NR RLC 1203B and NR RLC 1204B, and NR PDCP 1205B and NR PDCP 1206B. An MCG bearer type may interface with the NR PDCP 1205B, and a split bearer type may interface with the NR PDCP 1206B. The eLTE eNB 1210B may include protocol layers MAC 1211B, RLC 1212B and RLC 1213B, and PDCP 1214B. An SCG bearer type may interface with the PDCP 1214B.

An eLTE eNB 1201C may be an NG master base station, and a gNB 1210C may be an NG secondary base station. An example for a radio protocol architecture for a split bearer and an SCG bearer is shown. The eLTE eNB 1201C may be connected to an NGC with a non-standalone gNB 1210C, via an Xn interface between the PDCP 1206C and an NR RLC 1212C. The eLTE eNB 1201C may include protocol layers MAC 1202C, RLC 1203C and RLC 1204C, and PDCP 1205C and PDCP 1206C. An MCG bearer type may interface with the PDCP 1205C, and a split bearer type may interface with the PDCP 1206C. The gNB 1210C may include protocol layers NR MAC 1211C, NR RLC 1212C and NR RLC 1213C, and NR PDCP 1214C. An SCG bearer type may interface with the NR PDCP 1214C.

In a 5G network, the radio protocol architecture that a particular bearer uses may depend on how the bearer is setup. At least three alternatives may exist, e.g., an MCG bearer, an SCG bearer, and a split bearer, such as shown in FIG. 12A, FIG. 12B, and FIG. 12C. The NR RRC may be located in a master base station, and the SRBs may be configured as an MCG bearer type and may use the radio resources of the master base station. Tight interworking may have at least one bearer configured to use radio resources provided by the secondary base station. Tight interworking may or may not be configured or implemented.

The wireless device may be configured with two MAC entities: e.g., one MAC entity for a master base station, and one MAC entity for a secondary base station. In tight interworking, the configured set of serving cells for a wireless device may comprise of two subsets: e.g., the Master Cell Group (MCG) including the serving cells of the master base station, and the Secondary Cell Group (SCG) including the serving cells of the secondary base station.

At least one cell in a SCG may have a configured UL CC and one of them, e.g., a PSCell (or the PCell of the SCG, which may also be called a PCell), is configured with PUCCH resources. If the SCG is configured, there may be at least one SCG bearer or one split bearer. If one or more of a physical layer problem or a random access problem is detected on a PSCell, if the maximum number of (NR) RLC retransmissions associated with the SCG has been reached, and/or if an access problem on a PSCell during an SCG addition or during an SCG change is detected, then: an RRC connection re-establishment procedure may not be triggered, UL transmissions towards cells of the SCG may be stopped, a master base station may be informed by the wireless device of a SCG failure type, and/or for a split bearer the DL data transfer over the master base station may be maintained. The RLC AM bearer may be configured for the split bearer. Like the PCell, a PSCell may not be de-activated. A PSCell may be changed with an SCG change, e.g., with security key change and a RACH procedure. A direct bearer type change, between a split bearer and an SCG bearer, may not be supported. Simultaneous configuration of an SCG and a split bearer may not be supported.

A master base station and a secondary base station may interact. The master base station may maintain the RRM measurement configuration of the wireless device. The master base station may determine to ask a secondary base station to provide additional resources (e.g., serving cells) for a wireless device. This determination may be based on, e.g., received measurement reports, traffic conditions, and/or bearer types. If a request from the master base station is received, a secondary base station may create a container that may result in the configuration of additional serving cells for the wireless device, or the secondary base station may determine that it has no resource available to do so. The master base station may provide at least part of the AS configuration and the wireless device capabilities to the secondary base station, e.g., for wireless device capability coordination. The master base station and the secondary base station may exchange information about a wireless device configuration such as by using RRC containers (e.g., inter-node messages) carried in Xn or Xx messages. The secondary base station may initiate a reconfiguration of its existing serving cells (e.g., PUCCH towards the secondary base station). The secondary base station may determine which cell is the PSCell within the SCG. The master base station may not change the content of the RRC configuration provided by the secondary base station. If an SCG is added and/or an SCG SCell is added, the master base station may provide the latest measurement results for the SCG cell(s). Either or both of a master base station and a secondary base station may know the SFN and subframe offset of each other by OAM, (e.g., for the purpose of DRX alignment and identification of a measurement gap). If a new SCG SCell is added, dedicated RRC signaling may be used for sending required system information of the cell, such as for CA, except, e.g., for the SFN acquired from an MIB of the PSCell of an SCG.

FIG. 13A and FIG. 13B show examples for gNB deployment. A core 1301 and a core 1310 may interface with other nodes via RAN-CN interfaces. In a non-centralized deployment example, the full protocol stack (e.g., NR RRC, NR PDCP, NR RLC, NR MAC, and NR PHY) may be supported at one node, such as a gNB 1302, a gNB 1303, and/or an eLTE eNB or LTE eNB 1304. These nodes (e.g., the gNB 1302, the gNB 1303, and the eLTE eNB or LTE eNB 1304) may interface with one of more of each other via a respective inter-BS interface. In a centralized deployment example, upper layers of a gNB may be located in a Central Unit (CU) 1311, and lower layers of the gNB may be located in Distributed Units (DU) 1312, 1313, and 1314. The CU-DU interface (e.g., Fs interface) connecting CU 1311 and DUs 1312, 1312, and 1314 may be ideal or non-ideal. The Fs-C may provide a control plane connection over the Fs interface, and the Fs-U may provide a user plane connection over the Fs interface. In the centralized deployment, different functional split options between the CU 1311 and the DUs 1312, 1313, and 1314 may be possible by locating different protocol layers (e.g., RAN functions) in the CU 1311 and in the DU 1312, 1313, and 1314. The functional split may support flexibility to move the RAN functions between the CU 1311 and the DUs 1312, 1313, and 1314 depending on service requirements and/or network environments. The functional split option may change during operation (e.g., after the Fs interface setup procedure), or the functional split option may change only in the Fs setup procedure (e.g., the functional split option may be static during operation after Fs setup procedure).

Figure 14:
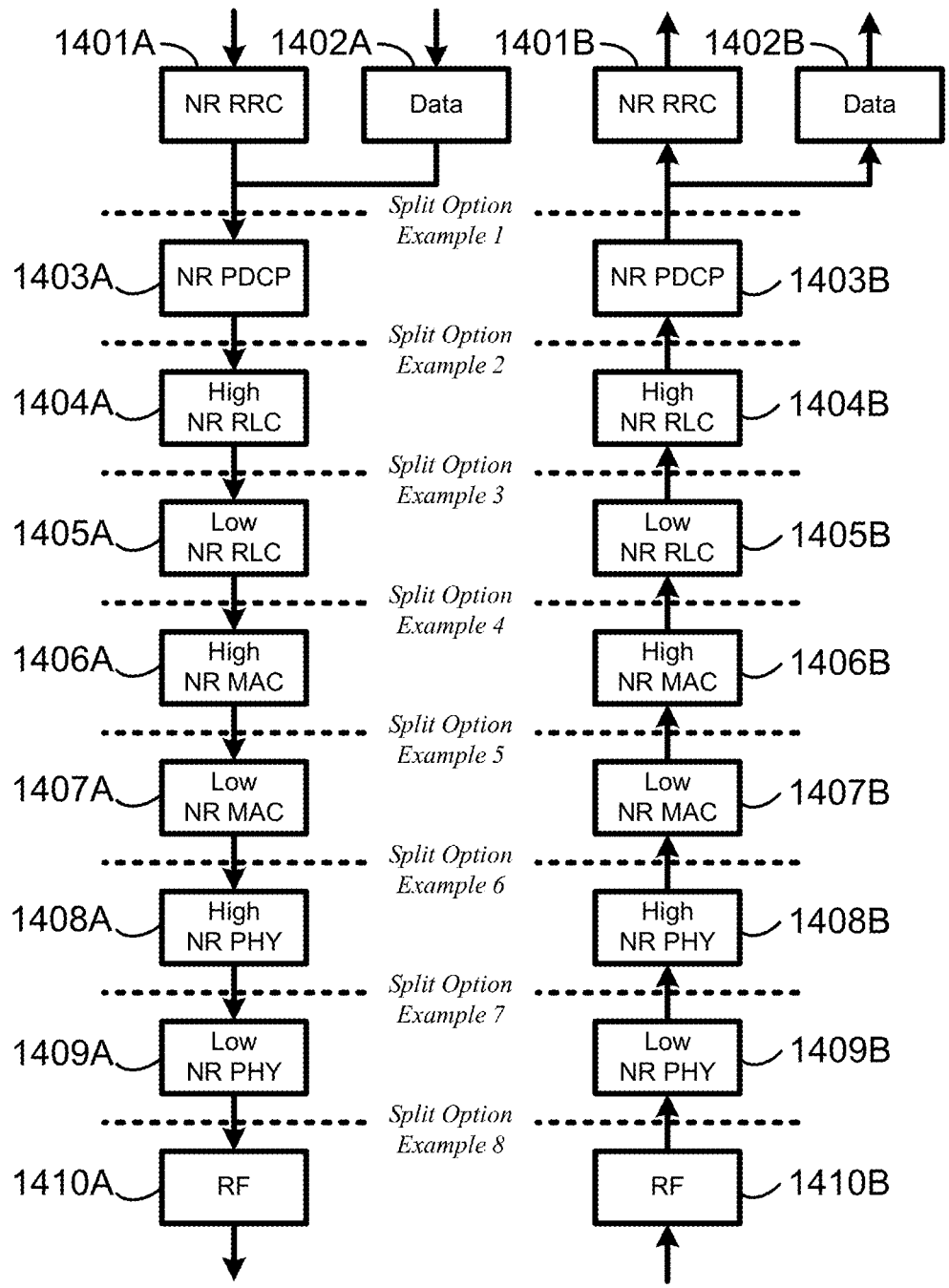
FIG. 14 shows functional split option examples of a centralized gNB deployment.

FIG. 14 shows examples for different functional split options of a centralized gNB deployment. Element numerals that are followed by "A" or "B" designations in FIG. 14 may represent the same elements in different traffic flows, e.g., either receiving data (e.g., data 1402A) or sending data (e.g., 1402B). In the split option example 1, an NR RRC 1401 may be in a CU, and an NR PDCP 1403, an NR RLC (e.g., comprising a High NR RLC 1404 and/or a Low NR RLC 1405), an NR MAC (e.g., comprising a High NR MAC 1406 and/or a Low NR MAC 1407), an NR PHY (e.g., comprising a High NR PHY 1408 and/or a LOW NR PHY 1409), and an RF 1410 may be in a DU. In the split option example 2, the NR RRC 1401 and the NR PDCP 1403 may be in a CU, and the NR RLC, the NR MAC, the NR PHY, and the RF 1410 may be in a DU. In the split option example 3, the NR RRC 1401, the NR PDCP 1403, and a partial function of the NR RLC (e.g., the High NR RLC 1404) may be in a CU, and the other partial function of the NR RLC (e.g., the Low NR RLC 1405), the NR MAC, the NR PHY, and the RF 1410 may be in a DU. In the split option example 4, the NR RRC 1401, the NR PDCP 1403, and the NR RLC may be in a CU, and the NR MAC, the NR PHY, and the RF 1410 may be in a DU. In the split option example 5, the NR RRC 1401, the NR PDCP 1403, the NR RLC, and a partial function of the NR MAC (e.g., the High NR MAC 1406) may be in a CU, and the other partial function of the NR MAC (e.g., the Low NR MAC 1407), the NR PHY, and the RF 1410 may be in a DU. In the split option example 6, the NR RRC 1401, the NR PDCP 1403, the NR RLC, and the NR MAC may be in CU, and the NR PHY and the RF 1410 may be in a DU. In the split option example 7, the NR RRC 1401, the NR PDCP 1403, the NR RLC, the NR MAC, and a partial function of the NR PHY (e.g., the High NR PHY 1408) may be in a CU, and the other partial function of the NR PHY (e.g., the Low NR PHY 1409) and the RF 1410 may be in a DU. In the split option example 8, the NR RRC 1401, the NR PDCP 1403, the NR RLC, the NR MAC, and the NR PHY may be in a CU, and the RF 1410 may be in a DU.

The functional split may be configured per CU, per DU, per wireless device, per bearer, per slice, and/or with other granularities. In a per CU split, a CU may have a fixed split, and DUs may be configured to match the split option of the CU. In a per DU split, each DU may be configured with a different split, and a CU may provide different split options for different DUs. In a per wireless device split, a gNB (e.g., a CU and a DU) may provide different split options for different wireless devices. In a per bearer split, different split options may be utilized for different bearer types. In a per slice splice, different split options may be applied for different slices.

A new radio access network (new RAN) may support different network slices, which may allow differentiated treatment customized to support different service requirements with end to end scope. The new RAN may provide a differentiated handling of traffic for different network slices that may be pre-configured, and the new RAN may allow a single RAN node to support multiple slices. The new RAN may support selection of a RAN part for a given network slice, e.g., by one or more slice ID(s) or NSSAI(s) provided by a wireless device or provided by an NGC (e.g., an NG CP). The slice ID(s) or NSSAI(s) may identify one or more of pre-configured network slices in a PLMN. For an initial attach, a wireless device may provide a slice ID and/or an NSSAI, and a RAN node (e.g., a gNB) may use the slice ID or the NSSAI for routing an initial NAS signaling to an NGC control plane function (e.g., an NG CP). If a wireless device does not provide any slice ID or NSSAI, a RAN node may send a NAS signaling to a default NGC control plane function. For subsequent accesses, the wireless device may provide a temporary ID for a slice identification, which may be assigned by the NGC control plane function, to enable a RAN node to route the NAS message to a relevant NGC control plane function. The new RAN may support resource isolation between slices. If the RAN resource isolation is implemented, shortage of shared resources in one slice does not cause a break in a service level agreement for another slice.

The amount of data traffic carried over networks is expected to increase for many years to come. The number of users and/or devices is increasing and each user/device accesses an increasing number and variety of services, e.g., video delivery, large files, and images. This requires not only high capacity in the network, but also provisioning very high data rates to meet customers' expectations on interactivity and responsiveness. More spectrum may be required for network operators to meet the increasing demand. Considering user expectations of high data rates along with seamless mobility, it is beneficial that more spectrum be made available for deploying macro cells as well as small cells for communication systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, if present, may be an effective complement to licensed spectrum for network operators, e.g., to help address the traffic explosion in some examples, such as hotspot areas. Licensed Assisted Access (LAA) offers an alternative for operators to make use of unlicensed spectrum, e.g., if managing one radio network, offering new possibilities for optimizing the network's efficiency.

Listen-before-talk (clear channel assessment) may be implemented for transmission in an LAA cell. In a listen-before-talk (LBT) procedure, equipment may apply a clear channel assessment (CCA) check before using the channel. For example, the CCA may utilize at least energy detection to determine the presence or absence of other signals on a channel to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

Discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access, e.g., via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by wireless devices, time synchronization of wireless devices, and frequency synchronization of wireless devices.

DL LAA design may employ subframe boundary alignment according to LTE-A carrier aggregation timing relationships across serving cells aggregated by CA. This may not indicate that the eNB transmissions may start only at the subframe boundary. LAA may support transmitting PDSCH if not all OFDM symbols are available for transmission in a subframe according to LBT. Delivery of necessary control information for the PDSCH may also be supported.

LBT procedures may be employed for fair and friendly coexistence of LAA with other operators and technologies operating in unlicensed spectrum. LBT procedures on a node attempting to transmit on a carrier in unlicensed spectrum may require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. Nodes may follow such regulatory requirements. A node may optionally use a lower threshold for energy detection than that specified by regulatory requirements. LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. A Category 4 LBT mechanism or other type of LBT mechanisms may be implemented.

Various example LBT mechanisms may be implemented. For some signals, in some implementation scenarios, in some situations, and/or in some frequencies, no LBT procedure may performed by the transmitting entity. For example, Category 2 (e.g., LBT without random back-off) may be implemented. The duration of time that the channel is sensed to be idle before the transmitting entity transmits may be deterministic. For example, Category 3 (e.g., LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle, e.g., before the transmitting entity transmits on the channel. For example, Category 4 (e.g., LBT with random back-off with a contention window of variable size) may be implemented. The transmitting entity may draw a random number N within a contention window. The size of contention window may be specified by the minimum and maximum value of N. The transmitting entity may vary the size of the contention window if drawing the random number N. The random number N may be used in the LBT procedure to determine the duration of time that the channel is sensed to be idle, e.g., before the transmitting entity transmits on the channel.

LAA may employ uplink LBT at the wireless device. The UL LBT scheme may be different from the DL LBT scheme, e.g., by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

LAA may use uplink LBT at the wireless device. The UL LBT scheme may be different from the DL LBT scheme, e.g., by using different LBT mechanisms or parameters. These differences in schemes may be due to the LAA UL being based on scheduled access, which may affect a wireless device's channel contention opportunities. Other considerations motivating a different UL LBT scheme may include, but are not limited to, multiplexing of multiple wireless devices in a single subframe.

A DL transmission burst may be a continuous transmission from a DL transmitting node, e.g., with no transmission immediately before or after from the same node on the same CC. An UL transmission burst from a wireless device perspective may be a continuous transmission from a wireless device, e.g., with no transmission immediately before or after from the same wireless device on the same CC. A UL transmission burst may be defined from a wireless device perspective or from an eNB perspective. If an eNB is operating DL and UL LAA over the same unlicensed carrier, DL transmission burst(s) and UL transmission burst(s) on LAA may be scheduled in a TDM manner over the same unlicensed carrier. An instant in time may be part of a DL transmission burst or part of an UL transmission burst.

Packet data convergence protocol (PDCP) packet duplication may be used to increase radio link reliability for a wireless device. For example, if a packet from a wireless device is not received by a target device (e.g., a base station), a duplicated packet may be received by the target device which may increase reliability of communications between the wireless device and the target device. If a connection failure occurs and PDCP packet duplication is activated, a radio link quality of the wireless device may be worse than when a connection failure occurs without PDCP duplication activated. The wireless device may send, to a base station, a connection failure that may indicate whether PDCP packet duplication was activated or deactivated in relation to, or at a time associated with, the connection failure. The base station may determine a configuration, and/or a reconfiguration, of one or more radio resources based on whether PDCP packet duplication was activated or deactivated in relation to, or at a time associated with, the connection failure. By considering whether PDCP packet duplication was activated or deactivated, the base station may be able to more efficiently configure and/or reconfigure the one or more radio resources. For example, if a connection failure occurs without PDCP duplication, radio conditions may be poorer than if a connection failure occurs with PDCP duplication (wherein radio conditions may improve if PDCP duplication becomes deactivated). The base station may allocate more radio resources if a connection failure occurs without PDCP packet duplication than the amount of radio resources the base station may allocate if a connection failure occurs with PDCP packet duplication.

A wireless device may receive (e.g., from a first base station) a packet duplication activation command for duplication of packet data convergence protocol (PDCP) packets. The PDCP packets may be associated with a first bearer. The first bearer may be a signaling radio bearer. The wireless device may receive (e.g., from the first base station) a first radio resource control message. The first radio resource control message may comprise one or more PDCP packet duplication configuration parameters. The PDCP packet duplication configuration parameters may indicate that PDCP packets associated with the first bearer are duplicated. The wireless device may transmit duplicated PDCP packets associated with the first bearer. The transmission may be based on the packet duplication activation command. The wireless device may determine a connection failure. The connection failure may be a radio link failure. The connection failure may be a handover failure. The connection failure may be associated with a first cell of the first base station. The connection failure may be determined based on a number of radio link control retransmissions (e.g., retransmissions of PDCP packets of the first bearer, original PDCP packets of the first bearer, and/or duplicated PDCP packets of the first bearer). The connection failure may be determined based on one or more out-of-sync detections. The connection failure may be determined based on one or more random access failures. The wireless device may determine a second cell of a second base station. The wireless device may determine to use the second cell for a radio resource control connection to the second base station. The wireless device may determine to use the second cell based on the connection failure. The wireless device may determine to transmit (e.g., to a second base station) a second radio resource control message.

The second radio control message may comprise a radio link failure report. The radio link failure report may comprise one or more information elements. The one or more information elements may indicate that PDCP packets were duplicated. The one or more information elements may indicate a time (e.g., a time of the connection failure). The radio link failure report may comprise an indication that PDCP packet duplication was activated. The radio link failure report may comprise an indication that PDCP packet duplication for at least one bearer was configured. The radio link failure report may comprise an indication of one or more first cell identifiers associated with one or more first cells. Original PDCP packets of the first bearer may have been transmitted via the one or more first cells. The radio link failure report may comprise an indication of one or more second cell identifiers associated with one or more second cells. Duplicated PDCP packets of the first bearer may have been transmitted via the one or more second cells. The one or more first cells may be different from the one or more second cells. Original PDCP packets of the first bearer may be transmitted via a first general packet radio service tunneling protocol tunnel. Duplicated PDCP packets of the first bearer may be transmitted via a second general packet radio service tunneling protocol tunnel.

Base stations may transmit messages between each other. The first base station may transmit a message to the second base station. The second base station may transmit the message to the first base station. The message may comprise the radio link failure report. The message may comprise a first information element of the radio link failure report. The message may comprise one or more radio resource configuration parameters based on the first information element. A handover may be initiated based on the one or more radio resource configuration parameters. The first base station may initiate the handover to the second base station. The second base station may initiate the handover to the first base station. The one or more radio resource configuration parameters may comprise a radio signal received quality threshold for a handover trigger. The one or more radio resource configuration parameters may comprise a radio signal received power threshold for a handover trigger. The one or more radio resource configuration parameters may comprise one or more PDCP duplication configuration parameters. The first base station may configure the one or more radio resource configuration parameters based on the first information element.

One or more beams may be managed via one or more of L1 and/or L2 procedures. The L1 and/or L2 procedures may be used to acquire and/or maintain a set of transmission reception points (TRPs) associated with a base station and/or associated with a wireless device. The L1 and/or L2 procedures may be used to acquire and/or maintain wireless device beams, which may be used for DL and UL transmission and/or reception. Beam management may comprise one or more of: beam determination (e.g., for TRP(s) or a wireless device to select its own Tx/Rx beam(s)), beam measurement (e.g., for one a TRP(s) or wireless device to measure characteristics of received beamformed signals), beam reporting (e.g., for a wireless device to report information of beamformed signal(s) based on beam measurement), and/or beam sweeping (e.g., using a beam to cover a spatial area, wherein beams may be transmitted and/or received during a time interval based on a predefined configuration).

A TRP and/or a wireless device may select one or more Tx or Rx beams based on determined compatibility and/or capability information. A TRP may select a TRP Rx beam to be used for uplink reception based on a wireless device performing a downlink measurement of one or more Tx beams from the TRP. A TRP may select a TRP Tx beam for downlink transmission based on the TRP performing an uplink measurement of one or more Rx beams received by the TRP. A wireless device may select a Tx beam for uplink transmission to a TRP based on performing a downlink measurement of one or more Rx beams. A wireless device may select an Rx beam for receiving communication from a TRP based on an uplink measurement of one or more Tx beams transmitted by the wireless device.

A base station may perform DL L1 and/or L2 beam management procedures associated with one or more TRPs. A first beam management procedure may enable a wireless device to measure one or more TRP Tx beams to support selection of TRP Tx beam(s) and/or wireless device Rx beam(s). Beamforming may be performed using an intra-TRP and/or an inter-TRP Tx beam sweep from a set of different beams. A wireless device may perform beamforming using a Rx beam sweep from a set of different beams. A second beam management procedure may enable a wireless device to measure different TRP Tx beams to configure inter-TRP beam(s) and/or intra-TRP Tx beam(s). The second beam management procedure may use a subset of transmission beams used for the first beam management procedure. A third beam management procedure may enable a wireless device to measure a TRP Tx beam to change an Rx beam associated with a wireless device (e.g., a beam used for beamforming). The beam management procedures may support network-triggered aperiodic beam reporting.

A wireless device measurement for beam management based on a reference signal (RS), such as a channel state information reference signal (CSI-RS), may be based on a total number of configured beams "K," and/or a number of selected Tx beams "N." This measurement may apply to wireless devices. Reporting information may include measurement quantities for N beam(s) and information indicating N DL Tx beam(s), if N<K. If a wireless device is configured with K>1 non-zero power (NZP) CSI-RS resources, a wireless device may report N CSI-RS resource indicators (CRIs). A wireless device may be configured with multiple reporting settings, and/or multiple resource settings. The reporting settings and resource settings may be configured via a CSI measurement setting. Resource and reporting settings may support one or more beam management procedures, as discussed above, utilizing CSI-RSs. One or more beam management procedures may be supported with or without reporting setting. A reporting setting may include, for example: information indicating selected beam(s); L1 measurement reporting; time-domain behavior (e.g., aperiodic, periodic, or semi-persistent); and/or frequency-granularity (e.g., if multiple frequency granularities are supported). A resource setting may include: time-domain behavior (e.g. aperiodic, periodic, or semi-persistent); RS type (e.g., NZP CSI-RS); and/or at least one CSI-RS resource set. Each CSI-RS resource set may have K≥1 CSI-RS resources. Some parameters of K CSI-RS resources may be the same (e.g., port number, time-domain behavior, density, and/or periodicity may be the same).

A wireless device may report information about TRP Tx Beam(s) that may be received using selected wireless device Rx beam set(s). A Rx beam set may refer to a set of wireless device Rx beams that may be used for receiving a DL signal. A wireless device may construct the Rx beam set in multiple ways. Each Rx beam in a wireless device Rx beam set may correspond to a selected Rx beam in each panel. For wireless devices with more than one wireless device Rx beam sets, the wireless device may report TRP Tx Beam(s) and an identifier of the associated wireless device Rx beam set for each reported TX beam(s). Different TRP Tx beams reported for the same Rx beam set may be received simultaneously at the wireless device.

A wireless device may report information about TRP Tx Beam(s) for each wireless device antenna group, wherein a wireless device antenna group may refer to a wireless device receiving antenna panel or subarray. For wireless devices with more than one wireless device antenna group, the wireless device may report TRP Tx Beam(s) and an identifier of the associated wireless device antenna group for each reported Tx beam. The wireless device may simultaneously receive different Tx beams for different antenna groups.

Beam reporting may be performed for a number of "L" groups. Each of the L groups may refer to a Rx beam set or a wireless device antenna group. For each group, a wireless device may report, for example, the following information: information indicating a group; measurement quantities for N beam(s) of L group(s), which may support L1 RSRP and CSI reporting (e.g., when CSI-RS is for CSI acquisition); and/or information indicating a number of DL Tx beam(s). Group-based beam reporting may be configurable for each wireless device. Group-based beam reporting may be turned off independently for each wireless device, such as when a group only comprises a single beam. If group-based beam reporting is turned off, a group identifier may be excluded.

A wireless device may trigger a mechanism to recover from beam failure. A beam failure event may occur if, for example, the quality of beam pair link(s) of an associated control channel falls too low (e.g., falls below a threshold), and/or if there is a time-out of an associated timer before any transmission is received. A mechanism to recover from beam failure may be triggered if a beam failure occurs. A wireless device may be configured with resources for UL transmission of signals for beam failure recovery. Configurations of resources may be supported wherein the base station may monitor from all or partial directions (e.g., a random access region). The UL transmission/resources to report beam failure may be located in the same time instance as a PRACH (or resources orthogonal to PRACH resources) and/or at a time instance (which may be configurable for a wireless device) different from a PRACH. Transmission of DL signals may support the wireless device monitoring beams for identifying newly detected beams.

Beam management may be performed with and without beam-related indication. Information pertaining to wireless device-side beamforming and/or receiving procedure used for CSI-RS-based measurement may be indicated through Quasi Co-Location (QCL) to a wireless device, for example, if beam-related information is provided. The same or different beams may be used on a control channel and for corresponding data channel transmissions.

PDCCH (e.g., NR-PDCCH) transmissions may provide protections against beam pair link blocking. A wireless device may be configured to monitor NR-PDCCH on "M" beam pair links simultaneously, wherein M≥1, and wherein the maximum value of M may be determined based on wireless device capability. A wireless device may be configured to monitor NR-PDCCH on different beam pair link(s) in different NR-PDCCH OFDM symbols. Parameters related to wireless device Rx beam setting for monitoring NR-PDCCH on multiple beam pair links may be configured by higher layer signaling, MAC CE, and/or considered in the search space design. Indication of spatial QCL assumption between an DL RS antenna port(s) or DL RS antenna port(s) for demodulation of DL control channel may be provided. Candidate signaling methods for beam indication corresponding to a NR-PDCCH (such as a configuration method to monitor NR-PDCCH) may be MAC CE signaling, RRC signaling, DCI signaling, specification-transparent signaling, and/or implicit method signaling.

Indication of spatial QCL assumption between DL RS antenna port(s) and DMRS antenna port(s) of DL data channel (e.g., to support reception of a unicast DL data channel) may be provided. Information indicating the RS antenna port(s) may be indicated via a DCI (e.g., downlink grants). The information may indicate the RS antenna port(s) which may be QCL-ed with DMRS antenna port(s). Different sets of DMRS antenna port(s) for the DL data channel may be indicated using QCL with different set of RS antenna port(s).

Figure 15:
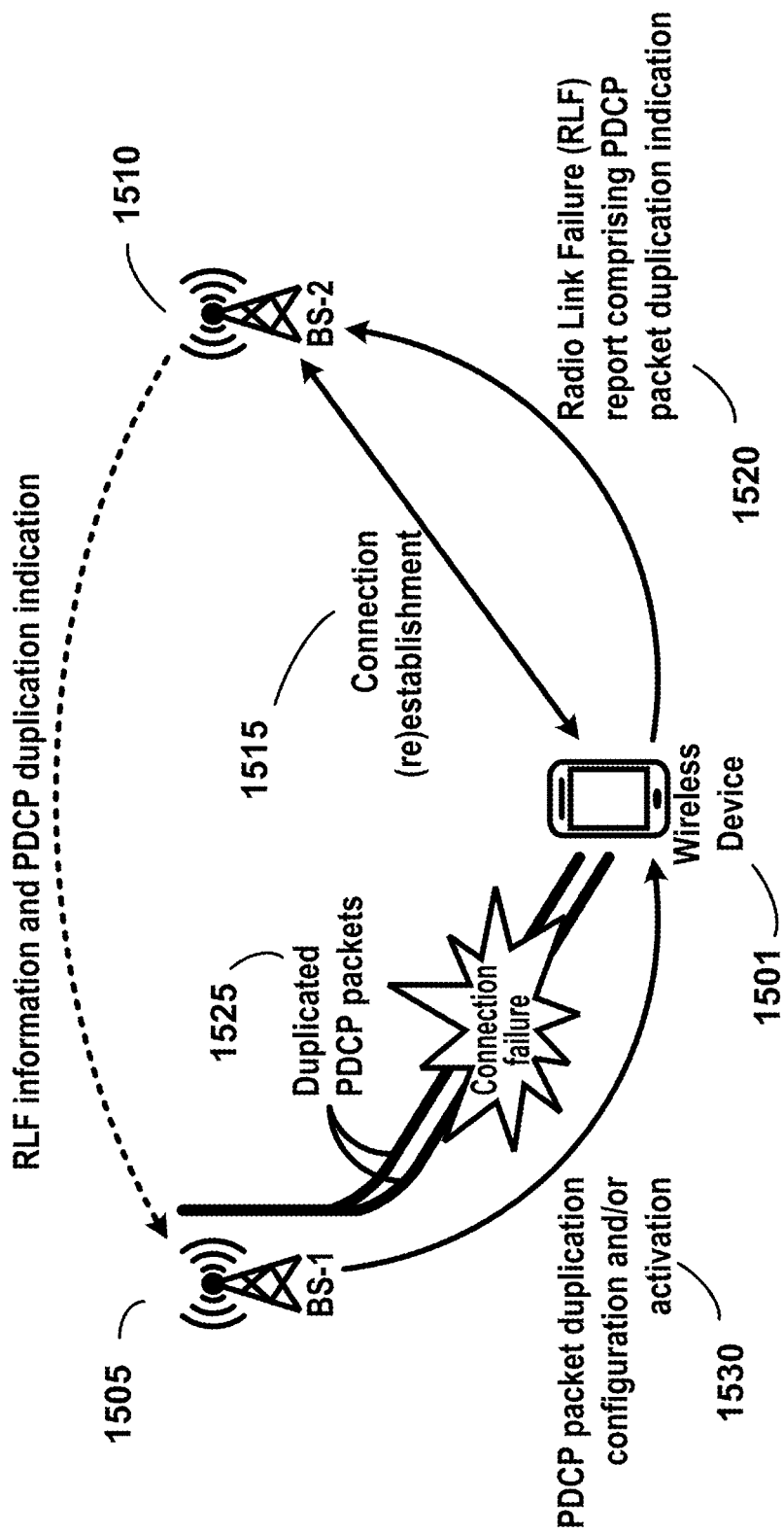
FIG. 15 shows an example of packet duplication and radio link failure (RLF).

FIG. 15 shows an example of packet duplication and radio link failure (RLF). A wireless device 1501 may receive, from a first base station 1505, beam information corresponding to a first cell served by the first base station 1505. The wireless device 1501 may be a wireless device 406. The first base station 1505 may be a base station 401. One or more elements of the beam information may be transmitted, from the first base station 1505 to the wireless device 1501, via, for example: one or more broadcasted messages, one or more radio resource control (RRC) messages, one or more physical layer signals, etc. Beam information may be recognized by the wireless device 1501 based on one or more synchronization signals (e.g., SS block) and/or one or more reference signals (e.g., CSI-RS, DM-RS). The beam information may comprise, for example, a beam identifier, beam scheduling information, beam configuration information, synchronization signal scheduling information, synchronization signal sequence information, a synchronization signal block identifier, reference signal scheduling information, reference signal configuration information, and/or reference signal block identifier.

Based on one or more elements of the beam information, the wireless device 1501 may receive one or more radio resource control messages via one or more first beams of the first cell. The one or more first beams may be associated with one or more elements of the beam information. The wireless device 1501 may transmit and/or receive one or more radio resource control messages, and/or one or more data packets based on one or more of the one or more radio resource control messages, via one or more of the one or more first beams. The wireless device 1501 may be in a radio resource control connected state (RRC connected state). The wireless device 1501 may have a radio resource control connection with the first base station 1505 via the first cell and/or one or more of the first beams.

A wireless device 1501 in a radio resource control connected state may detect a radio link failure from the first cell. The wireless device 1501 may determine the radio link failure based on: one or more failure events of an out-of-sync detection of a physical layer, one or more random access failures, a plurality of retransmissions of a radio link control layer (RLC layer), one or more timer expirations, etc. The one or more failure events may occur in the first cell and/or one or more of the first beams. The radio link failure may be determined separately for each beam of the one or more first beams. The radio link failure may be determined based on detecting multiple beam failures. If the wireless device 1501 detects an out-of-sync in one beam and detects an in-sync connection via another beam, the wireless device 1501 may determine there is not a radio link failure. The wireless device 1501 may count a number of random access failures and/or a number of retransmissions in an RLC layer for each beam separately and/or for multiple beams, collectively. The wireless device 1501 may determine a timer expiration for one or more beams.

The wireless device, 1501 based on detecting a radio link failure, may select a second cell served by a second base station 1510. The second base station 1510 may be a base station 401. The second cell may be the first cell. Through one or more random access procedures, the wireless device 1501 may establish a radio resource control connection 1515 with the second base station 1510 via the second cell. The wireless device 1501 may establish the radio resource control connection 1515 via: a radio resource control reconfiguration procedure, a radio resource control reestablishment procedure, and/or a radio resource control setup procedure. The second base station 1510 may request a radio link failure report from the wireless device 1501 connected, via the second cell, to the second base station 1510.

The wireless device 1501 may transmit, to the second base station 1510, a first message comprising a radio link failure report (RLF report) via the second cell. The radio link failure report may comprise one or more elements of the beam information received from the first base station 1505 via the first cell. The radio link failure report may comprise: one or more elements of the beam information, a reference signal received power (RSRP), a reference signal received quality (RSRQ), a combined reference signal received power, and/or a combined reference signal received quality. The combined reference signal received quality may comprise: a beam that the wireless device 1501 recently connected to in the first cell, one or more beams that the wireless device 1501 established a beam pair link with in the first cell, one or more beams that the wireless device 1501 attempted to recover a beam pair link with, one or more beams that the first base station 1505 assigned to the wireless device 1501, one or more beams that the wireless device 1501 attempted to use in a random access connection, one or more neighboring beams, etc. The first message may further comprise one or more network slice identifiers of one or more network slices served from the first base station 1505 to the wireless device 1501.

The combined reference signal received power may be determined by combining one or more reference signal received powers of one or more beams (e.g., averaging one or more RSRPs of one or more beams), and/or by combining one or more reference signal received qualities of one or more beams (e.g., averaging one or more RSRQs of one or more beams).

The radio link failure report may comprise, for example: a radio link failure cause (e.g., one or more timer expiration, t310-Expiry, t312-Expiry, a random access problem, a maximum number of RLC layer retransmissions, etc.), a failed primary cell identifier, a recent serving cell RSRQ type, a recent serving beam RSRQ type, one or more measurement result for one or more beams and/or one or more cells, a reestablishment cell identifier, beam information associated with one or more beams of a reestablishment cell, a previous primary cell identifier, etc. The radio link failure report may comprise information regarding whether an RSRP and/or an RSRQ of one or more beams and/or one or more cells was measured based on a synchronization signal (e.g., SS block) or based on a reference signal (e.g., CSI-RS, DM-RS). The radio link failure report may comprise a cell quality information of a recently connected cell, a recent serving cell, a failed primary cell, and/or one or more neighboring cells. The cell quality information may be determined, for example, by combining one or more RSRPs of one or more beams and/or by combining one or more RSRQs of one or more beams. The radio link failure report may comprise a number of beams considered to determine a cell quality of: the first cell, one or more other recent serving cells, and/or one or more recent neighboring cells.

The radio link failure report may comprise information regarding whether one or more failed random access attempts was a 2-stage random access attempt or a 4-stage random access attempt. The radio link failure report may comprise information regarding whether one or more failed random access attempts was a contention-free random access attempt or a contention-based random access attempt. The radio link failure report may comprise a number of beams used by the wireless device for attempted random access.

The radio link failure report may comprise: beam information of one or more target beams for a failed handover, beam information of one or more serving beams for a failed handover, beam information associated with one or more recently connected beams of a recently connected cell associated with a failed handover, and/or beam information of one or more neighboring beams of a neighbor cell for a failed handover. The radio link failure report may comprise: a reference signal received power (RSRP) of a target beam of a target cell associated with a failed handover, a reference signal received quality (RSRQ) of a target beam of a target cell associated with a failed handover, a combined reference signal received power of one or more target beams of a target cell associated with a failed handover, and/or a combined reference signal received quality of one or more target beams of a target cell for a failed handover. The radio link failure report may comprise an RSRP of a neighboring beam of a neighboring cell associated with a failed handover, an RSRQ of a neighboring beam of a neighboring cell associated with a failed handover, a combined reference signal received power of one or more neighboring beams of a neighboring cell associated with a failed handover, and/or a combined reference signal received quality of one or more neighboring beams of a neighboring cell associated with a failed handover.

The radio link failure report may comprise an RSRP and/or an RSRQ of a serving beam associated with a failed handover. The radio link failure report may comprise a combined reference signal received power and/or a combined reference signal received quality of one or more serving beams associated with a failed handover. The radio link failure report may comprise an RSRP and/or an RSRQ of a recently connected beam of a last connected cell associated with a failed handover. The radio link failure report may comprise a combined reference signal received power and/or a combined reference signal received quality of one or more recently connected beams of a recently connected cell associated with a failed handover.

The second base station 1510 that receives the first message from the wireless device 1501 may transmit one or more elements of the first message to the first base station 1505. Based on receiving the one or more elements of the first message, the first base station 1505 may configure one or more system control parameters based on the one or more elements of the first message. The one or more system control parameters may comprise one or more beam configuration parameters, one or more radio resource power parameters, one or more random access resource parameters, one or more mobility parameters, a radio signal received quality threshold for initiating a handover, a radio signal received power threshold for initiating a handover, etc. The first base station 1505 may initiate a wireless device handover based on the one or more system control parameters, wherein the one or more system control parameters may be based on the one or more elements of the first message. The first base station 1505 may configure one or more mobility parameters for the wireless device 1501 with one or more network slices based on the one or more elements of the first message.

The first base station 1505 may transmit a command for configuration and/or activation of duplication of Packet Data Convergence Protocol (PDCP) packets 1530 associated with a bearer (e.g., a signaling radio bearer or a data radio bearer) for a wireless device 1501. Duplicated PDCP packets 1525 may be transmitted via different cells from cells employed to transmit original PDCP packets. The duplicated PDCP packets 1525 may be transmitted using a general packet radio service tunneling protocol (GTP) tunnel that may be different from a general packet radio service tunneling protocol (GTP) tunnel used for original PDCP packets. PDCP packet duplication may decrease the risk of radio link failures because of diversity gain of packet transmissions. The wireless device 1501 may provide, to the first base station 1505 or a new base station (e.g., the second base station 1510), a radio link failure report 1520 indicating that PDCP packets for a bearer were duplicated in a previous Radio Resource Control (RRC) connection to one or more previously connected base stations in which the wireless device experienced a Radio Link Failure (RLF) and/or a Handover Failure (HOF).

A wireless device 1501 that experiences an RLF and/or a HOF may try to make an RRC connection to the first cell or a new cell. If the wireless device 1501 establishes (or reestablishes) an RRC connection to the new cell, the wireless device 1501 may transmit an RLF report to a base station serving the new cell (e.g., the second base station 1510). The base station (e.g., the second base station 1510) may send information of the radio link failure of the wireless device 1501 to an old base station (e.g., the first base station 1505) where the wireless device 1501 experienced the RLF (and/or the HOF) and/or where a mobility procedure that caused the radio link failure (and/or the HOF) was initiated. The old base station (e.g., the first base station 1505) receiving the information of the radio link failure for the wireless device 1501 may analyze a reason of the radio link failure and/or may reconfigure one or more configuration parameters and/or mobility settings for initiating a handover. The above may have the advantage of enabling a base station to analyze the radio link failure and/or to reconfigure mobility settings with respect to configuration of PDCP packet duplication based on the information of the RLF of the wireless device 1501.

Figure 16:
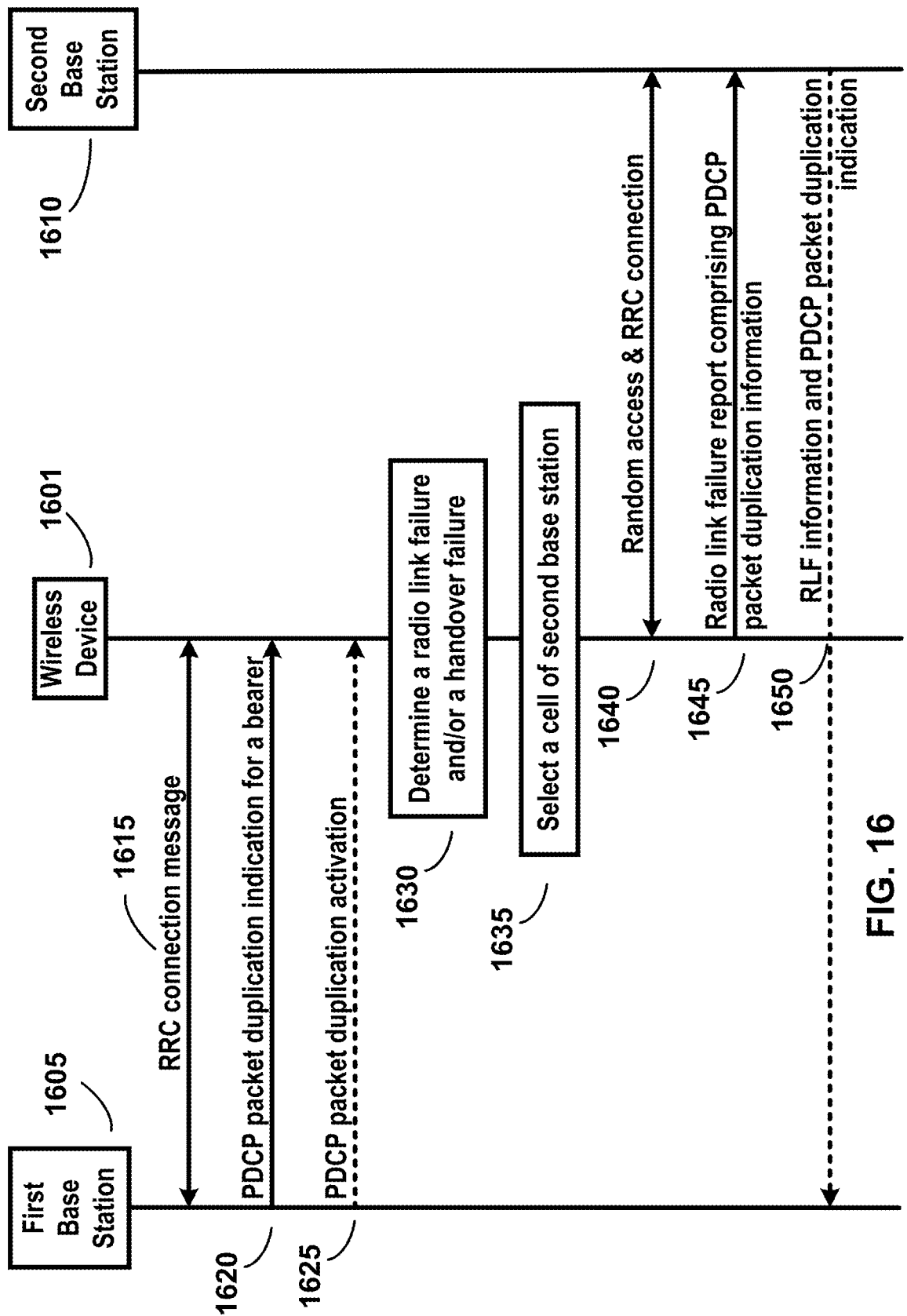
FIG. 16 shows an example message flow associated with RLF.

FIG. 16 shows an example message flow associated with RLF. A first wireless device 1601 (which may be the wireless device 1501) may receive, from a first base station 1605 (which may be the first base station 1505), a first Radio Resource Control (RRC) message 1615. The first RRC message 1615 may be an RRC connection reconfiguration message, an RRC connection reestablishment message, an RRC connection setup message, an RRC connection resume message, etc. The first RRC message 1615 may comprise bearer configuration information of one or more bearers (e.g., a signaling radio bearer, a data radio bearer, a logical channel, a QoS flow, a PDCU session, etc.). The first RRC message 1615 may comprise a Packet Data Convergence Protocol (PDCP) packet duplication indication 1620 indicating that one or more PDCP packets associated with a first bearer are duplicated, and/or that original PDCP packets and duplicated PDCP packets may be transmitted independently. Original PDCP packets of the one or more PDCP packets may be transmitted via one or more cells different from one or more other cells via which duplicated PDCP packets are transmitted. The one or more cells and/or the one or more other cells may be served by the first base station 1605 and/or a second base station 1610 (which may be the second base station 1510) for the first wireless device 1601. The second base station 1610 may be a secondary base station.

PDCP packets associated with the first bearer may be duplicated one or more times. The first bearer may be mapped to an original logical channel (and/or an original GTP tunnel) and/or multiple duplicated logical channels (and/or multiple GTP tunnels). Some portion of PDCP packets associated with the first bearer may be duplicated and transmitted separately from original PDCP packets. An amount of the some portion may be configured by the first base station 1605 and/or the second base station 1610 for the first wireless device 1601 via the first RRC message 1615 and/or via a Medium Access Control Control Element (MAC CE) message. The amount of the some portion may be between 0% and 100% of original PDCP packets.

The first bearer may be a Signaling Radio Bearer (SRB) associated with control plane signaling transmissions. The first wireless device 1601 and/or the first base station 1605 may determine an RLF (and/or an HOF) when a number of Radio Link Control (RLC) layer packet retransmissions associated with the first bearer reaches a threshold value. If a number of RLC layer packet retransmissions associated with original PDCP packets of the first bearer reaches the threshold value, the first wireless device 1601 and/or the first base station 1605 may determine an RLF (and/or an HOF). If a number of RLC layer packet retransmissions associated with duplicated PDCP packets of the first bearer reaches the threshold value, the first wireless device 1601 and/or the first base station 1605 may determine an RLF (and/or an HOF).

The first wireless device 1601 may receive, from the first base station 1605, a first MAC CE message comprising a PDCP packet duplication activation request 1625 (which may be a request, a command or an indication) for the wireless device to begin transmitting duplicated PDCP packets. Based on the first MAC CE message, the first wireless device 1601 may transmit, to a device (e.g., the first base station 1605, the second base station 1610 for the first wireless device 1601, one or more other wireless devices, etc.), one or more duplicated PDCP packets associated with the first bearer at least based on the PDCP packet duplication indication. The first RRC message 1615 may comprise an indication of initiating or stopping (e.g., activating or deactivating) transmission of duplicated PDCP packets associated with the PDCP packet duplication indication.

The first wireless device 1601 may receive, from the first base station 1605, a second MAC CE message comprising a request for the wireless device to cease transmitting duplicated PDCP packets associated with the PDCP packet duplication indication. Based on the second MAC CE message, the first wireless device 1601 may stop transmitting (e.g., to the first base station 1605, to the second base station 1610, to one or more other wireless devices, etc.) duplicated PDCP packets associated with the first bearer based on the PDCP packet duplication indication.

At step 1630, the first wireless device 1601 may determine a connection failure associated with one or more first cells of the first base station 1605 (and/or the second base station 1610 for the first wireless device 1601). The connection failure may be an RLF and/or an HOF. The connection failure may be determined based on: a number of RLC packet retransmissions, out-of-sync detection, one or more random access failures, etc. The first wireless device 1601 may determine an RLF (and/or an HOF) if a number of Radio Link Control (RLC) layer packet retransmissions associated with the first bearer exceeds (or meets) a threshold value. If a number of RLC layer packet retransmissions associated with original PDCP packets and/or duplicated PDCP packets of the first bearer exceeds (or meets) a threshold value, the first wireless device 1601 may determine an RLF (and/or an HOF).

If a device (e.g., a base station and/or a wireless device) detects that a number of RLC layer packet retransmissions associated with original PDCP packets of the first bearer exceeds (or meets) a threshold value, the device may report the detection from an RLC layer to an RRC layer. If the device detects that a number of RLC layer packet retransmissions associated with duplicated PDCP packets of the first bearer exceeds (or meets) a threshold value, the device may report the detection from an RLC layer to an RRC layer. The device (e.g., at an RRC layer) may determine an RLF (and/or an HOF) based on the received reports from RLC layer. The device (e.g., at an RRC layer) may determine an RLF (and/or an HOF) if it receives the report indicating that a number of RLC layer packet retransmissions associated with original PDCP packets of the first bearer exceeds (or meets) a threshold value. The device (e.g., at an RRC layer) may determine an RLF (and/or an HOF) if it receives the report indicating that a number of RLC layer packet retransmissions associated with duplicated PDCP packets of the first bearer exceeds (or meets) a threshold value. The device (e.g., at an RRC layer) may determine an RLF (and/or an HOF) if it receives both a first report and a second report, wherein the first report indicates that a number of RLC layer packet retransmissions associated with original PDCP packets of the first bearer exceeds (or meets) a threshold value, and a second report indicates that a number of RLC layer packet retransmissions associated with duplicated PDCP packets of the first bearer exceeds (or meets) a threshold value.

The first wireless device 1601, based on determining a connection failure, may select a second cell of a second base station 1610 for an RRC connection to the second base station 1610 at step 1635. The second cell may be one of the one or more first cells of the first base station 1605 and/or the second base station 1610. The first wireless device 1601 may select the second cell based on a reference signal received power (RSRP) and/or a reference signal received quality (RSRQ) of the second cell.

Based on selecting the second cell for an RRC connection to the second base station 1610, the first wireless device 1601 may initiate a random access (RA) procedure 1640, via the second cell, by transmitting, via the second cell, one or more random access preambles. In performing the RA procedure 1640, the first wireless device 1601 may transmit a second RRC message to the second base station 1610 via the second cell. The second RRC message may comprise, for example, one or more of: an RRC connection reestablishment request message, an RRC connection request message, an RRC connection resume request message, an RRC connection reestablishment complete message, an RRC connection setup complete message, an RRC connection resume complete message, an RLF information availability indication 1650, and/or an RLF report 1645. The RLF information availability indication 1650 may indicate that the first wireless device 1601 has RLF information and/or HOF information. Based on the connection failure, the first wireless device 1601 may indicate that the first wireless device 1601 has RLF information and/or HOF information via the RLF information availability indication to the second base station 1610.

Based on the second RRC message and/or completion of the RA procedure, the first wireless device 1601 may receive a request message from the second base station 1610. This may occur as part of the RA procedure 1640 (e.g., the request message may be an RRC message associated with RA procedure 1640). The request message may comprise one or more of a wireless device information request message and/or an RLF report request configured to request an RLF report for an RLF and/or an HOF.

Based on the request message received from the second base station 1610 and/or based on the second RRC message and/or completion of the RA procedure 1640, the first wireless device 1601 may transmit a report message 1645. The report message 1645 may comprise one or more of a wireless device information response message, and/or an RLF report.

The RLF report of the second RRC message and/or of the report message may comprise PDCP packet duplication information associated with the previous RRC connection (e.g., a previous RRC connection associated with the first base station 1605 and/or the second base station 1610 for the first wireless device 1601). The PDCP packet duplication information may comprise, for example: a PDCP packet duplication activation indication, a PDCP packet duplication configuration indication, a bearer identifier of the first bearer, a bearer type of the first bearer (e.g., SRB0, SRB1, SRB2, data radio bearer, etc.), a number of bearers that configured for PDCP packet duplication, one or more logical channel identifiers of one or more logical channels associated with duplicated PDCP packets and/or original packets, a duplicated portion of a PDCP packet duplication, a number of duplications, an RLF cause, one or more cell identifiers of one or more cells employed to transmit original PDCP packets, one or more cell identifiers of one or more cells employed to transmit duplicated PDCP packets, one or more base station identifiers of one or more base stations employed to transmit original PDCP packets (e.g., a base station identifier of the first base station 1605 and/or the second base station 1610 for the first wireless device 1601), one or more base station identifiers of one or more base stations employed to transmit duplicated PDCP packets (e.g., a base station identifier of the first base station 1605 and/or the second base station 1610 for the first wireless device 1601), etc.

The PDCP packet duplication activation indication may be configured to indicate that one or more bearers (e.g., the first bearer, one or more SRBs, one or more DRBs, etc.) have been configured for PDCP packet duplication by the first base station 1605 via the first MAC CE message and/or via the first RRC message (e.g., before the time of the connection failure). The PDCP packet duplication configuration indication may be configured to indicate that a PDCP packet duplication for one or more bearers (e.g., the first bearer, one or more SRBs, one or more DRBs, etc.) was configured by the first base station 1605 via the first RRC message (e.g., before the time of the connection failure). The PDCP packet duplication configuration indication may be configured to indicate that duplicated PDCP packets for one or more bearers (e.g., the first bearer, one or more SRBs, one or more DRBs, etc.) were being transmitted at the time of the connection failure.

The number of bearers configured for PDCP packet duplication may indicate a number of bearers that were duplicated. The number may be 1, for example, if only the first bearer was duplicated. The number may be larger than 1, for example, if one or more bearers other than the first bearer were configured and/or activated for PDCP packet duplication.

The duplicated portion of a duplicated PDCP packet may be configured to indicate how much portion of original PDCP packets were duplicated for the first bearer. The duplicated portion of a duplicated PDCP packet may be a value between 0% and 100%.

The number of duplications may indicate how many duplications were configured and/or activated for PDCP packets associated with the first bearer. The number of duplications may indicate how many logical channels (e.g., one logical channel for original PDCP packets, and/or one or more logical channels for one or more duplications of original PDCP packets) for PDCP packets were mapped (e.g., configured and/or activated) for the first bearer.

The RLF cause may indicate that a reason of the connection failure was one or more of a number of RLC packet retransmissions (e.g., a number of RLC packet retransmissions exceeds a threshold value), one or more out-of-sync detection indications (e.g., an RRC layer receives, from a lower layer, one or more out-of-sync detection indication, and/or the synchronization was not recovered within a threshold time duration), one or more random access failures (e.g. the first wireless device failed in one or more random access attempts), etc.

Based on receiving the RLF report, the second base station 1610 may send, to the first base station 1605, a message 1650 comprising one or more elements of the RLF report. The one or more elements may be sent directly or indirectly (e.g., via direct interface such as X2 interface or Xn interface, and/or via core network entity such as MME and/or AMF). The one or more elements of the RLF report may be sent via a handover report message and/or via an RLF indication message. The first base station 1605 may configure one or more control parameters based on the one or more elements of the RLF report. The one or more control parameters may comprise one or more handover parameters (e.g., a radio signal received quality threshold, a radio signal received power threshold for a handover initiation, etc.), one or more PDCP packet duplication configuration parameters for one or more bearers of one or more wireless devices, and/or other radio configuration parameters associated with one or more cells and/or one or more wireless devices.

If PDCP packet duplication for an SRB of a first wireless device 1601 was not configured and/or was not activated at the time of the connection failure, a first base station 1605 may configure and/or activate an SRB of another wireless device that has similar radio signal measurement results to the first wireless device 1601.

The first base station 1605 may initiate a handover of a second wireless device based on the one or more control parameters. The one or more control parameters may be configured based on the one or more elements of the RLF report. If PDCP packet duplication for an SRB of the first wireless device 1601 was configured and/or activated at the time of the connection failure of the first wireless device 1601, the first base station 1605 may initiate a handover for the second wireless device earlier than for the first wireless device 1601 (e.g., if the first base station 1605 configured and/or activated a PDCP packet duplication for an SRB of the second wireless device).

A first wireless device 1601 may receive, from a first base station 1605, a first Radio Resource Control (RRC) message comprising a Packet Data Convergence Protocol (PDCP) packet duplication indication indicating that a plurality of PDCP packets associated with a first bearer are duplicated. The first wireless device 1601 may receive a Medium Access Control Control Element (MAC CE) message indicating an activation of transmitting duplicated PDCP packets associated with the PDCP packet duplication indication. The first wireless device 1601 may transmit one or more duplicated packets associated with the first bearer based on the PDCP packet duplication indication and/or the MAC CE message. The first wireless device 1601 may determine a connection failure from a first cell of the first base station 1605. The first wireless device 1601 may select a second cell of a second base station 1610 for an RRC connection to the second base station 1610 based on the connection failure. The first wireless device 1601 may transmit, to the second base station 1610 via the second cell, a second RRC message comprising a Radio Link Failure (RLF) report associated with the connection failure, wherein the RLF report may comprise PDCP packet duplication information indicating one or more of: activation of a duplicated PDCP packet transmission; and/or configuration of PDCP packet duplication for at least one bearer.

The first base station 1605 may receive, from the second base station 1610, one or more elements of the RLF report. The first base station 1605 may configure one or more control parameters based on the one or more elements of the RLF report. The first base station 1605 may initiate a handover of a second wireless device based on the one or more control parameters. The one or more control parameters may comprise one or more of a radio signal received quality threshold or a radio signal received power threshold for a handover initiation. The one or more control parameters may comprise one or more PDCP duplication configuration parameters for one or more bearers of one or more wireless devices.

The connection failure may be one or more of a radio link failure and/or a handover failure. The first base station 1605 may be the second base station 1610. The first cell may be the second cell. The RLF report may comprise one or more cell identifiers of one or more cells (e.g., one or more cells via which the duplicated plurality of PDCP packets of at least one bearer were transmitted). The first bearer may be a Signaling Radio Bearer (SRB). The determination of the connection failure may be based on a number of RLC retransmissions of one or more packets associated with: original PDCP packets of the first bearer; and/or duplicated PDCP packets of the first bearer. The determination of the connection failure may be based on: a number of RLC retransmissions; one or more out-of-sync detections; and/or one or more random access failures.

Figure 17:
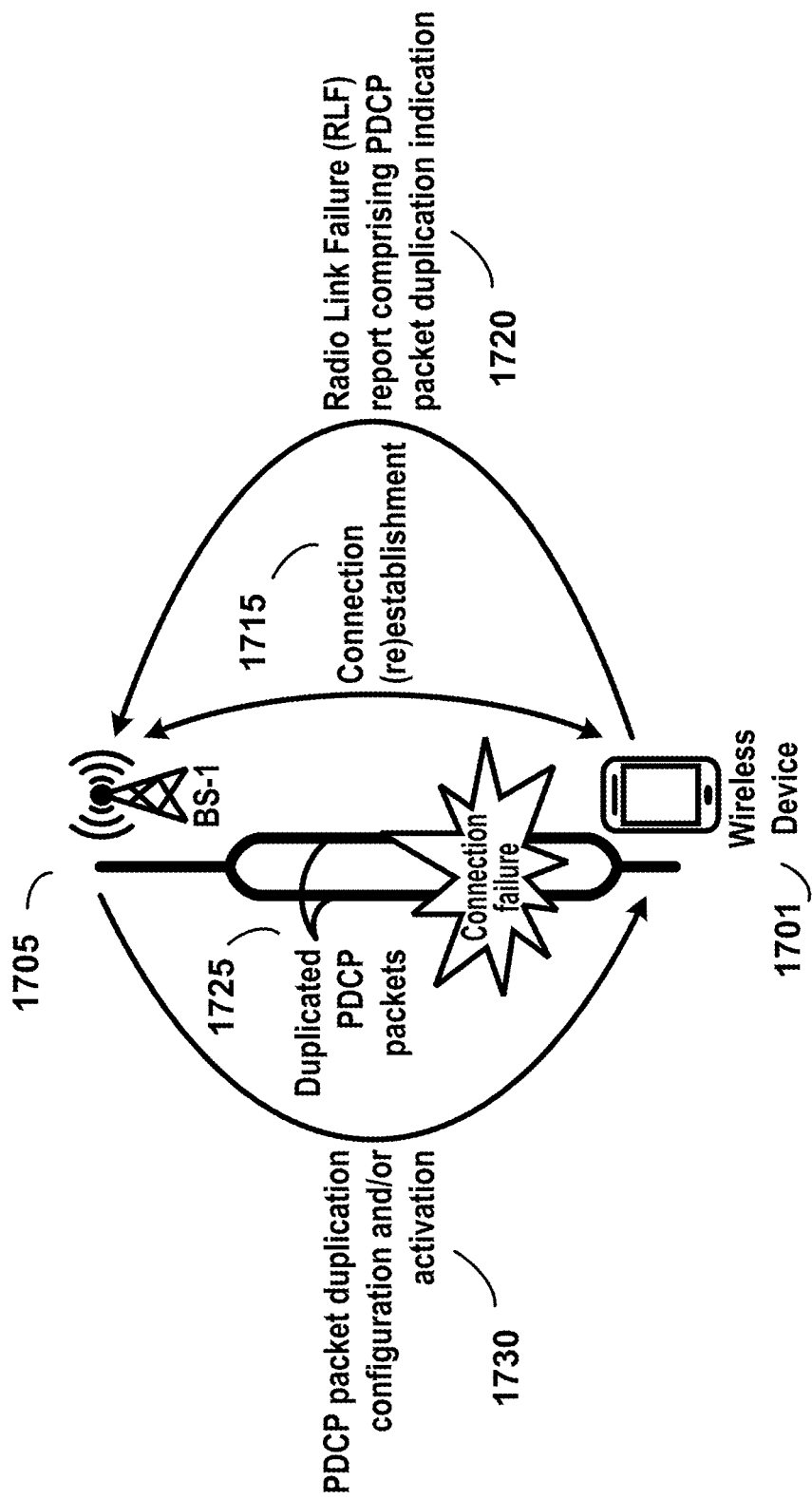
FIG. 17 shows an example of packet duplication and RLF.

FIG. 17 shows an example of packet duplication and radio link failure (RLF). A wireless device 1701 may receive, from a first base station 1705, beam information corresponding to a first cell served by the first base station 1705. The wireless device 1701 may be a wireless device 406. The first base station 1705 may be a base station 401. One or more elements of the beam information may be transmitted, from the first base station 1705 to the wireless device 1701, via, for example: one or more broadcasted messages, one or more radio resource control (RRC) messages, one or more physical layer signals, etc. Beam information may be recognized by the wireless device 1701 based on one or more synchronization signals (e.g., SS block) and/or one or more reference signals (e.g., CSI-RS, DM-RS). The beam information may comprise, for example, a beam identifier, beam scheduling information, beam configuration information, synchronization signal scheduling information, synchronization signal sequence information, a synchronization signal block identifier, reference signal scheduling information, reference signal configuration information, and/or reference signal block identifier.

Based on one or more elements of the beam information, the wireless device 1701 may receive one or more radio resource control messages via one or more first beams of the first cell. The one or more first beams may be associated with one or more elements of the beam information. The wireless device 1701 may transmit and/or receive one or more radio resource control messages, and/or one or more data packets based on one or more of the one or more radio resource control messages, via one or more of the one or more first beams. The wireless device 1701 may be in a radio resource control connected state (RRC connected state). The wireless device 1701 may have a radio resource control connection with the first base station 1705 via the first cell and/or one or more of the first beams.

A wireless device 1701 in a radio resource control connected state may detect a radio link failure from the first cell. The wireless device 1701 may determine the radio link failure based on: one or more failure events of an out-of-sync detection of a physical layer, one or more random access failures, a plurality of retransmissions of a radio link control layer (RLC layer), one or more timer expirations, etc. The one or more failure events may occur in the first cell and/or one or more of the first beams. The radio link failure may be determined separately for each beam of the one or more first beams. The radio link failure may be determined based on detecting multiple beam failures. If the wireless device 1701 detects an out-of-sync in one beam and detects an in-sync connection via another beam, the wireless device 1701 may determine there is not a radio link failure. The wireless device 1701 may count a number of random access failures and/or a number of retransmissions in an RLC layer for each beam separately and/or for multiple beams, collectively. The wireless device 1701 may determine a timer expiration for one or more beams.

The wireless device, 1701 based on detecting a radio link failure, may select a second cell served by the first base station 1705. The first base station 1705 may be a base station 401. The second cell may be the first cell. Through one or more random access procedures, the wireless device 1701 may establish a radio resource control connection 1715 with the first base station 1705 via the second cell. The wireless device 1701 may establish the radio resource control connection 1715 via: a radio resource control reconfiguration procedure, a radio resource control reestablishment procedure, and/or a radio resource control setup procedure. The first base station 1705 may request a radio link failure report from the wireless device 1701 connected, via the second cell, to the first base station 1705.

The wireless device 1701 may transmit, to the first base station 1705, a first message comprising a radio link failure report (RLF report) via the second cell. The radio link failure report may comprise one or more elements of the beam information received from the first base station 1705 via the first cell. The radio link failure report may comprise: one or more elements of the beam information, a reference signal received power (RSRP), a reference signal received quality (RSRQ), a combined reference signal received power, and/or a combined reference signal received quality. The combined reference signal received quality may comprise: a beam that the wireless device 1701 recently connected to in the first cell, one or more beams that the wireless device 1701 established a beam pair link with in the first cell, one or more beams that the wireless device 1701 attempted to recover a beam pair link with, one or more beams that the first base station 1705 assigned to the wireless device 1701, one or more beams that the wireless device 1701 attempted to use in a random access connection, one or more neighboring beams, etc. The first message may further comprise one or more network slice identifiers of one or more network slices served from the first base station 1705 to the wireless device 1701.

The combined reference signal received power may be determined by combining one or more reference signal received powers of one or more beams (e.g., averaging one or more RSRPs of one or more beams), and/or by combining one or more reference signal received qualities of one or more beams (e.g., averaging one or more RSRQs of one or more beams).

The radio link failure report may comprise, for example: a radio link failure cause (e.g., one or more timer expiration, t310-Expiry, t312-Expiry, a random access problem, a maximum number of RLC layer retransmissions, etc.), a failed primary cell identifier, a recent serving cell RSRQ type, a recent serving beam RSRQ type, one or more measurement result for one or more beams and/or one or more cells, a reestablishment cell identifier, beam information associated with one or more beams of a reestablishment cell, a previous primary cell identifier, etc. The radio link failure report may comprise information regarding whether an RSRP and/or an RSRQ of one or more beams and/or one or more cells was measured based on a synchronization signal (e.g., SS block) or based on a reference signal (e.g., CSI-RS, DM-RS). The radio link failure report may comprise a cell quality information of a recently connected cell, a recent serving cell, a failed primary cell, and/or one or more neighboring cells. The cell quality information may be determined, for example, by combining one or more RSRPs of one or more beams and/or by combining one or more RSRQs of one or more beams. The radio link failure report may comprise a number of beams considered to determine a cell quality of: the first cell, one or more other recent serving cells, and/or one or more recent neighboring cells.

The radio link failure report may comprise information regarding whether one or more failed random access attempts was a 2-stage random access attempt or a 4-stage random access attempt. The radio link failure report may comprise information regarding whether one or more failed random access attempts was a contention-free random access attempt or a contention-based random access attempt. The radio link failure report may comprise a number of beams used by the wireless device for attempted random access.

The radio link failure report may comprise: beam information of one or more target beams for a failed handover, beam information of one or more serving beams for a failed handover, beam information associated with one or more recently connected beams of a recently connected cell associated with a failed handover, and/or beam information of one or more neighboring beams of a neighbor cell for a failed handover. The radio link failure report may comprise: a reference signal received power (RSRP) of a target beam of a target cell associated with a failed handover, a reference signal received quality (RSRQ) of a target beam of a target cell associated with a failed handover, a combined reference signal received power of one or more target beams of a target cell associated with a failed handover, and/or a combined reference signal received quality of one or more target beams of a target cell for a failed handover. The radio link failure report may comprise an RSRP of a neighboring beam of a neighboring cell associated with a failed handover, an RSRQ of a neighboring beam of a neighboring cell associated with a failed handover, a combined reference signal received power of one or more neighboring beams of a neighboring cell associated with a failed handover, and/or a combined reference signal received quality of one or more neighboring beams of a neighboring cell associated with a failed handover.

The radio link failure report may comprise an RSRP and/or an RSRQ of a serving beam associated with a failed handover. The radio link failure report may comprise a combined reference signal received power and/or a combined reference signal received quality of one or more serving beams associated with a failed handover. The radio link failure report may comprise an RSRP and/or an RSRQ of a recently connected beam of a last connected cell associated with a failed handover. The radio link failure report may comprise a combined reference signal received power and/or a combined reference signal received quality of one or more recently connected beams of a recently connected cell associated with a failed handover.

The first base station 1705 may configure one or more system control parameters based on the one or more elements of information of the RLF. The one or more system control parameters may comprise one or more beam configuration parameters, one or more radio resource power parameters, one or more random access resource parameters, one or more mobility parameters, a radio signal received quality threshold for initiating a handover, a radio signal received power threshold for initiating a handover, etc. The first base station 1705 may initiate a wireless device handover based on the one or more system control parameters, wherein the one or more system control parameters may be based on the one or more elements of the first message. The first base station may configure one or more mobility parameters for the wireless device 1701 with one or more network slices based on the one or more elements of the first message.

The first base station 1705 may transmit a command for configuration and/or activation of duplication of Packet Data Convergence Protocol (PDCP) packets 1730 associated with a bearer (e.g., a signaling radio bearer or a data radio bearer) for a wireless device 1701. Duplicated PDCP packets 1725 may be transmitted via different cells from cells employed to transmit original PDCP packets. The duplicated PDCP packets 1725 may be transmitted using a general packet radio service tunneling protocol (GTP) tunnel that may be different from a general packet radio service tunneling protocol (GTP) tunnel used for original PDCP packets. PDCP packet duplication may decrease the risk of radio link failures because of diversity gain of packet transmissions. The wireless device 1701 may provide, to the first base station 1705 or a new base station (e.g., the first base station 1705), a radio link failure report 1720 indicating that PDCP packets for a bearer were duplicated in a previous Radio Resource Control (RRC) connection to one or more previously connected base stations in which the wireless device experienced a Radio Link Failure (RLF) and/or a Handover Failure (HOF).

A wireless device 1701 that experiences an RLF and/or a HOF may try to make an RRC connection to the first cell or a new cell. If the wireless device 1701 establishes (or reestablishes) an RRC connection to the new cell, the wireless device 1701 may transmit an RLF report to a base station serving the new cell (e.g., the first base station 1705). The base station (e.g., the first base station 1705) may send information of the radio link failure of the wireless device 1701 to an old base station (e.g., the first base station 1705) where the wireless device 1701 experienced the RLF (and/or the HOF) and/or where a mobility procedure that caused the radio link failure (and/or the HOF) was initiated. The old base station (e.g., the first base station 1705) receiving the information of the radio link failure for the wireless device 1701 may analyze a reason of the radio link failure and/or may reconfigure one or more configuration parameters and/or mobility settings for initiating a handover. The above may have the advantage of enabling a base station to analyze the radio link failure and/or to reconfigure mobility settings with respect to configuration of PDCP packet duplication based on the information of the RLF of the wireless device 1701. The procedures and/or messages of FIG. 17 for a single base station may comprise some or all of those of, for example, FIG. 15 for multiple base stations.

Figure 18:
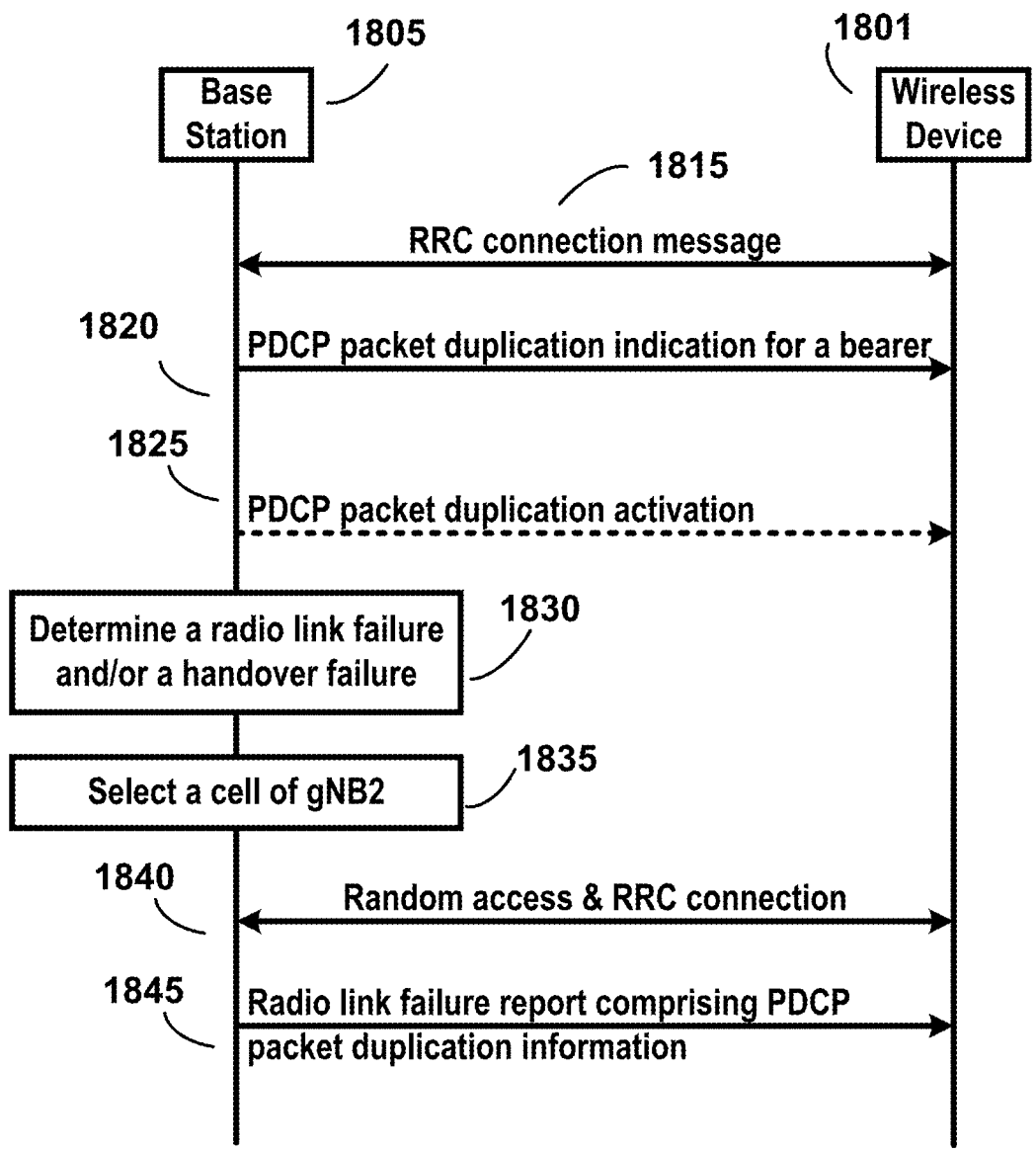
FIG. 18 shows an example message flow associated with RLF.

FIG. 18 shows an example message flow associated with RLF. A first wireless device 1801 (which may be the wireless device 1701) may receive, from a first base station 1805 (which may be the first base station 1705), a first Radio Resource Control (RRC) message 1815. The first RRC message 1815 may be an RRC connection reconfiguration message, an RRC connection reestablishment message, an RRC connection setup message, an RRC connection resume message, etc. The first RRC message 1815 may comprise bearer configuration information of one or more bearers (e.g., a signaling radio bearer, a data radio bearer, a logical channel, a QoS flow, a PDCU session, etc.). The first RRC message 1815 may comprise a Packet Data Convergence Protocol (PDCP) packet duplication indication 1820 indicating that one or more PDCP packets associated with a first bearer are duplicated, and/or that original PDCP packets and duplicated PDCP packets may be transmitted independently. Original PDCP packets of the one or more PDCP packets may be transmitted via one or more cells different from one or more other cells via which duplicated PDCP packets are transmitted. The one or more cells and/or the one or more other cells may be served by the first base station 1805 and/or a second base station 1810 (which may be the first base station 1705) for the first wireless device 1801. The first base station 1805 may be a secondary base station.

PDCP packets associated with the first bearer may be duplicated one or more times. The first bearer may be mapped to an original logical channel (and/or an original GTP tunnel) and/or multiple duplicated logical channels (and/or multiple GTP tunnels). Some portion of PDCP packets associated with the first bearer may be duplicated and transmitted separately from original PDCP packets. An amount of the some portion may be configured by the first base station 1805 and/or the first base station 1805 for the first wireless device 1801 via the first RRC message 1815 and/or via a Medium Access Control Control Element (MAC CE) message. The amount of the some portion may be between 0% and 100% of original PDCP packets.

The first bearer may be a Signaling Radio Bearer (SRB) associated with control plane signaling transmissions. The first wireless device 1801 and/or the first base station 1805 may determine an RLF (and/or an HOF) when a number of Radio Link Control (RLC) layer packet retransmissions associated with the first bearer reaches a threshold value. If a number of RLC layer packet retransmissions associated with original PDCP packets of the first bearer reaches the threshold value, the first wireless device 1801 and/or the first base station 1805 may determine an RLF (and/or an HOF). If a number of RLC layer packet retransmissions associated with duplicated PDCP packets of the first bearer reaches the threshold value, the first wireless device 1801 and/or the first base station 1805 may determine an RLF (and/or an HOF).

The first wireless device 1801 may receive, from the first base station 1805, a first MAC CE message comprising a PDCP packet duplication activation request 1825 (which may be a request, a command or an indication) for the wireless device to begin transmitting duplicated PDCP packets. Based on the first MAC CE message, the first wireless device 1801 may transmit, to a device (e.g., the first base station 1805 and/or one or more other wireless devices, etc.), one or more duplicated PDCP packets associated with the first bearer at least based on the PDCP packet duplication indication. The first RRC message 1815 may comprise an indication of initiating or stopping (e.g., activating or deactivating) transmission of duplicated PDCP packets associated with the PDCP packet duplication indication.

The first wireless device 1801 may receive, from the first base station 1805, a second MAC CE message comprising a request for the wireless device to cease transmitting duplicated PDCP packets associated with the PDCP packet duplication indication. Based on the second MAC CE message, the first wireless device 1801 may stop transmitting (e.g., to the first base station 1805 and/or to one or more other wireless devices, etc.) duplicated PDCP packets associated with the first bearer based on the PDCP packet duplication indication.

At step 1830, the first wireless device 1801 may determine a connection failure associated with one or more first cells of the first base station 1805. The connection failure may be an RLF and/or an HOF. The connection failure may be determined based on: a number of RLC packet retransmissions, out-of-sync detection, one or more random access failures, etc. The first wireless device 1801 may determine an RLF (and/or an HOF) if a number of Radio Link Control (RLC) layer packet retransmissions associated with the first bearer exceeds (or meets) a threshold value. If a number of RLC layer packet retransmissions associated with original PDCP packets and/or duplicated PDCP packets of the first bearer exceeds (or meets) a threshold value, the first wireless device 1801 may determine an RLF (and/or an HOF).

If a device (e.g., a base station and/or a wireless device) detects that a number of RLC layer packet retransmissions associated with original PDCP packets of the first bearer exceeds (or meets) a threshold value, the device may report the detection from an RLC layer to an RRC layer. If the device detects that a number of RLC layer packet retransmissions associated with duplicated PDCP packets of the first bearer exceeds (or meets) a threshold value, the device may report the detection from an RLC layer to an RRC layer. The device (e.g., at an RRC layer) may determine an RLF (and/or an HOF) based on the received reports from RLC layer. The device (e.g., at an RRC layer) may determine an RLF (and/or an HOF) if it receives the report indicating that a number of RLC layer packet retransmissions associated with original PDCP packets of the first bearer exceeds (or meets) a threshold value. The device (e.g., at an RRC layer) may determine an RLF (and/or an HOF) if it receives the report indicating that a number of RLC layer packet retransmissions associated with duplicated PDCP packets of the first bearer exceeds (or meets) a threshold value. The device (e.g., at an RRC layer) may determine an RLF (and/or an HOF) if it receives both a first report and a second report, wherein the first report indicates that a number of RLC layer packet retransmissions associated with original PDCP packets of the first bearer exceeds (or meets) a threshold value, and a second report indicates that a number of RLC layer packet retransmissions associated with duplicated PDCP packets of the first bearer exceeds (or meets) a threshold value.

The first wireless device 1801, based on determining a connection failure, may select a second cell of the first base station 1805 for an RRC connection at step 1835. The second cell may be one of the one or more first cells of the first base station 1805. The first wireless device 1801 may select the second cell based on a reference signal received power (RSRP) and/or a reference signal received quality (RSRQ) of the second cell.

Based on selecting the second cell for an RRC connection to the first base station 1805, the first wireless device 1801 may initiate a random access (RA) procedure 1840, via the second cell, by transmitting, via the second cell, one or more random access preambles. In performing the RA procedure 1840, the first wireless device 1801 may transmit a second RRC message to the first base station 1805 via the second cell. The second RRC message may comprise, for example, one or more of: an RRC connection reestablishment request message, an RRC connection request message, an RRC connection resume request message, an RRC connection reestablishment complete message, an RRC connection setup complete message, an RRC connection resume complete message, an RLF information availability indication, and/or an RLF report 1845. The RLF information availability indication may indicate that the first wireless device 1801 has RLF information and/or HOF information. Based on the connection failure, the first wireless device 1801 may indicate that the first wireless device 1801 has RLF information and/or HOF information via the RLF information availability indication to the first base station 1805.

Based on the second RRC message and/or completion of the RA procedure, the first wireless device 1801 may receive a request message from the first base station 1805. This may occur as part of the RA procedure 1840 (e.g., the request message may be an RRC message associated with RA procedure 1840). The request message may comprise one or more of a wireless device information request message and/or an RLF report request configured to request an RLF report for an RLF and/or an HOF.

Based on the request message received from the first base station 1805 and/or based on the second RRC message and/or completion of the RA procedure 1840, the first wireless device 1801 may transmit a report message 1845. The report message 1845 may comprise one or more of a wireless device information response message, and/or an RLF report.

The RLF report of the second RRC message and/or of the report message may comprise PDCP packet duplication information associated with the previous RRC connection (e.g., a previous RRC connection associated with the first base station 1805 or some other base station). The PDCP packet duplication information may comprise, for example: a PDCP packet duplication activation indication, a PDCP packet duplication configuration indication, a bearer identifier of the first bearer, a bearer type of the first bearer (e.g., SRB0, SRB1, SRB2, data radio bearer, etc.), a number of bearers that configured for PDCP packet duplication, one or more logical channel identifiers of one or more logical channels associated with duplicated PDCP packets and/or original packets, a duplicated portion of a PDCP packet duplication, a number of duplications, an RLF cause, one or more cell identifiers of one or more cells employed to transmit original PDCP packets, one or more cell identifiers of one or more cells employed to transmit duplicated PDCP packets, one or more base station identifiers of one or more base stations employed to transmit original PDCP packets (e.g., a base station identifier of the first base station 1805), one or more base station identifiers of one or more base stations employed to transmit duplicated PDCP packets (e.g., a base station identifier of the first base station 1805), etc.

The PDCP packet duplication activation indication may be configured to indicate that one or more bearers (e.g., the first bearer, one or more SRBs, one or more DRBs, etc.) have been configured for PDCP packet duplication by the first base station 1805 via the first MAC CE message and/or via the first RRC message (e.g., before the time of the connection failure). The PDCP packet duplication configuration indication may be configured to indicate that a PDCP packet duplication for one or more bearers (e.g., the first bearer, one or more SRBs, one or more DRBs, etc.) was configured by the first base station 1805 via the first RRC message (e.g., before the time of the connection failure). The PDCP packet duplication configuration indication may be configured to indicate that duplicated PDCP packets for one or more bearers (e.g., the first bearer, one or more SRBs, one or more DRBs, etc.) were being transmitted at the time of the connection failure.

The number of bearers configured for PDCP packet duplication may indicate a number of bearers that were duplicated. The number may be 1, for example, if only the first bearer was duplicated. The number may be larger than 1, for example, if one or more bearers other than the first bearer were configured and/or activated for PDCP packet duplication.

The duplicated portion of a duplicated PDCP packet may be configured to indicate how much portion of original PDCP packets were duplicated for the first bearer. The duplicated portion of a duplicated PDCP packet may be a value between 0% and 100%.

The number of duplications may indicate how many duplications were configured and/or activated for PDCP packets associated with the first bearer. The number of duplications may indicate how many logical channels (e.g., one logical channel for original PDCP packets, and/or one or more logical channels for one or more duplications of original PDCP packets) for PDCP packets were mapped (e.g., configured and/or activated) for the first bearer.

The RLF cause may indicate that a reason of the connection failure was one or more of a number of RLC packet retransmissions (e.g., a number of RLC packet retransmissions exceeds or meets a threshold value), one or more out-of-sync detection indications (e.g., an RRC layer receives, from a lower layer, one or more out-of-sync detection indication, and/or the synchronization was not recovered within a threshold time duration), one or more random access failures (e.g. the first wireless device failed in one or more random access attempts), etc.

The first base station 1805 may configure one or more control parameters based on the one or more elements of the RLF report. The one or more control parameters may comprise one or more handover parameters (e.g., a radio signal received quality threshold, a radio signal received power threshold for a handover initiation, etc.), one or more PDCP packet duplication configuration parameters for one or more bearers of one or more wireless devices, and/or other radio configuration parameters associated with one or more cells and/or one or more wireless devices.

If PDCP packet duplication for an SRB of a first wireless device 1801 was not configured and/or was not activated at the time of the connection failure, a first base station 1805 may configure and/or activate an SRB of another wireless device that has similar radio signal measurement results to the first wireless device 1801.

The first base station 1805 may initiate a handover of a second wireless device based on the one or more control parameters. The one or more control parameters may be configured based on the one or more elements of the RLF report. If PDCP packet duplication for an SRB of the first wireless device 1801 was configured and/or activated at the time of the connection failure of the first wireless device 1801, the first base station 1805 may initiate a handover for the second wireless device earlier than for the first wireless device 1801 (e.g., if the first base station 1805 configured and/or activated a PDCP packet duplication for an SRB of the second wireless device).

A first wireless device 1801 may receive, from a first base station 1805, a first Radio Resource Control (RRC) message comprising a Packet Data Convergence Protocol (PDCP) packet duplication indication indicating that a plurality of PDCP packets associated with a first bearer are duplicated. The first wireless device 1801 may receive a Medium Access Control Control Element (MAC CE) message indicating an activation of transmitting duplicated PDCP packets associated with the PDCP packet duplication indication. The first wireless device 1801 may transmit one or more duplicated packets associated with the first bearer based on the PDCP packet duplication indication and/or the MAC CE message. The first wireless device 1801 may determine a connection failure from a first cell of the first base station 1805. The first wireless device 1801 may select a second cell of the first base station 1805 for an RRC connection to the first base station 1805 based on the connection failure. The first wireless device 1801 may transmit, to the first base station 1805 via the second cell, a second RRC message comprising a Radio Link Failure (RLF) report associated with the connection failure, wherein the RLF report may comprise PDCP packet duplication information indicating one or more of: activation of a duplicated PDCP packet transmission; and/or configuration of PDCP packet duplication for at least one bearer.

The first base station 1805 may configure one or more control parameters based on the one or more elements of the RLF report. The first base station 1805 may initiate a handover of a second wireless device based on the one or more control parameters. The one or more control parameters may comprise one or more of a radio signal received quality threshold or a radio signal received power threshold for a handover initiation. The one or more control parameters may comprise one or more PDCP duplication configuration parameters for one or more bearers of one or more wireless devices.

The connection failure may be one or more of a radio link failure and/or a handover failure. The first base station 1805 may be the first base station 1805. The first cell may be the second cell. The RLF report may comprise one or more cell identifiers of one or more cells (e.g., one or more cells via which the duplicated plurality of PDCP packets of at least one bearer were transmitted). The first bearer may be a Signaling Radio Bearer (SRB). The determination of the connection failure may be based on a number of RLC retransmissions of one or more packets associated with: original PDCP packets of the first bearer; and/or duplicated PDCP packets of the first bearer. The determination of the connection failure may be based on: a number of RLC retransmissions; one or more out-of-sync detections; and/or one or more random access failures. The procedures and/or messages of FIG. 18 for a single base station may comprise some or all of those of, for example, FIG. 16 for multiple base stations.

Figure 19:
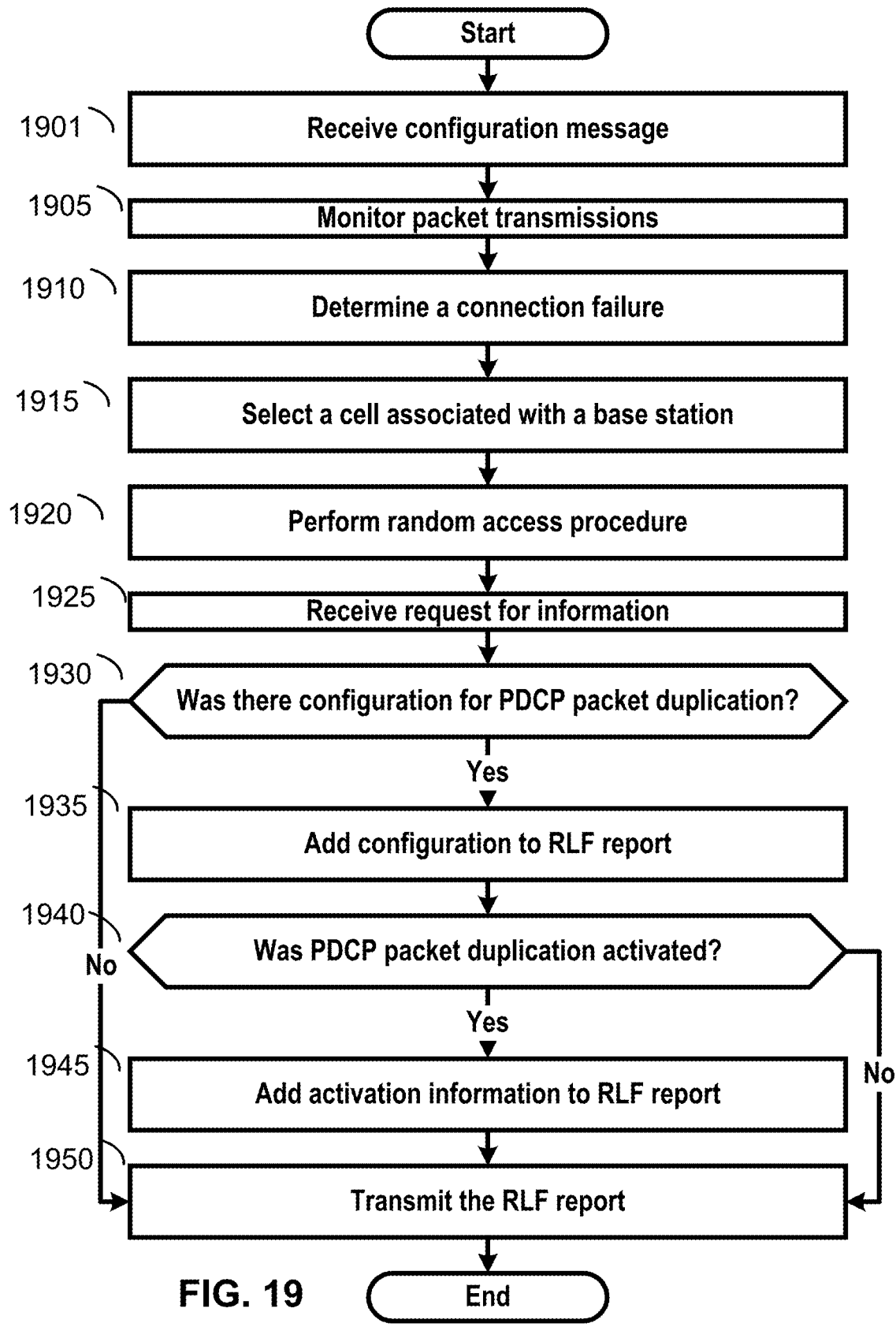
FIG. 19 shows an example method associated with RLF.

FIG. 19 shows an example method associated with RLF. The example may be performed by a wireless device (e.g., the wireless device 1501). One or more steps of FIG. 19 may be performed by one or more devices (e.g., a wireless device and/or a base station). Exemplary devices may be described above in FIGS. 15-18. At step 1901, the wireless device may receive a configuration message. The configuration message may be received from a first base station (e.g., the base station 1505). The configuration message may comprise an RRC message comprising bearer configuration parameters for a bearer. At step 1905, the wireless device may monitor packet transmissions. The packet transmissions may comprise transmitted or received packets associated with a bearer. At step 1910, the wireless device may determine a connection failure, for example, based on determining one or more criteria. The one or more criteria may comprise an RLF and/or an HOF. At step 1915, the wireless device may select a cell of the first base station or cell of a second base station (e.g., the second base station 1510), for example based on measurement results of one or more cells. At step 1920, the wireless device may perform a random access procedure, which may be via a cell. The random access procedure may comprise establishing an RRC connection with a base station (e.g., the first base station, the second base station, or some other base station). At step 1925, the wireless device may receive a request for information (e.g., from the first base station, the second base station, or some other base station). The request may comprise an indication of a request for an RLF report from the wireless device.

The wireless device may determine whether the RLF report may comprise PDCP packet duplication information. At step 1930, the wireless device may determine if the wireless device is or was configured with PDCP packet duplication capabilities, for example, at a time associated with a connection failure. If the wireless device is or was not configured with PDCP packet duplication capabilities, the process may proceed at step 1950. If the wireless device determines that the wireless device is or was configured with PDCP packet duplication capabilities, the wireless device may add information related to PDCP packet duplication configuration parameters to the RLF report at step 1935. At step 1940, the wireless device may determine if PDCP packet duplication was activated for the bearer at the time of the connection failure. If PDCP packet duplication was activated for the bearer at the time of the connection failure, the wireless device may add information related to the activation to the RLF report at step 1945. If the wireless device determines that PDCP packet duplication was not activated for the bearer at the time of the connection failure, the process may proceed at step 1950. At step 1950, the wireless device may transmit the RLF report (e.g., to the first base station, the second base station, or some other base station).

Figure 20:
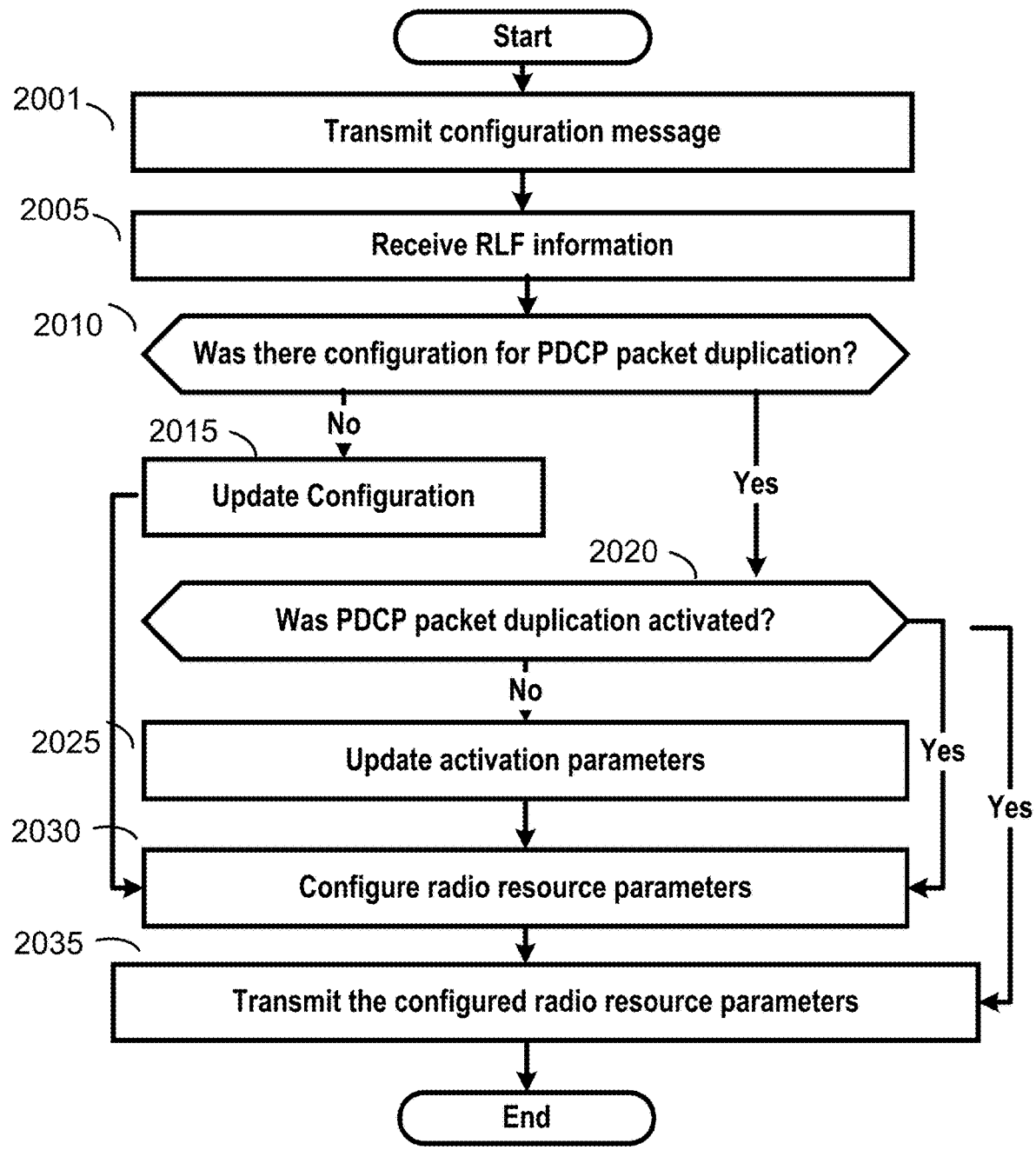
FIG. 20 shows an example method associated with RLF.

FIG. 20 shows an example method associated with RLF. The example may be performed by one or more base stations (e.g., the first base station 1505 and/or the second base station 1510). One or more steps of FIG. 20 may be performed by one or more devices (e.g., a base station and/or a wireless device). Exemplary device may be as described above in FIGS. 15-19. At step 2001, a base station (e.g., the first base station 1505) may transmit a configuration message to a wireless device (e.g., the wireless device 1501). The configuration message may comprise an RRC message comprising bearer configuration parameters for a bearer. At step 2005, the base station may receive RLF information (e.g., an RLF report associated with a wireless device). A first base station may have an active connection with the wireless device. The first base station may receive the RLF report via that connection. The first base station may receive a random access preamble from the wireless device. The first base station may initiate an RRC connection. The first base station may request information from the wireless device. The first base station may receive the RLF report based on the request. A first base station may also receive the RLF report indirectly (e.g., via a second base station). A second base station may obtain an RLF report from the wireless device. The second base station may transmit the RLF report to the first base station.

The base station (e.g., the first base station 1505) may determine whether to configure and/or activate PDCP packet duplication. At step 2010, the base station may determine if PDCP packet duplication was configured for a bearer at the time of a connection failure (e.g., a connection failure indicated in the RLF report). If the base station determines that PDCP packet duplication was not configured for a bearer at the time of a connection failure, at step 2015 the base station may update the PDCP packet duplication configuration (e.g., the base station may lower a threshold for initiating configuration of PDCP packet duplication). If PDCP packet duplication was configured, at step 2020 the base station may determine if PDCP packet duplication was activated for a bearer at the time of a connection failure (e.g., a connection failure indicated in the RLF report). If the base station determines that PDCP packet duplication was not activated for a bearer at the time of a connection failure, at step 2025 the base station may update one or more PDCP packet duplication activation parameters. The parameters may be updated by lowering a threshold for initiating PDCP packet duplication activation. At step 2030, the base station may configure radio resource parameters based on whether PDCP packet duplication was configured and/or activated (e.g., based on an indication of the configuration and/or activation). The base station may configure the radio resource parameters by: changing handover parameters (e.g., by lowering a handover threshold associated with neighboring cells), changing parameters to reject inbound handover wireless devices having low radio quality, changing parameters to increase signal transmission power, and/or changing parameters to increase a number of beams associated with the cell. At step 2035, the base station may transmit the configured radio resource parameters to one or more wireless devices (e.g., the wireless device).

Figure 21:
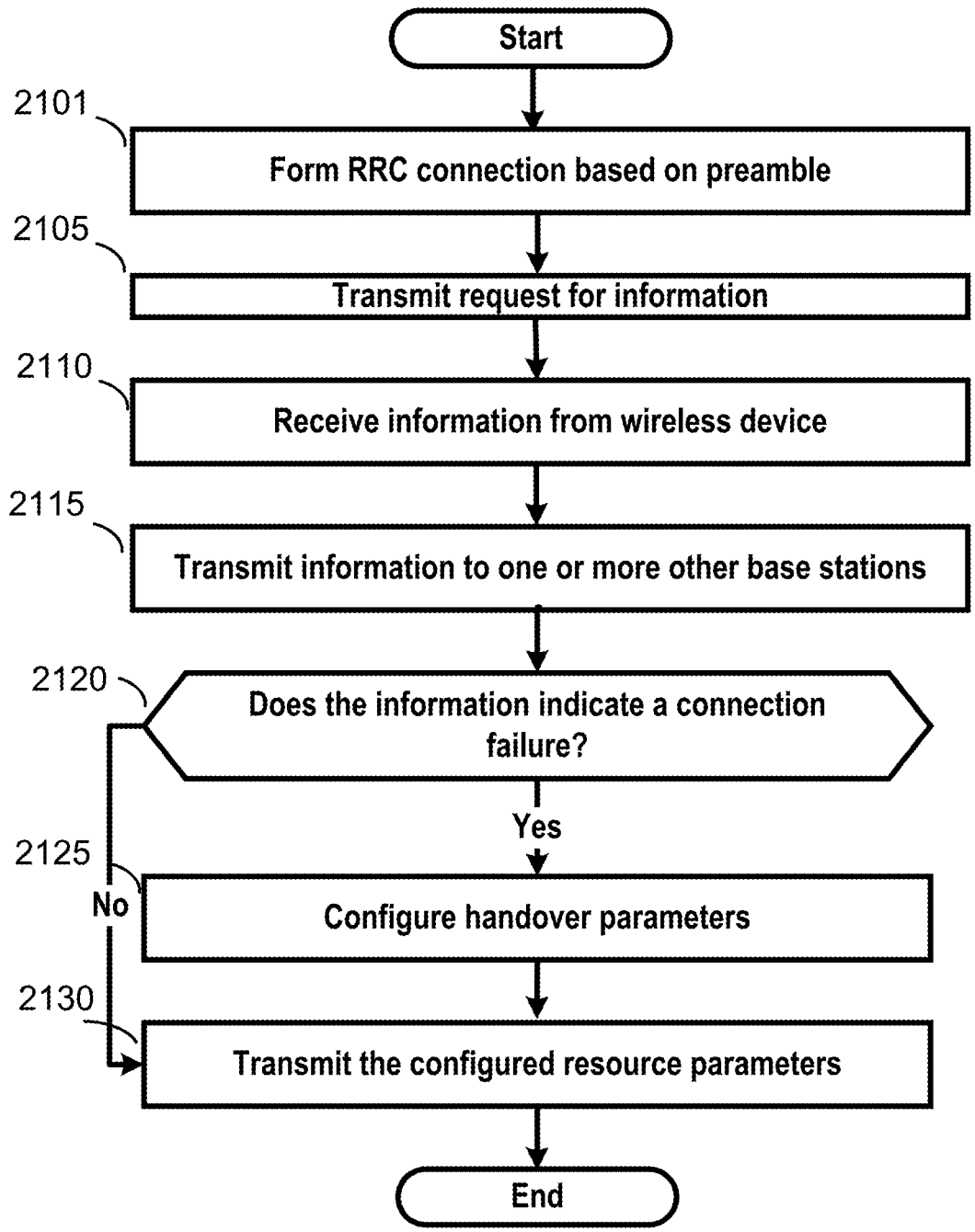
FIG. 21 shows an example method associated with RLF.

FIG. 21 shows an example method associated with RLF. The example may be from the perspective of a second base station (e.g., the second base station 1510). One or more steps of FIG. 20 may be performed by one or more devices (e.g., a wireless device and/or a base station). Exemplary devices may be described in FIGS. 15-20. The second base station may have an active connection with a wireless device (e.g., the wireless device 501). The second base station may receive the RLF report via that connection. At step 2101, the second base station may receive a random access preamble from the wireless device. The second base station may initiate an RRC connection. At step 2105, the second base station may request information from the wireless device. At step 2110, the second base station may receive the information. The information may comprise an RLF report. At step 2115, the second base station may transmit the information, such as the RLF report from the wireless device, to one or more other base stations (e.g., a first base station, such as the first base station 1505). This may have the advantage of allowing the one or more other base stations to adjust one or more parameters based on information known to the second base station 1510.

The second base station 1510 may adjust one or more handover parameters based on the RLF report. At step 2120, the second base station 1510 may determine if the RLF report indicates that PDCP packet duplication was configured and/or activated for a bearer at the time of a connection failure. If PDCP packet duplication was configured and/or activated, at step 2125 the second base station 1510 may configure inbound and/or outbound handover parameters for a failed cell. The handover parameters may be configured by increasing a handover threshold towards the failed cell. The handover parameters may be configured by lowering an acceptance threshold of inbound handover wireless devices from the failed cell. At step 2130, the second base station 1510 may transmit an indication of the handover parameters to one or more other base stations (e.g., the first base station 1505). This may have the advantage of allowing the one or more other base stations to adjust parameters based on the configured handover parameters.

Figure 22:
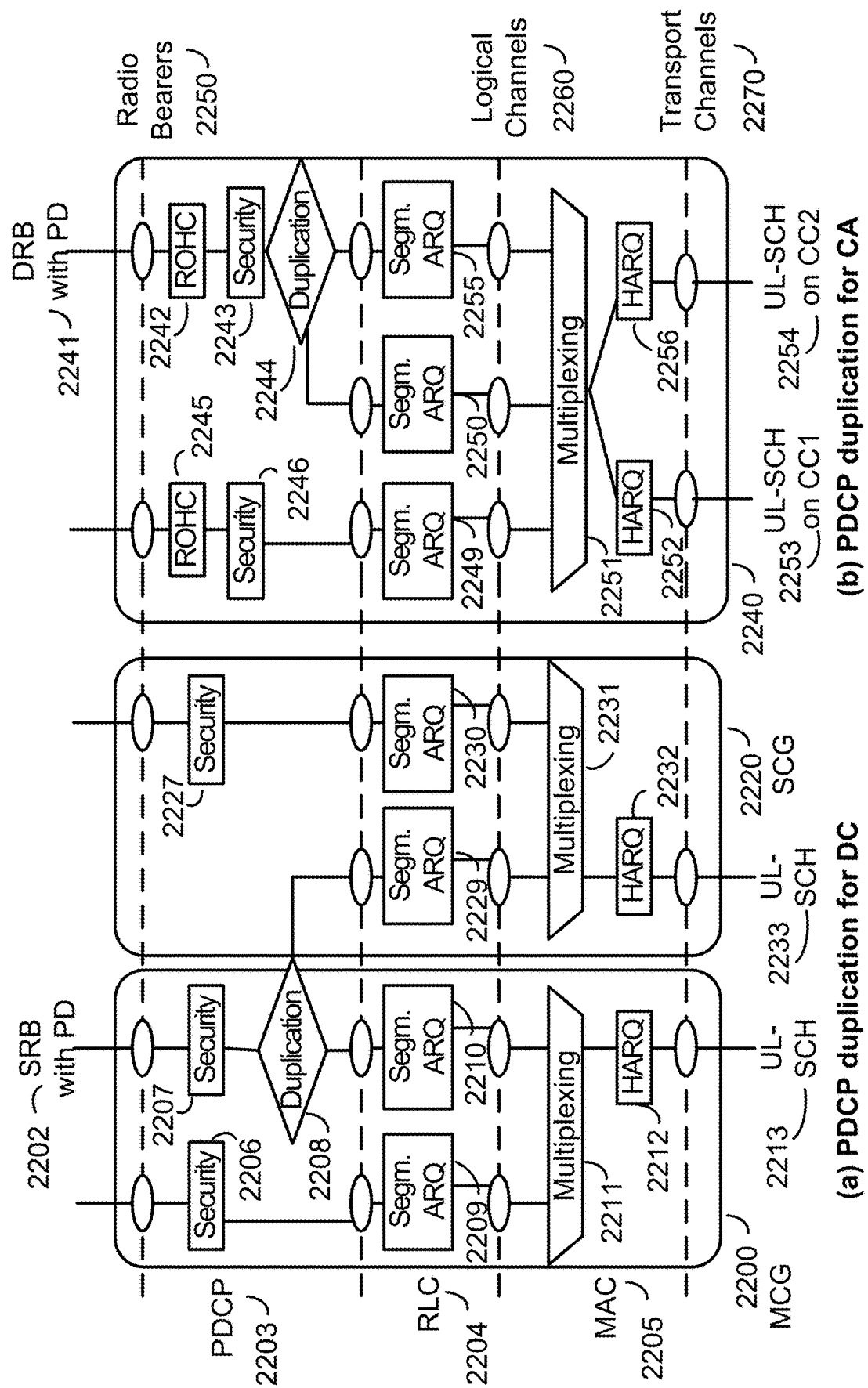
FIG. 22 shows an example architecture for PDCP duplication.

FIG. 22 shows an example architecture for PDCP duplication with dual connectivity (DC) and carrier aggregation (CA). A PDCP layer 2203 may comprise an upper level of an MCG 2200, an SCG 2220, or an aggregated entity 2240. The PDCP layer 2203 may comprise one or more security elements (e.g., a security element 2206, a security element 2207, a security element 2227, a security element 2246, or a security element 2243). The security elements may communicate information with one or more robust header compression (ROHC) elements (e.g., a ROHC 2245 or a ROHC 2242). The one or more security elements may connect to one or more signal bearers (e.g., a signaling radio bearer (SRB) 2202 with packet duplication, or a data radio bearer (DRB) 2241 with packet duplication). The security elements may connect to one or more RLC elements of an RLC layer 2204. The security elements may be connected with multiple RLC elements of an RLC layer 2204, such as by using a duplication element (e.g., a duplication element 2208 or a duplication element 2244).

The RLC layer 2204 may comprise logical processing elements. A logical processing element may comprise one or more segmented automatic repeat-request (ARQ) elements (e.g., a segmented ARQ 2209, a segmented ARQ 2210, a segmented ARQ 2229, a segmented ARQ 2230, a segmented ARQ 2249, a segmented ARQ 2250, or a segmented ARQ 2255). The logical processing elements may be associated with logical channels 2260, and may be connected with a MAC layer 2205.

The MAC layer 2205 may comprise a lower layer of the MCG 2200, the SCG 2220, or the aggregated entity 2240. The MAC layer 2205 may comprise multiplexers (e.g., a multiplexer 2211, a multiplexer 2231, or a multiplexer 2251). The multiplexers may feed one or more HARQs (e.g., a HARQ 2212, a HARQ 2232, a HARQ 2252, or a HARQ 2256). The HARQs may provide transport channels 2270, which may be communicated via one or more shared channels (e.g., a UL-SCH 2213, a UL-SCH 2233, a UL-SCH on CC1 2253, or a UL-SCH on CC2 2254).

If duplication is configured for a radio bearer (e.g., an SRB 2202 or a DRB 2241) utilizing RRC, an additional RLC entity and/or an additional logical channel may be added to the radio bearer to handle duplicated PDCP PDUs. Duplication at the PDCP layer 2203 may consist in a duplication element (e.g., the duplication element 2208 or the duplication element 2244) sending the same PDCP PDUs multiple times (e.g., a first time on the original RLC entity and a second time on the additional RLC entity). If PDCP PDUs are sent multiple times, the original PDCP PDU and the corresponding duplicate may not be transmitted on the same carrier. Two of the logical channels 2260 may belong to the same MAC entity 2205 (e.g., for CA) and/or to different ones (e.g., for DC). For CA, logical channel mapping restrictions may be used in MAC to ensure that the logical channel carrying the original PDCP PDUs and/or logical channel carrying the corresponding duplicates may not be sent on the same carrier.

Duplication may be activated and/or de-activated per DRB (and/or SRB) by means of a MAC control element (MAC CE). Activation and/or deactivation of duplication may occur after PDCP packet duplication is configured. In CA, when duplication is de-activated, the logical channel mapping restrictions may be lifted. In DC, the wireless device may use the MAC CE commands regardless of their origin (e.g., the MCG 2200 or the SCG 2220).

A PDCP layer of a transmitting node may duplicate PDCP PDUs, and transmit duplicated packets via a separate logical channel that is different than a logical channel for original packets. A PDCP layer of a receiving node may discard one of duplicate packet and original packet (e.g. discard a packet received later if receiving same packets).

A base station (e.g., a gNB) and/or a wireless device may perform any combination of a step and/or a complementary step of one or more of the steps described herein. Any step performed by a gNB may be performed by any base station. A core network device, or any other device, may perform any combination of a step, or a complementary step, of one or more of the above steps. Some or all of these steps may be performed, and the order of these steps may be adjusted. Additional steps may also be performed. Any base station described herein may be a current base station, a serving base station, a source base station, a target base station, or any other base station.

Figure 23:
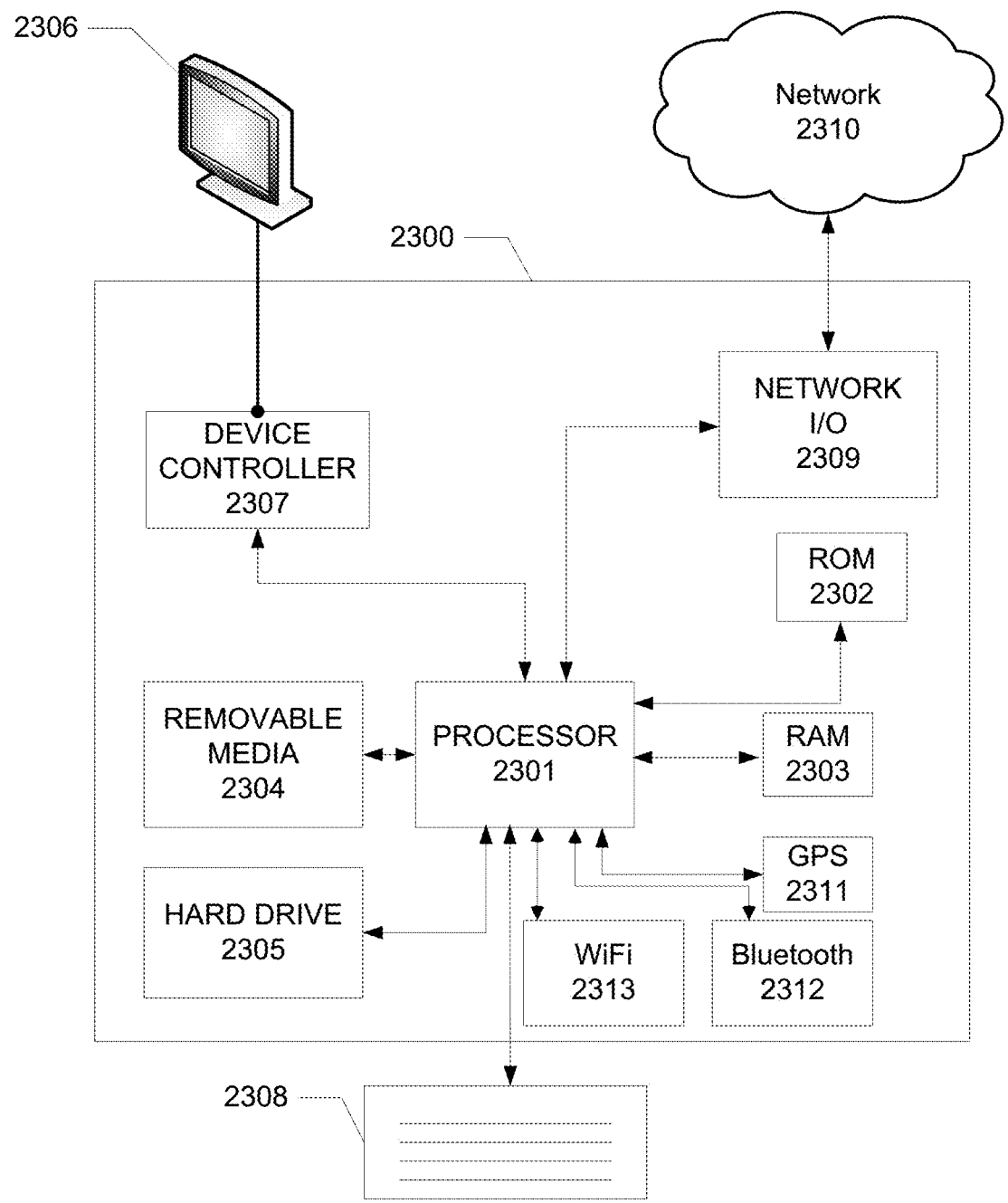
FIG. 23 shows example elements of a computing device that may be used to implement any of the various devices described herein.

FIG. 23 shows general hardware elements that may be used to implement any of the various computing devices discussed herein, including, e.g., the base station 401, the wireless device 406, or any other base station, wireless device, or computing device described herein. The computing device 2300 may include one or more processors 2301, which may execute instructions stored in the random access memory (RAM) 2303, the removable media 2304 (such as a Universal Serial Bus (USB) drive, compact disk (CD) or digital versatile disk (DVD), or floppy disk drive), or any other desired storage medium. Instructions may also be stored in an attached (or internal) hard drive 2305. The computing device 2300 may also include a security processor (not shown), which may execute instructions of one or more computer programs to monitor the processes executing on the processor 2301 and any process that requests access to any hardware and/or software components of the computing device 2300 (e.g., ROM 2302, RAM 2303, the removable media 2304, the hard drive 2305, the device controller 2307, a network interface 2309, a GPS 2311, a Bluetooth interface 2312, a Wi-Fi interface 2313, etc.). The computing device 2300 may include one or more output devices, such as the display 2306 (e.g., a screen, a display device, a monitor, a television, etc.), and may include one or more output device controllers 2307, such as a video processor. There may also be one or more user input devices 2308, such as a remote control, keyboard, mouse, touch screen, microphone, etc. The computing device 2300 may also include one or more network interfaces, such as a network interface 2309, which may be a wired interface, a wireless interface, or a combination of the two. The network interface 2309 may provide an interface for the computing device 2300 to communicate with a network 2310 (e.g., a RAN, or any other network). The network interface 2309 may include a modem (e.g., a cable modem), and the external network 2310 may include communication links, an external network, an in-home network, a provider's wireless, coaxial, fiber, or hybrid fiber/coaxial distribution system (e.g., a DOCSIS network), or any other desired network. Additionally, the computing device 2300 may include a location-detecting device, such as a global positioning system (GPS) microprocessor 2311, which may be configured to receive and process global positioning signals and determine, with possible assistance from an external server and antenna, a geographic position of the computing device 2300.

The example in FIG. 23 is a hardware configuration, although the components shown may be implemented as software as well. Modifications may be made to add, remove, combine, divide, etc. components of the computing device 2300 as desired. Additionally, the components may be implemented using basic computing devices and components, and the same components (e.g., processor 2301, ROM storage 2302, display 2306, etc.) may be used to implement any of the other computing devices and components described herein. For example, the various components described herein may be implemented using computing devices having components such as a processor executing computer-executable instructions stored on a computer-readable medium, as shown in FIG. 23. Some or all of the entities described herein may be software based, and may co-exist in a common physical platform (e.g., a requesting entity may be a separate software process and program from a dependent entity, both of which may be executed as software on a common computing device).

One or more features of the disclosure may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features of the disclosure, and such data structures are contemplated within the scope of computer executable instructions and computer-usable data described herein.

Many of the elements in examples may be implemented as modules. A module may be an isolatable element that performs a defined function and has a defined interface to other elements. The modules may be implemented in hardware, software in combination with hardware, firmware, wetware (i.e., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and complex programmable logic devices (CPLDs). Computers, microcontrollers, and microprocessors may be programmed using languages such as assembly, C, C++ or the like. FPGAs, ASICs, and CPLDs may be programmed using hardware description languages (HDL), such as VHSIC hardware description language (VHDL) or Verilog, which may configure connections between internal hardware modules with lesser functionality on a programmable device. The above mentioned technologies may be used in combination to achieve the result of a functional module.

Systems, apparatuses, and methods may perform operations of multi-carrier communications described herein. Additionally or alternatively, a non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a UE, a base station, and the like) to enable operation of multi-carrier communications described herein. The device, or one or more devices such as in a system, may include one or more processors, memory, interfaces, and/or the like. Other examples may comprise communication networks comprising devices such as base stations, wireless devices or user equipment (UE), servers, switches, antennas, and/or the like. A network may comprise any wireless technology, including but not limited to, cellular, wireless, Wi-Fi, 4G, 5G, any generation of 3GPP or other cellular standard or recommendation, wireless local area networks, wireless personal area networks, wireless ad hoc networks, wireless metropolitan area networks, wireless wide area networks, global area networks, space networks, and any other network using wireless communications. Any device (e.g., a wireless device, a base station, or any other device) or combination of devices may be used to perform any combination of one or more of steps described herein, including, e.g., any complementary step or steps of one or more of the above steps.

Although examples are described above, features and/or steps of those examples may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
 receiving, by a wireless device from a first base station, a packet duplication activation command for duplication of one or more data packets;
 sending, based on the packet duplication activation command, one or more duplicated data packets; and sending, by the wireless device to one of the first base station or a second base station, a radio resource control message that indicates a connection failure and that indicates that packet duplication was activated at a time associated with the connection failure.

2. The method of claim 1, wherein the radio resource control message comprises a first radio resource control message, and wherein the method further comprises receiving, from the first base station, a second radio resource control message comprising one or more packet duplication configuration parameters indicating that at least one of the one or more data packets is duplicated.

3. The method of claim 1, wherein the one or more duplicated data packets comprise one or more duplicated packet data convergence protocol (PDCP) packets.

4. The method of claim 1, wherein the connection failure comprises at least one of:
a radio link failure; or
a handover failure.

5. The method of claim 1, wherein the connection failure is based on at least one of:
a quantity of radio link control retransmissions;
an out-of-sync detection; or
a random access failure.

6. The method of claim 1, wherein the sending the radio resource control message comprises sending, by the wireless device to the first base station, the radio resource control message.

7. The method of claim 1, wherein the sending the radio resource control message comprises sending the radio resource control message to the second base station, wherein the second base station is different from the first base station.

8. The method of claim 1, further comprising:
determining, by the wireless device, that a quantity of radio link control (RLC) layer packet retransmissions associated with one or more original packet data convergence protocol (PDCP) packets of the one or more data packets satisfies a threshold value; and
determining, based on a determination that the quantity satisfies the threshold value, the connection failure.

9. The method of claim 1, further comprising:
determining, by the wireless device, that a quantity of radio link control (RLC) layer packet retransmissions associated with one or more duplicated packet data convergence protocol (PDCP) packets of the one or more data packets satisfies a threshold value; and
determining, based on a determination that the quantity satisfies the threshold value, the connection failure.

10. The method of claim 1, wherein the radio resource control message is configured to cause the first base station to allocate a first quantity of resources for a second wireless device,
wherein the radio resource control message comprises a first radio resource control message,
wherein the method further comprises sending a second radio resource control message that indicates a second connection failure and that indicates that packet duplication was deactivated at a time associated with the second connection failure, and
wherein the second radio resource control message is configured to cause the first base station to allocate a second quantity of resources for the second wireless device, and wherein the second quantity is greater than the first quantity.

11. The method of claim 1, wherein the connection failure is associated with a first cell of the first base station, and wherein the sending the radio resource control message comprises sending the radio resource control message via a second cell.

12. The method of claim 1, further comprising:
determining the connection failure; and
determining, based on the connection failure, a cell for a radio resource control communication,
wherein the sending the radio resource control message comprises sending the radio resource control message via the cell.

13. The method of claim 1, wherein the one or more data packets are associated with a first bearer.

14. A wireless device comprising:
one or more processors; and
memory storing instructions that, when executed by the one or more processors, cause the wireless device to:
receive, from a first base station, a packet duplication activation command for duplication of one or more data packets;
send, based on the packet duplication activation command, one or more duplicated data packets; and
send, to one of the first base station or a second base station, a radio resource control message that indicates a connection failure and that indicates that packet duplication was activated at a time associated with the connection failure.

15. The wireless device of claim 14, wherein the radio resource control message comprises a first radio resource control message, and wherein the instructions, when executed by the one or more processors, further cause the wireless device to receive, from the first base station, a second radio resource control message comprising one or more packet duplication configuration parameters indicating that at least one of the one or more data packets is duplicated.

16. The wireless device of claim 14, wherein the one or more duplicated data packets comprise one or more duplicated packet data convergence protocol (PDCP) packets.

17. The wireless device of claim 14, wherein the connection failure comprises at least one of:
a radio link failure; or
a handover failure.

18. The wireless device of claim 14, wherein the connection failure is based on at least one of:
a quantity of radio link control retransmissions;
an out-of-sync detection; or
a random access failure.

19. The wireless device of claim 14, wherein the instructions, when executed by the one or more processors, cause the wireless device to send the radio resource control message by sending, to the first base station, the radio resource control message.

20. The wireless device of claim 14, wherein the instructions, when executed by the one or more processors, cause the wireless device to send the radio resource control message by sending the radio resource control message to the second base station, wherein the second base station is different from the first base station.

21. The wireless device of claim 14, wherein the instructions, when executed by the one or more processors, further cause the wireless device to:
determine that a quantity of radio link control (RLC) layer packet retransmissions associated with one or more original packet data convergence protocol (PDCP) packets of the one or more data packets satisfies a threshold value; and determine, based on a determination that the quantity satisfies the threshold value, the connection failure.

22. The wireless device of claim 14, wherein the instructions, when executed by the one or more processors, further cause the wireless device to:
    determine that a quantity of radio link control (RLC) layer packet retransmissions associated with one or more duplicated packet data convergence protocol (PDCP) packets of the one or more data packets satisfies a threshold value; and
    determine, based on a determination that the quantity satisfies the threshold value, the connection failure.

23. The wireless device of claim 14, wherein the radio resource control message is configured to cause the first base station to allocate a first quantity of resources for a second wireless device,
    wherein the radio resource control message comprises a first radio resource control message,
    wherein the instructions, when executed by the one or more processors, further cause the wireless device to send a second radio resource control message that indicates a second connection failure and that indicates that packet duplication was deactivated at a time associated with the second connection failure, and
    wherein the second radio resource control message is configured to cause the first base station to allocate a second quantity of resources for the second wireless device, and wherein the second quantity is greater than the first quantity.

24. The wireless device of claim 14, wherein the connection failure is associated with a first cell of the first base station, and
    wherein the instructions, when executed by the one or more processors, cause the wireless device to send the radio resource control message by sending the radio resource control message via a second cell.

25. The wireless device of claim 14, wherein the instructions, when executed by the one or more processors, further cause the wireless device to:
    determine the connection failure; and
    determine, based on the connection failure, a cell for a radio resource control communication, and
    wherein the instructions, when executed by the one or more processors, cause the wireless device to send the radio resource control message by sending the radio resource control message via the cell.

26. The wireless device of claim 14, wherein the one or more data packets are associated with a first bearer.

27. A non-transitory computer-readable medium storing instructions that, when executed, configure a wireless device to:
    receive, from a first base station, a packet duplication activation command for duplication of one or more data packets;
    send, based on the packet duplication activation command, one or more duplicated data packets; and
    send, to one of the first base station or a second base station, a radio resource control message that indicates a connection failure and that indicates that packet duplication was activated at a time associated with the connection failure.

28. The non-transitory computer-readable medium of claim 27, wherein the radio resource control message comprises a first radio resource control message, and wherein the instructions, when executed, further configure the wireless device to receive, from the first base station, a second radio resource control message comprising one or more packet duplication configuration parameters indicating that at least one of the one or more data packets is duplicated.

29. The non-transitory computer-readable medium of claim 27, wherein the one or more duplicated data packets comprise one or more duplicated packet data convergence protocol (PDCP) packets.

30. The non-transitory computer-readable medium of claim 27, wherein the connection failure comprises at least one of:
    a radio link failure; or
    a handover failure.

31. The non-transitory computer-readable medium of claim 27, wherein the connection failure is based on at least one of:
    a quantity of radio link control retransmissions;
    an out-of-sync detection; or
    a random access failure.

32. The non-transitory computer-readable medium of claim 27, wherein the instructions, when executed, configure the wireless device to send the radio resource control message by sending, to the first base station, the radio resource control message.

33. The non-transitory computer-readable medium of claim 27, wherein the instructions, when executed, configure the wireless device to send the radio resource control message by sending the radio resource control message to the second base station wherein the second base station is different from the first base station.

34. The non-transitory computer-readable medium of claim 27, wherein the instructions, when executed, further configure the wireless device to:
    determine that a quantity of radio link control (RLC) layer packet retransmissions associated with one or more original packet data convergence protocol (PDCP) packets of the one or more data packets satisfies a threshold value; and
    determine, based on a determination that the quantity satisfies the threshold value, the connection failure.

35. The non-transitory computer-readable medium of claim 27, wherein the instructions, when executed, further configure the wireless device to:
    determine that a quantity of radio link control (RLC) layer packet retransmissions associated with one or more duplicated packet data convergence protocol (PDCP) packets of the one or more data packets satisfies a threshold value; and
    determine, based on a determination that the quantity satisfies the threshold value, the connection failure.

36. The non-transitory computer-readable medium of claim 27, wherein the radio resource control message is configured to cause the first base station to allocate a first quantity of resources for a second wireless device,
    wherein the radio resource control message comprises a first radio resource control message,
    wherein the instructions, when executed, further configure the wireless device to send a second radio resource control message that indicates a second connection failure and that indicates that packet duplication was deactivated at a time associated with the second connection failure, and
    wherein the second radio resource control message is configured to cause the first base station to allocate a second quantity of resources for the second wireless device, and wherein the second quantity is greater than the first quantity.

37. The non-transitory computer-readable medium of claim 27, wherein the connection failure is associated with a first cell of the first base station, and
wherein the instructions, when executed, configure the wireless device to send the radio resource control message by sending the radio resource control message via a second cell.

38. The non-transitory computer-readable medium of claim 27, wherein the instructions, when executed, further configure the wireless device to:
determine the connection failure; and
determine, based on the connection failure, a cell for a radio resource control communication, and
wherein the instructions, when executed, configure the wireless device to send the radio resource control message by sending the radio resource control message via the cell.

39. The non-transitory computer-readable medium of claim 27, wherein the one or more data packets are associated with a first bearer.

40. A system comprising:
a first base station; and
a wireless device, wherein the first base station is configured to:
send, to the wireless device, a packet duplication activation command for duplication of one or more data packets, and
wherein the wireless device is configured to:
send, based on the packet duplication activation command, one or more duplicated data packets; and
send, to one of the first base station or a second base station, a radio resource control message that indicates a connection failure and that indicates that packet duplication was activated at a time associated with the connection failure.

41. The system of claim 40, wherein the radio resource control message comprises a first radio resource control message, and
wherein the first base station is further configured to send a second radio resource control message comprising one or more packet duplication configuration parameters indicating that at least one of the one or more data packets is duplicated.

42. The system of claim 40, wherein the one or more duplicated data packets comprise one or more duplicated packet data convergence protocol (PDCP) packets.

43. The system of claim 40, wherein the connection failure comprises at least one of:
a radio link failure; or
a handover failure.

44. The system of claim 40, wherein the connection failure is based on at least one of:
a quantity of radio link control retransmissions;
an out-of-sync detection; or
a random access failure.

45. The system of claim 40, wherein, to send the radio resource control message, the wireless device is configured to send the radio resource control message to the first base station.

46. The system of claim 40, wherein, to send the radio resource control message, the wireless device is configured to send the radio resource control message to the second base station, wherein the second base station is different from the first base station.

47. The system of claim 40, wherein the wireless device is further configured to:
determine that a quantity of radio link control (RLC) layer packet retransmissions associated with one or more original packet data convergence protocol (PDCP) packets of the one or more data packets satisfies a threshold value; and
determine, based on a determination that the quantity satisfies the threshold value, the connection failure.

48. The system of claim 40, wherein the wireless device is further configured to:
determine that a quantity of radio link control (RLC) layer packet retransmissions associated with one or more duplicated packet data convergence protocol (PDCP) packets of the one or more data packets satisfies a threshold value; and
determine, based on a determination that the quantity satisfies the threshold value, the connection failure.

49. The system of claim 40, wherein the first base station is further configured to, based on the radio resource control message, allocate a first quantity of resources for a second wireless device,
wherein the radio resource control message comprises a first radio resource control message,
wherein the wireless device is further configured to send a second radio resource control message that indicates a second connection failure and that indicates that packet duplication was deactivated at a time associated with the second connection failure,
wherein the first base station is further configured to, based on the second radio resource control message, allocate a second quantity of resources for the second wireless device, and
wherein the second quantity is greater than the first quantity.

50. The system of claim 40, wherein the connection failure is associated with a first cell of the first base station, and wherein, to send the radio resource control message, the wireless device is configured to send the radio resource control message via a second cell.

51. The system of claim 40, wherein the wireless device is further configured to:
determine the connection failure; and
determine, based on the connection failure, a cell for a radio resource control communication, and
wherein, to send the radio resource control message, the wireless device is configured to send the radio resource control message via the cell.

52. The system of claim 40, wherein the one or more data packets are associated with a first bearer.

* * * * *

UNITED STATES PATENT AND TRADEMARK OFFICE
CERTIFICATE OF CORRECTION

PATENT NO. : 11,871,286 B2
APPLICATION NO. : 17/806093
DATED : January 9, 2024
INVENTOR(S) : Park et al.

Page 1 of 2

It is certified that error appears in the above-identified patent and that said Letters Patent is hereby corrected as shown below:

On the Title Page

In the References

Page 2, Column 2, Other Publications, Line 12:
Delete "Exended" and insert --Extended--

Page 2, Column 2, Other Publications, Line 18:
Delete "Specificaiton" and insert --Specification--

Page 7, Column 1, Other Publications, Line 17:
Delete "transactiosn" and insert --transactions--

In the Drawings

Sheet 7 of 23, Figure 7, Reference Numeral 723, Lines 1-4:
Delete "DL-SCH of SCH" and insert --DL-SCH of SCG--

Sheet 7 of 23, Figure 7, Reference Numeral 724, Lines 1-3:
Delete "UL-SCH of SCH" and insert --UL-SCH of SCG--

In the Specification

In the Detailed Description

Column 2, Line 66:
Delete "multiplexing" and insert --duplexing--

Column 12, Line 59:
After "gNB", insert --610--

Signed and Sealed this
Sixteenth Day of September, 2025

Coke Morgan Stewart
*Acting Director of the United States Patent and Trademark Office*

CERTIFICATE OF CORRECTION (continued)
U.S. Pat. No. 11,871,286 B2

Column 12, Line 60:
After "gNB", insert --620--

Column 12, Line 61:
Delete "620," and insert --621,--

Column 12, Line 67:
Delete "621" and insert --620--

Column 13, Line 48:
After "bearer", insert --.--

Column 14, Line 32:
Delete "(HARM)" and insert --(HARQ)--

Column 15, Line 64:
Delete "NTA" and insert --$N_{TA}$--

Column 16, Line 1:
Delete "NTA=0." and insert --$N_{TA}$=0.--

Column 20, Line 45:
Delete "1312, 1312," and insert --1312, 1313,--

Column 46, Line 58:
Delete "501)." and insert --1501).--

Column 50, Line 3:
Delete "Lab VIEWMathScript." and insert --LabVIEWMathScript.--

In the Claims

Column 54, Line 28:
In Claim 33, delete "station wherein" and insert --station, wherein--

Column 55, Line 23:
In Claim 40, after "device,", insert --¶--